(12) United States Patent
Herrick et al.

(10) Patent No.: US 11,796,115 B1
(45) Date of Patent: Oct. 24, 2023

(54) APPARATUS FOR LATERAL CABLE PULLING AND PIPE REPLACEMENT

(71) Applicant: RODDIE, INC., Columbia Falls, MT (US)

(72) Inventors: Rod Herrick, Whitefish, MT (US); Shawn Patrick Ries, Kalispell, MT (US)

(73) Assignee: Roddie, Inc., Columbia Falls, MT (US)

( * ) Notice: Subject to any disclaimer, the term of this patent is extended or adjusted under 35 U.S.C. 154(b) by 0 days.

(21) Appl. No.: 16/443,850

(22) Filed: Jun. 17, 2019

Related U.S. Application Data

(63) Continuation-in-part of application No. 16/386,250, filed on Apr. 16, 2019.

(60) Provisional application No. 62/696,785, filed on Jul. 11, 2018, provisional application No. 62/658,723, filed on Apr. 17, 2018.

(51) Int. Cl.
| | |
|---|---|
| *F16G 11/00* | (2006.01) |
| *H02G 1/00* | (2006.01) |
| *F16L 55/18* | (2006.01) |
| *F16L 55/165* | (2006.01) |
| *E21B 7/20* | (2006.01) |

(52) U.S. Cl.
CPC ............ *F16L 55/18* (2013.01); *E21B 7/20* (2013.01); *F16L 55/1658* (2013.01)

(58) Field of Classification Search
CPC ....... B65H 51/08; F16L 1/028; F16L 2101/50; F16L 1/165; H02G 1/081; H02G 1/04; H02G 1/06; H02G 1/08; H02G 1/02; H02G 1/00; H02G 1/088; H02G 3/36; H02G 7/02; E21B 19/08; Y10T 24/39; F16G 11/048; F16G 11/00; F16L 55/18; E21B 7/20; F16L 55/1658

USPC .. 405/154.1, 156, 174, 177, 184; 138/97, 98; 254/134.3, 385, 386, 384, 259, 264; 226/149, 226/150, 147, 148, 151, 162, 165, 166, 167

See application file for complete search history.

(56) References Cited

U.S. PATENT DOCUMENTS

| | | | | |
|---|---|---|---|---|
| 3,181,302 | A | * | 5/1965 | Lindsay ............. F16L 55/1658 29/241 |
| 3,287,922 | A | * | 11/1966 | Harmstorf ................ E02F 5/10 172/40 |
| 3,960,360 | A | * | 6/1976 | Elliston ............... E21B 19/084 173/147 |

(Continued)

OTHER PUBLICATIONS

Marketing Material [online; retrieved Mar. 29, 2019] COMPANY NAME:Anaconda Trenchless PRODUCT: Anaconda Trenchless COMPANY website: http://www.anacondatrenchless.com/Equipment.htm.

(Continued)

*Primary Examiner* — Edwin J Toledo-Duran
(74) *Attorney, Agent, or Firm* — Robin Kelson Consulting, Inc.

(57) ABSTRACT

A compact, open path cable pulling apparatus, having a low center of gravity, composed of two detachable, single person hand-portable components, and useful in either a vertical or horizontal configuration. The apparatus is competent to pull cable horizontally through space underground with a pulling force in the range of at least about 20 to 100 tons using low pressure flow hydraulics and has utility in the cable pulling industries, including in the drilling and horizontal directional drilling industries, and as part of a method for pulling cable through space, including pulling cable through space in the pipe bursting and trenchless pipe replacement industries.

20 Claims, 38 Drawing Sheets

(56) References Cited

U.S. PATENT DOCUMENTS

| | | | | |
|---|---|---|---|---|
| 4,103,501 | A * | 8/1978 | Laurent | H02G 1/06 172/40 |
| 4,456,093 | A * | 6/1984 | Finley et al. | B66F 11/046 182/2.11 |
| 4,601,312 | A * | 7/1986 | Parkyn, Sr. | F16L 55/18 264/36.16 |
| 5,190,409 | A * | 3/1993 | Hall | E02F 5/003 37/367 |
| 5,895,176 | A * | 4/1999 | Puttman | E21B 7/206 405/184 |
| 6,086,050 | A * | 7/2000 | Wiederkehr et al. | B66D 1/60 254/326 |
| 6,672,802 | B2 * | 1/2004 | Putnam | B66D 3/006 405/184 |
| 6,793,442 | B2 | 9/2004 | Carter et al. | |
| 7,147,210 | B2 * | 12/2006 | Foege et al. | E04G 21/121 254/93 H |
| 7,175,367 | B2 * | 2/2007 | Hau | F16L 55/1658 405/184 |
| 8,702,349 | B2 * | 4/2014 | Carter et al. | E21B 7/205 405/184 |
| 10,167,986 | B2 * | 1/2019 | Tjader | F16L 55/18 |
| 10,415,738 | B2 * | 9/2019 | Herrick et al. | B26D 3/001 |
| 2003/0059260 | A1 * | 3/2003 | Putnam | B66D 3/006 405/184.3 |
| 2004/0018920 | A1 * | 1/2004 | Simonson | A63B 21/156 482/99 |
| 2004/0146361 | A1 * | 7/2004 | Hau | F16L 55/18 405/184.3 |
| 2007/0253781 | A1 * | 11/2007 | Sewell et al. | B66D 1/00 405/184.3 |
| 2009/0149780 | A1 * | 6/2009 | Creswick | A61B 5/224 600/595 |
| 2010/0200821 | A1 * | 8/2010 | Tjader | F16L 55/1658 254/283 |
| 2011/0226884 | A1 * | 9/2011 | LaForest | B65H 51/08 226/1 |
| 2012/0170980 | A1 * | 7/2012 | Carter et al. | F16L 55/18 405/184 |
| 2013/0156505 | A1 * | 6/2013 | Tjader | B66D 3/08 405/184.3 |
| 2014/0037386 | A1 * | 2/2014 | Tjader | F16L 55/1658 405/184.3 |
| 2016/0348807 | A1 * | 12/2016 | Herrick et al. | F16L 55/18 |
| 2019/0382230 | A1 * | 12/2019 | Hamada | B60R 16/027 |
| 2021/0107074 | A1 * | 4/2021 | Randa et al. | B23D 21/02 |

OTHER PUBLICATIONS

Marketing Material [online; retrieved Mar. 29, 2019] COMPANY NAME:Pow-r Mole Trenchless Solutions PRODUCT: PD-22 PRODUCT url: https://irp-cdn.multiscreensite.com/3c87f020/files/uploaded/PD-22%20%E2%80%93%20Service%20Line%20Splitting%20Machine.pdf.

Marketing Material [online; retrieved Mar. 29, 2019] COMPANY NAME:Pow-r Mole Trenchless Solutions PRODUCT: PD-33M PRODUCT url:https://irp-cdn.multiscreensite.com/3c87f020/files/uploaded/PD-33M%20%E2%80%93%20Lateral%20Pipe%20Bursting%20Machine.pdf.

Marketing Material [online; retrieved Mar. 29, 2019] COMPANY NAME:Tric Tools PRODUCT: M100 System COMPANY website: https://www.trictools.com/products/m100-system/.

Marketing Material [online; retrieved Mar. 29, 2019] COMPANY NAME:Tric Tools PRODUCT: M50 System COMPANY website: https://www.trictools.com/products/m50-system/.

Marketing Material [online; retrieved Mar. 29, 2019] COMPANY NAME:TT Technologies PRODUCT: GRUNDOTUGGER COMPANY website: https://www.tttechnologies.com/products/grundotugger-lateral-pipe-bursting-system/.

Marketing Material [online; retrieved Mar. 30, 2019] COMPANY NAME:Hammerhead Trenchless PRODUCT: Portaburst COMPANY website:https://www.hammerheadtrenchless.com/products/pipe-bursting/lateral-bursting.

Marketing Material [online; retrieved Sep. 11, 2018] COMPANY NAME:. Pow-R Mole PRODUCTS: Pipe Bursting Equipment (see, e.g., PD-33; http://www.powimole.com/bursting-and-boring; https://irp-cdn.multiscreensite.com/3c87f020/files/uploaded/PD-33%20-%20Lateral%20Pipe%20Bursting%20Machine.pdf).

* cited by examiner

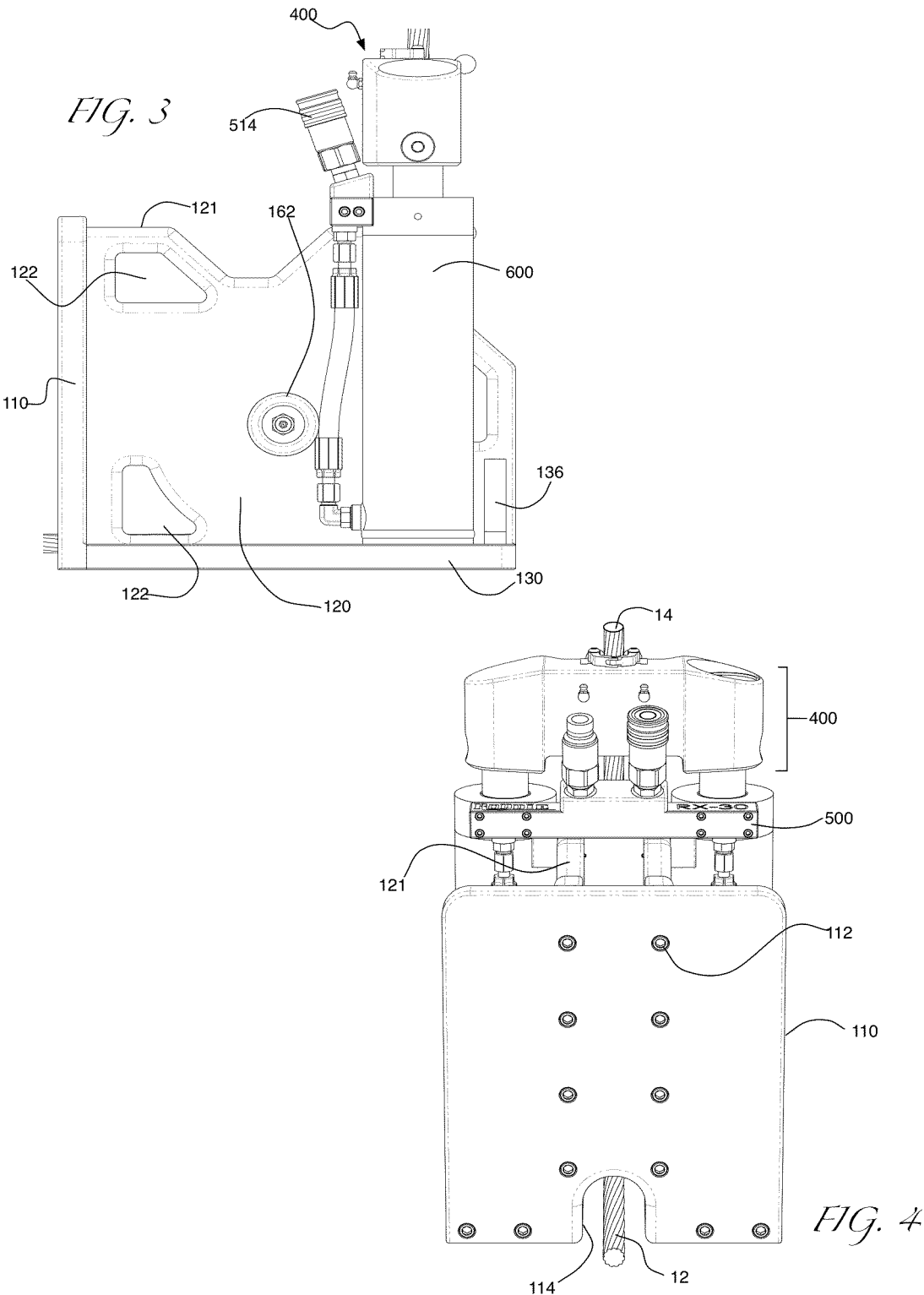

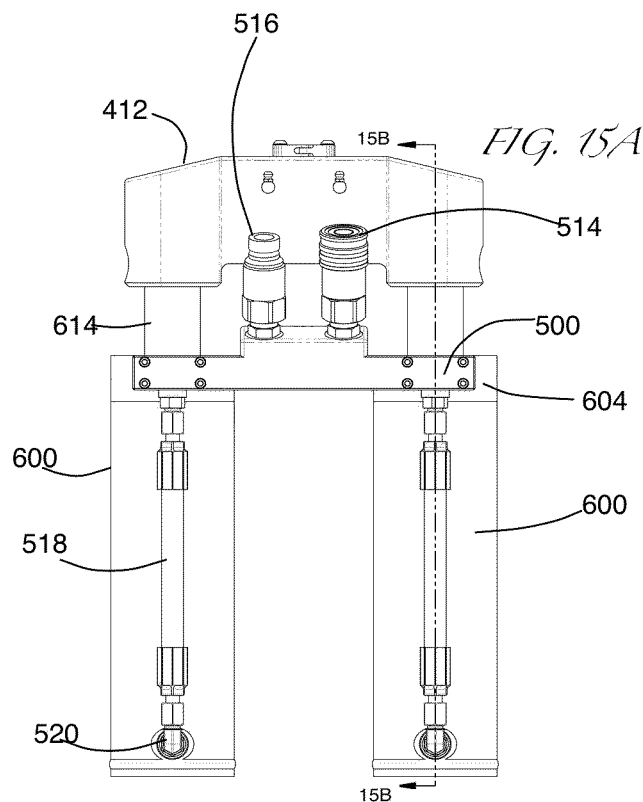
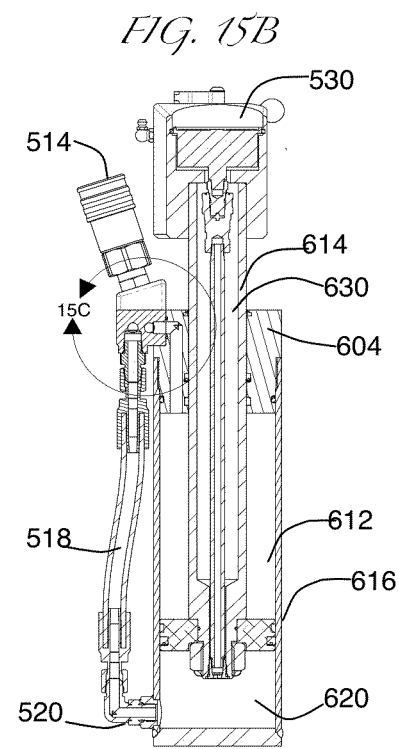
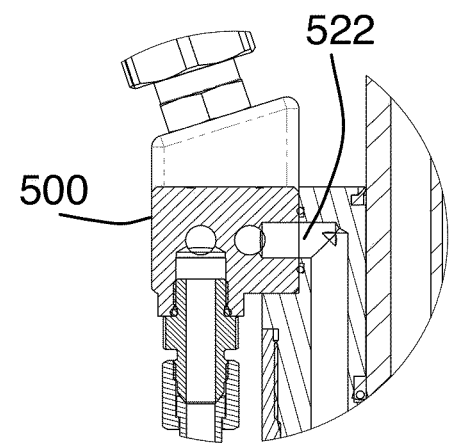

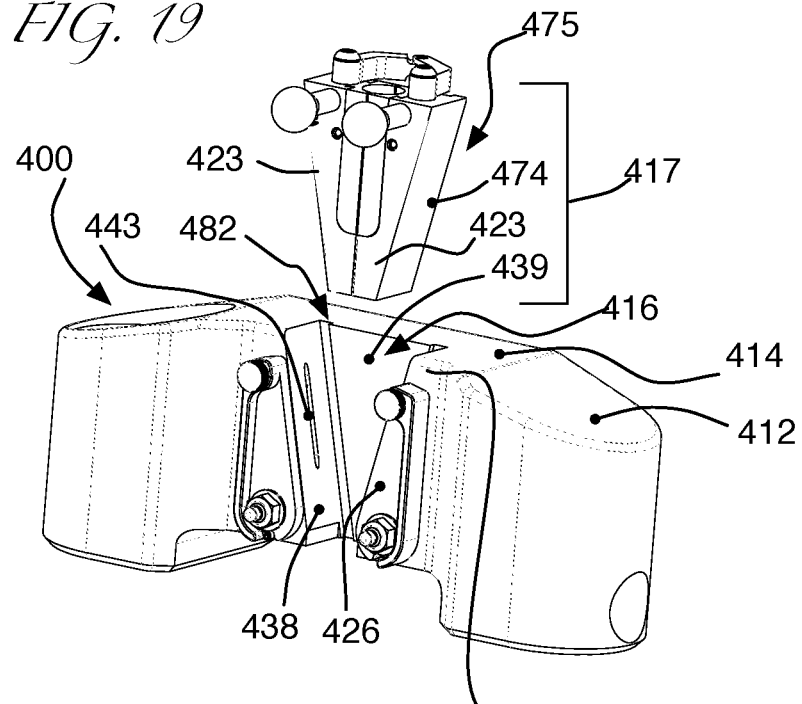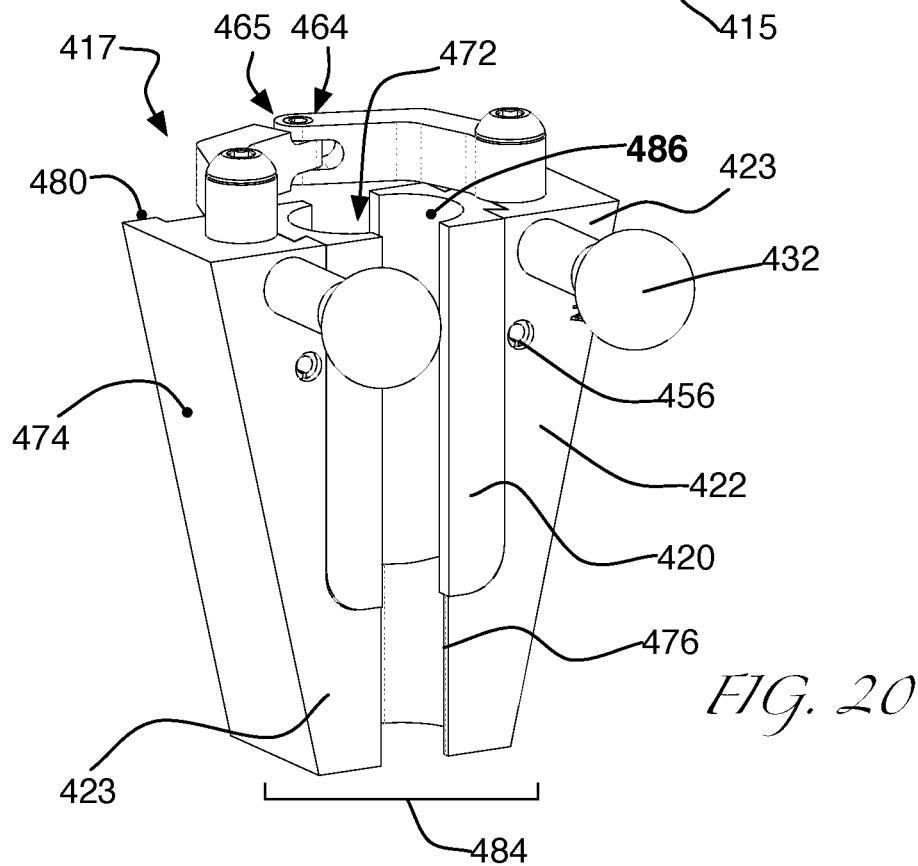

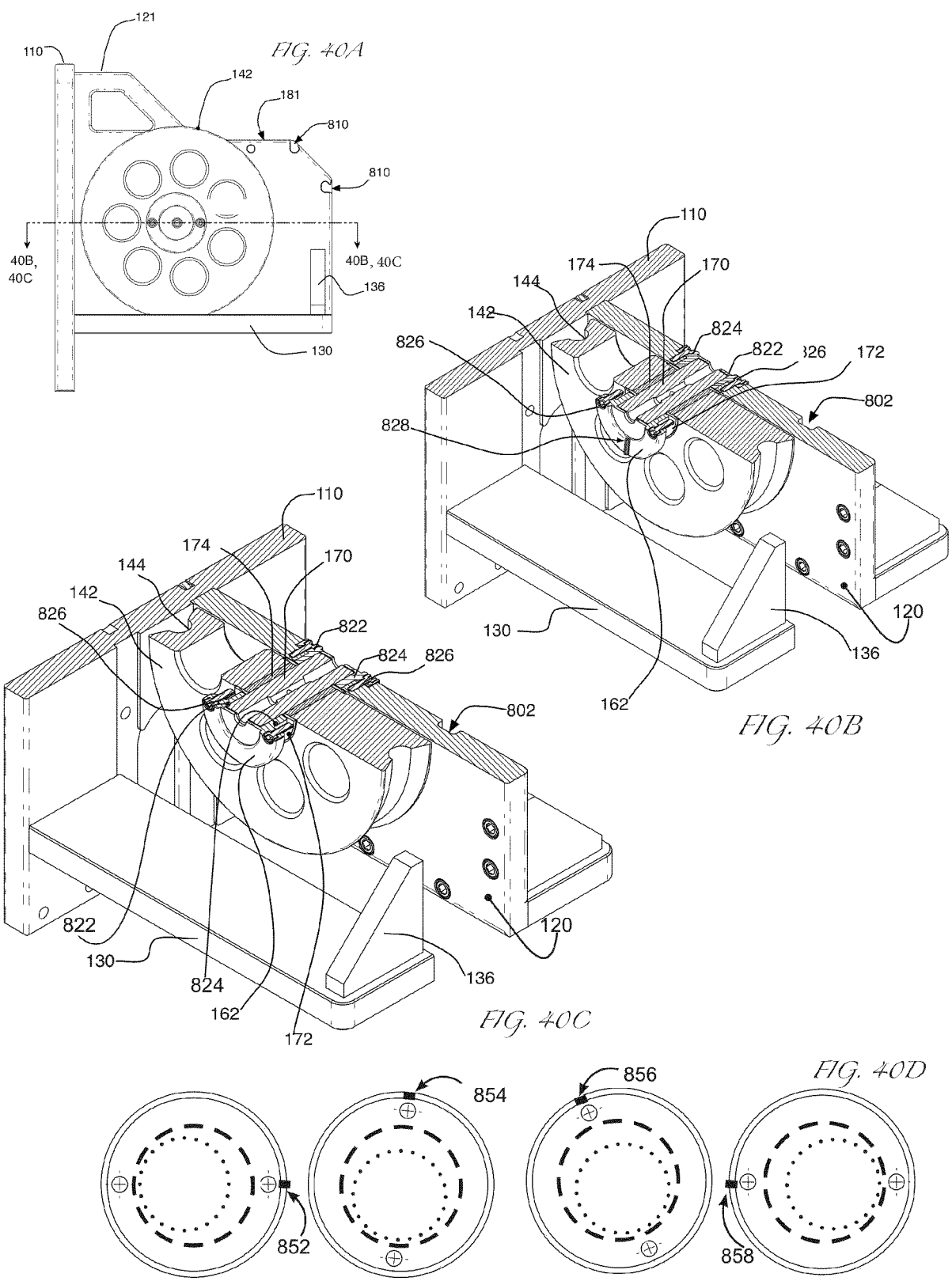

APPARATUS FOR LATERAL CABLE PULLING AND PIPE REPLACEMENT

CROSS REFERENCE TO RELATED APPLICATIONS

This application is a continuation in part of, and claims the benefit of, Pat. Application USSN 16/386250, filed Apr. 16, 2019, which itself claims the benefit of Provisional Pat. Application USSN 62/658,723, filed Apr. 17, 2018 and provisional Pat. Application USSN 62/696785, filed Jul. 11, 2018, the disclosures of which are hereby expressly incorporated in their entirety by reference herein.

FIELD OF USE

Embodiments of the present disclosure find applicability in the field of lateral cable pulling, including any field for pulling cable through space underground. One useful field includes the field of trenchless pipe replacement.

BACKGROUND

Pipe bursting is a mature and widely used trenchless method for renewal of deteriorated and/or undersized gas, water, sewer, utility conduits and other pipelines throughout the world. The trenchless method provides an economic means for pipe replacement with minimal social disturbance to businesses and residents as compared with open cut or open trench techniques.

Pipe bursting is defined as a trenchless replacement method in which an existing pipe is broken either by brittle fracture or by splitting, using an internal, mechanically applied force applied by a bursting tool, generally referred to as a bursting head device. At the same time, a new pipe, typically of the same or larger diameter, is pulled in behind the bursting head, replacing the existing pipe. In the method, only two pits need to be dug or provided, one at each end of the underground pipe to be replaced. In some cases the pit can already exist, as in an existing manhole, or a space within a building, such as a basement.

A pulling cable is threaded through the underground pipe to be replaced, and one free end of the cable, extending into the entry or insertion pit, is attached to the front end of the bursting head device. The bursting head device also has a replacement pipe attached, typically by means of a universal duct puller associated with the back end of the busting head device. The other end of the cable extends into the exit or receiving pit, and is provided to a pulling apparatus located in the pit. The pulling apparatus then pulls the cable and the attached bursting head device through the existing cable, typically by a hydraulic mechanism which may be electrical or gas-powered. The bursting head device bursts or fractures the existing pipe as it is pulled through, and brings with it the replacement or product pipe attached at the back end of the bursting head device.

It is an on-going desire in the industry to provide fast, efficient and stable cable pulling devices that have few components to transport, are reasonably lightweight, are small in size, are easy to set up and use in the field, and which also require minimal pit size excavation to install. It also is an on-going desire to provide these characteristics at a reasonable cost to the consumer, in a range of pulling force capabilities, including in the range of at least about 30-100 tons, and for pulling a range of pipe diameters, using a range of cable sizes.

Useful cable pulling and replacement pipe pulling apparatuses in the art that have value in residential and commercial pipe replacement typically utilize a hydraulically powered cylinder or piston mechanism, also known in the art as a ram puller mechanism, to pull the cable. Many such cable pulling systems in the art utilize a dual cylinder piston assembly with high pressure flow, typically pressure flows over 3,000 psi, e.g., in the range of 5,000-10,000 psi, to provide the desired pulling forces typically required to pull replacement pipes having diameters in the range of 2-12 inches. Useful pulling forces for this range of pipe diameters can be in the range of about 30-100 tons. Up until now, particularly for providing pulling forces greater than about 30 tons, high pressure flow systems have been preferred because these require substantially lower hydraulic fluid volumes and correspondingly smaller cylinders than low pressure flow systems.

There are several limitations to high pressure flow systems. One limitation is that the higher the pressure flow, the slower the piston stroke. High pressure flow systems therefore can take substantially longer time to pull a cable through space, as compared with a low pressure flow system, such as one with 3,000 psi or lower. Another limitation is that high pressure flow pulling apparatuses require a special power system to drive them, while a low pressure flow apparatus can be driven by a mini-excavator, tractor, backhoe and the like, which may already be available to an operator in the field. Both these limitations can add significant costs for an operator or owner, in man-hour costs and in equipment purchase costs. Another limitation to high pressure flow devices includes the apparatus weight limitations imposed by the cylinder and rod specifications required to move fluid under high pressure.

Piston-driven cable pulling apparatuses in the art can comprise a horizontal system, where the ram puller mechanism is parallel to the ground and the cable being pulled, or a vertical system, where the ram puller mechanism is vertical to the ground and the cable being pulled through pipe. Typically the cable being pulled is angled into a vertical position by means of a pulley wheel or similar mechanism and then engaged with the ram puller mechanism.

Vertical systems can be advantageous as an opportunity for minimizing pit size requirements. However, vertical systems place additional constraints on the cable pulling apparatus. For example, in vertical systems the cable angle has to be managed once it is in the vertical position, to maintain cable integrity, particularly as the pulley wheel wears with use. Another constraint is the limitation on cable size that a pulley wheel imposes. In pulley wheel systems in the art, choosing cables with different diameters typically requires changing the pulley wheel, which requires disassembly of part or all of the pulling system. Still another limitation is ready access to the cable in the pulling apparatus. Many devices in the art are "closed path" devices, requiring the cable to be threaded through the device from below, rather than allowing the cable to slide into position from a vertical side face of the device, as in an "open path" system. Vertical open path systems require an added mechanism to keep the cable from falling out of the device without impacting cable fidelity. Still another limitation includes component vulnerability in the vertical position during operation including, for example, hydraulic components.

One "open path" system design, described in U.S Pat. Nos. 6,305,880; 6,524,031; U.S 6,793,442 and U.S 6,799,923, describes vertical and horizontal cable pulling devices using Post Tensioning Rams (PTR) with high pressure hydraulics, namely 5,000 psi and above. In the vertical cable pulling devices described, the PTR, a dual cylinder ram system, sits above the cable pulley wheel. This positioning creates a substantially tall and unstable apparatus with a high center of gravity, requiring significant frame and bracing considerations to maintain apparatus stability during pulling operations in the field.

Vertical, or semi-vertical cable pulling devices in the industry and representative of the art include the Tric Tool M30, M50 and M100 devices; the Pow-r Mole PD-22, PD-33 and PD-33M devices; the Hammerhead Trenchless "Portaburst" devices; the TT Technologies "GrundoTugger" devices, and the Grolitz & Co.'s GO6000 devices. The Tric Tool devices use the PTR system described in the '880, '031 and '442 patents and rely on high pressure flow hydraulics. The Hammerhead, Grolitz and TT Technologies devices also all rely on high pressure flow hydraulics, and in addition are closed path devices. The Pow-r Mole devices, while using low pressure flow, are multi-component, closed path devices and have a maximum pulling force of 30 tons.

There remains a need for an improved vertical cable pulling system with a reduced weight and size that is easy to transport and set up and is economical to purchase and use. There also remains a need for a vertical system that reduces component and/or cable damage during operation while maximizing flexibility for hydraulic power sources and cable diameter choices.

The present disclosure describes improvements in cable pulling systems, components and methods that overcome deficiencies in the systems, devices, components and methods of the prior art.

SUMMARY

This summary is provided to introduce a selection of concepts in a simplified form that are further described below in the Detailed Description. This summary is not intended to identify key features of the claimed subject matter on its own, nor is it intended to be used on its own as an aid in determining the scope of the claimed subject matter.

In accordance with one embodiment of the present disclosure provided herein is a vertical cable pulling apparatus, competent to pull cable horizontally through space underground with a pulling force in the range of at least about 20 to 100 tons using low pressure flow hydraulics. In another embodiment, the vertical cable pulling apparatus has a pulling force of in the range of at least about 30 tons and more using low pressure flow hydraulics. In another embodiment, the apparatus uses a pressure flow rate in the range of at least about 2,400-3,000 psi, including in the range of at least about 2,700-3,000 psi. In still another embodiment, the apparatus is compact both in footprint and overall height, has a low center of gravity, and is not subject to tipping or substantial vertical destabilization when in use.

In accordance with another embodiment of the present disclosure, the vertical cable pulling apparatus provided herein comprises an open path means for engaging cable with the pulling apparatus. In still another embodiment, the apparatus comprises two detachable, single-person hand-portable components, referred to herein respectively as (1) the chassis component, and (2) the cylinder component. In one embodiment, each component can weigh less than about 75 pounds. In another embodiment, each component can weigh less than about 70 pounds.

In one embodiment the chassis component comprises a frame, means for receiving a cable and converting the direction of the cable from horizontal to vertical, and means for receiving the cylinder or cable pulling component. In another embodiment, the chassis component can releasably engage with the cable pulling cylinder component. In another embodiment, the chassis component can include means for engaging and holding the cable in a vertical position. In yet another embodiment, the chassis component can be competent to accommodate a range of cable diameters without requiring disassembly or exchanging pulley wheels or other cable direction conversion means. In another embodiment, the apparatus can accommodate a plurality of cable diameters with a single cable pulley wheel.

The chassis component frame can comprise a back plate, two parallel, opposing foot plates projecting forward from the back plate, and two parallel, opposing side walls projecting vertically up from the opposing foot plates. In one embodiment, the side walls can be attached to the inside edges of the opposing foot plates and the side wall inside surfaces can abut the cable direction converting means. In another embodiment the foot plates can have an overall rectangular shape. In still another embodiment, the back plate can accommodate a plurality of foot plate positionings. In one position the foot plates can project forward from the base of the back plate. In another embodiment, the foot plates can project forward from an elevated position on the back plate. In yet another embodiment, the back plate can comprise an opening dimensioned to receive a cable. In still another embodiment, the frame can comprise one or a plurality of weight-reducing openings, particularly in the back plate or side wall members. In another embodiment, at least one of these openings can function as a handle.

In another embodiment, the chassis component can comprise one or a plurality of integrated Zerk or grease fittings for lubricating the cable direction converting means. In still another embodiment the cable direction converting means can comprise a pulley wheel dimensioned to receive a cable.

In another aspect, the cylinder component can comprise two laterally opposing, parallel hydraulic cylinders positioned such that the cylinders span or straddle both the cable direction converting means and the opposing chassis side walls and rest on the foot plate upper surfaces when engaged with the chassis component. In another embodiment, the cylinder component can comprise means for engaging and holding the cable. In another embodiment, the cable engaging means on the cylinder component is interposed between the juxtaposed cylinders. In still another embodiment, the hydraulic cylinders together can provide at least in the range of about 30 tons pulling force. In still another embodiment, the cylinders together can provide at least in the range of about 50 tons of pulling force. In still another embodiment the cylinders together can provide at least in the range of about 80-100 tons of pulling force. In still another embodiment the cylinders together can provide at least in the range of about 90+ tons of pulling force.

In another aspect, the cylinders can operate with a low pressure flow rate. In still another embodiment the cylinders operate with a pressure flow rate in the range of at least about 2,400-3,000 psi. In still another embodiment, each cylinder can weigh less than about 20 pounds. In another embodiment, one or both cylinders can comprise a substantially hollow piston rod. In another embodiment, the cylinder component can comprise an integrated hydraulic gauge. In still another embodiment, the hydraulic gauge can comprise part of a cylinder in the cylinder component. In still another embodiment, the hydraulic gauge can measure fluid pressure in the cylinder from within a hollow piston rod. In still another embodiment, the cylinder component can comprise integrated hydraulic fluid channels.

In yet another embodiment mechanical means can be provided for retaining the cylinders in position in the apparatus.

In one embodiment the mechanical means can include interlocking or removably engaging means. In another embodiment the mechanical engaging or retaining means can include a tang and groove mechanism.

In one embodiment, the vertical cable pulling apparatus of the present disclosure can comprise means for adjusting the cable angle in the vertical position. In another embodiment, the apparatus of the present disclosure can comprise means aligning the cable in the vertical position. In still another embodiment, the apparatus of the present disclosure can include means to releasably engaging with a cable surface. In another embodiment, the apparatus of the present disclosure comprises two self-releasing cable engaging mechanisms that work in opposition with one another or otherwise alternate their cable engagement such that one is released while the other is engaged.

In one embodiment, each of the chassis and cylinder components can include a self-releasing cable engaging means. In another embodiment, both self-releasing cable engaging means can be included on the cylinder component. In another embodiment, the self-releasing cable engaging means can comprise an independent cable gripper assembly comprising a central bore or axial channel through which a cable can pass, and a gripper assembly receiver dimensioned to receive the assembly such that outer side edges of the assembly can slide along the inner side edges of the receiver. In still another embodiment, the gripper assembly receiver can comprise means for receiving externally provided lubricant through one or more integrated Zerk or grease fittings for lubricating the gripper assembly engaging surfaces of the receiver.

In still another embodiment, the gripper assembly receiver can include means for receiving the assembly by vertical insertion and by horizontal or lateral insertion. In another embodiment, the gripper assembly can be competent to receive and engage with a lateral surface of a cable. In still another embodiment, the gripper assembly can comprise means for receiving the lateral insertion of a cable into the central cable passage bore. In yet another embodiment, the gripper assembly can comprise a handle to facilitate movement of the assembly in and out of the receiver. In still another embodiment, the gripper assembly can comprise two members with inner, cable-gripping opposing surfaces that together define the central bore. In still another embodiment, the cable gripping members can comprise a coupling means. In still another embodiment the coupling means further can comprise timing means for keeping the gripping members parallel on a cable surface during operation. In still another embodiment, the receiver can comprise rotatable means for mechanically retaining the gripper assembly in the receiver. In still another embodiment the cable engaging means can further comprise tensioning means for keeping the gripper members timed and engaged on the cable surface during operation. In yet another embodiment, the cable engaging means can further comprise means for retaining the gripper members in an open position off a cable surface.

In accordance with another embodiment of the present disclosure, a device, mechanism, method and means are provided for keeping a vertically extended cable, including the terminal free end of a cable, aligned vertically when positioned in a vertical pulling apparatus, including during the pulling operation. The device can comprise an open-path means for receiving a cable side surface laterally provided to the device and means for removably locking the device into a closed, cable-guiding position. In the closed position the device can restrain cable movement, including horizontal or side-to-side movement during a pulling operation.

In another aspect, a universal cable pulling apparatus is provided that can be used to as a horizontal ram puller system or a vertical ram puller system to pull cable laterally, including laterally through space underground.

In still another aspect, the present disclosure provides a novel method for pulling cable though space with pulling forces at least in the range of about 30 tons using low pressure flow rates and cylinder fluid volumes in the range of at least about 70-90 cubic inches per cylinder. In another embodiment, the method provides pulling forces in the range of at least about 75 tons using low pressure flow rates and cylinder fluid volumes in the range of at least about 280 cubic inches per cylinder.

As described herein, compact, low-weight, vertical, open-path cable pulling systems now can be configured with pulling forces of in the range of at least about 28 tons and above, including pulling forces in the range of at least about 25-100 tons, and in the range of at least about 28-80 tons, using high flow, low pressure hydraulics. In one embodiment, the systems, units, methods and components disclosed herein are hand-portable by a single individual and can provide a pulling force in the range of at least about 28 tons and above with a stroke speed at about10 gpm in the range of at least about 1.2-2.0 inches per second, including, without limitation, about 1.6 inches per second, or about 8 ft per minute using a cylinder fluid volume of about 85 cubic inches per cylinder and a cylinder weight of about 18 lbs. In another embodiment, the systems, units, methods and components disclosed herein can provide a pulling force in the range of at least about 75 tons and above with a stroke speed at 10 gpm in the range of at least about 0.4-0.8 inches per second, including, without limitation, about 0.66 inches per second, or about 3.3 ft per minute, using a cylinder fluid volume of about 282 cubic inches per cylinder.

These and other attendant features and aspects of the present disclosure will be apparent from the drawings, detailed description and claims which follow.

DESCRIPTION OF THE DRAWINGS

The foregoing aspects and many of the attendant advantages of this disclosure will become more readily appreciated as the same become better understood by reference to the following detailed description when taken in conjunction with the accompanying drawings, where like-numbered parts reference like-membered components and wherein:

FIG. 3 is a side view of the apparatus of FIG. 1;

FIG. 4 is a rear view of the apparatus of FIG. 1;

FIGS. 15A-15C are rear and sectional views of the cylinder component of FIG. 14;

FIG. 19 is an exploded view of the bridge of FIG. 17;

FIG. 20 illustrates a gripper assembly according to one embodiment of the present disclosure;

FIGS. 40A-40C illustrates two positions of an eccentric axle cradle according to one embodiment of the present disclosure;

FIG. 40D illustrates exemplary indicators for four pulley positions according to another embodiment of the present disclosure;

DETAILED DESCRIPTION

Embodiments of the present disclosure provide improvements in devices, components, mechanisms and methods of use directed to means for pulling cable through space, particularly through space underground.

The subject matter defined in the appended claims is not necessarily limited to the benefits described herein. A particular implementation of the advancements to the art disclosed herein may provide all, some or none of the benefits described herein. Although operations for the various techniques may be described herein in a particular sequential order for the sake of presentation, it will be understood that this manner of description encompasses rearrangements in the order of operations, unless a particular ordering is required. For example, operations or acts described sequentially may in some cases be rearranged or performed concurrently.

For the purposes of the instant disclosure, the cable engaging face of the pulling apparatus is deemed to the front of the system, and the pit wall engaging face is deemed to be the back of the system. When an item is referred to herein as moving laterally or horizontally in the system it is moving along a vertical plane towards the back or the front of the system, as specified. When an item is referred to herein as moving vertically in the system, it is moving along a horizontal plane down towards the bottom or up towards the top of the system, as specified.

The systems, components and methods of use are described hereinbelow in the following order:
   I. Cable Pulling Apparatus
   II. Integrated Chassis Component
      A. Chassis Frame
      B. Cable Direction Converting Means
      C. Integrated Cable Diameter Management Means
      D. Vertical Cable Retainer
   III. Integrated Cylinder Component
      A. Cable Pulling Cylinders B. Hydraulics
IV. Open-Path Cable Engaging Means
V. Open-Path Cable Guiding Means
VI. Universal Cable Puller
VII. Examples

I. Cable Putting Apparatus

Referring now to FIGS. 1-5, 36, 38 and 44, several non-limiting embodiments of a cable pulling device or apparatus in accordance with the present disclosure are illustrated. In the figures, apparatus 10 comprises an open path ram puller system for pulling a cable 12 through space. In FIGS. 1-5, 36 and 38, the apparatus acts as a vertical cable pulling system. In FIGS. 44A-44B, the apparatus acts as a horizontal cable pulling system.

Figure 1:
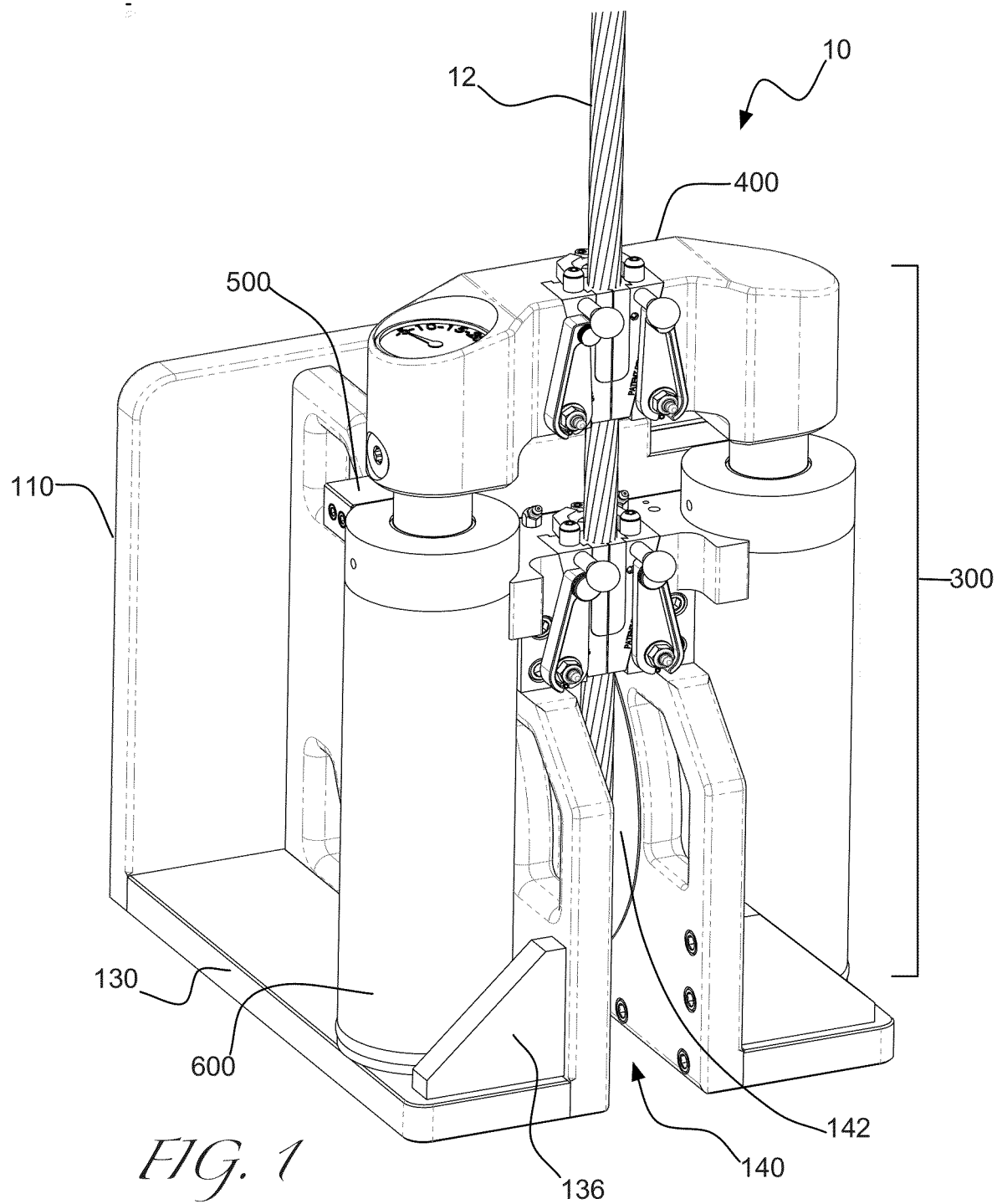
FIG. 1 is a perspective view of a vertical dual-cylinder cable pulling apparatus according to one embodiment of the present disclosure.
Figure 2:
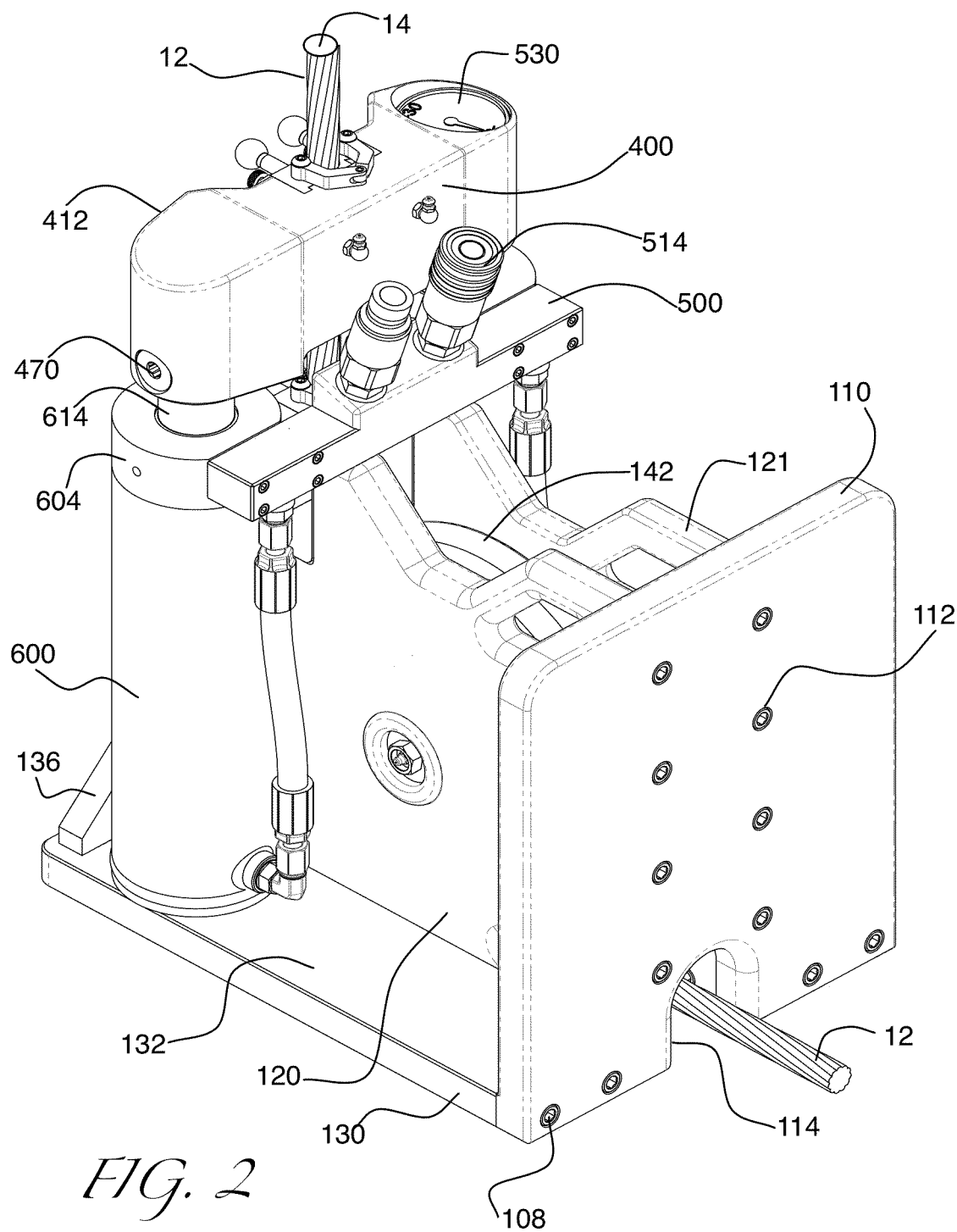
FIG. 2 is a rear elevation perspective view of the apparatus of FIG. 1.
Figure 5:
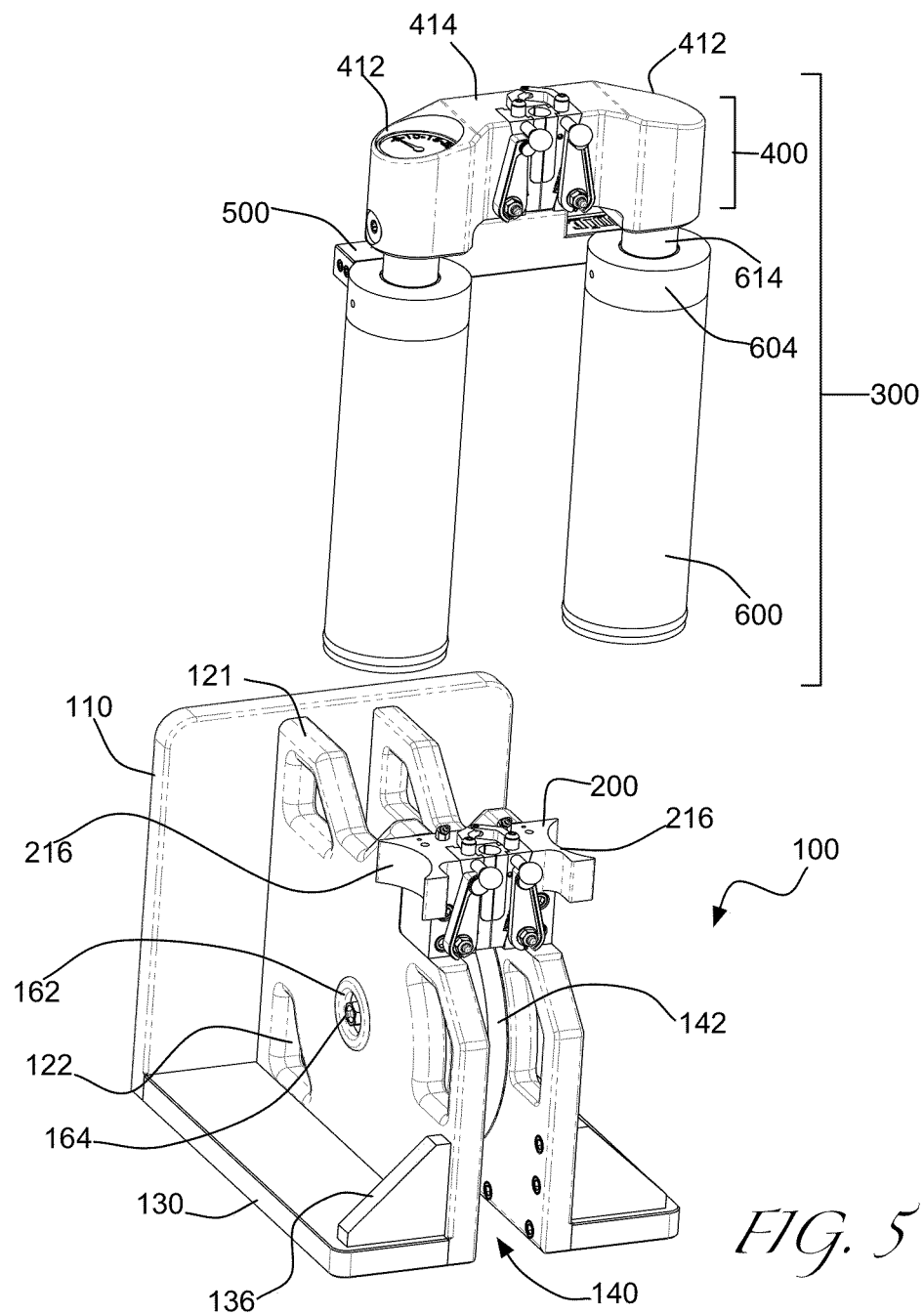
FIG. 5 is an exploded view of a vertical dual-cylinder cable pulling apparatus according to one embodiment of the present disclosure.
Figure 6:
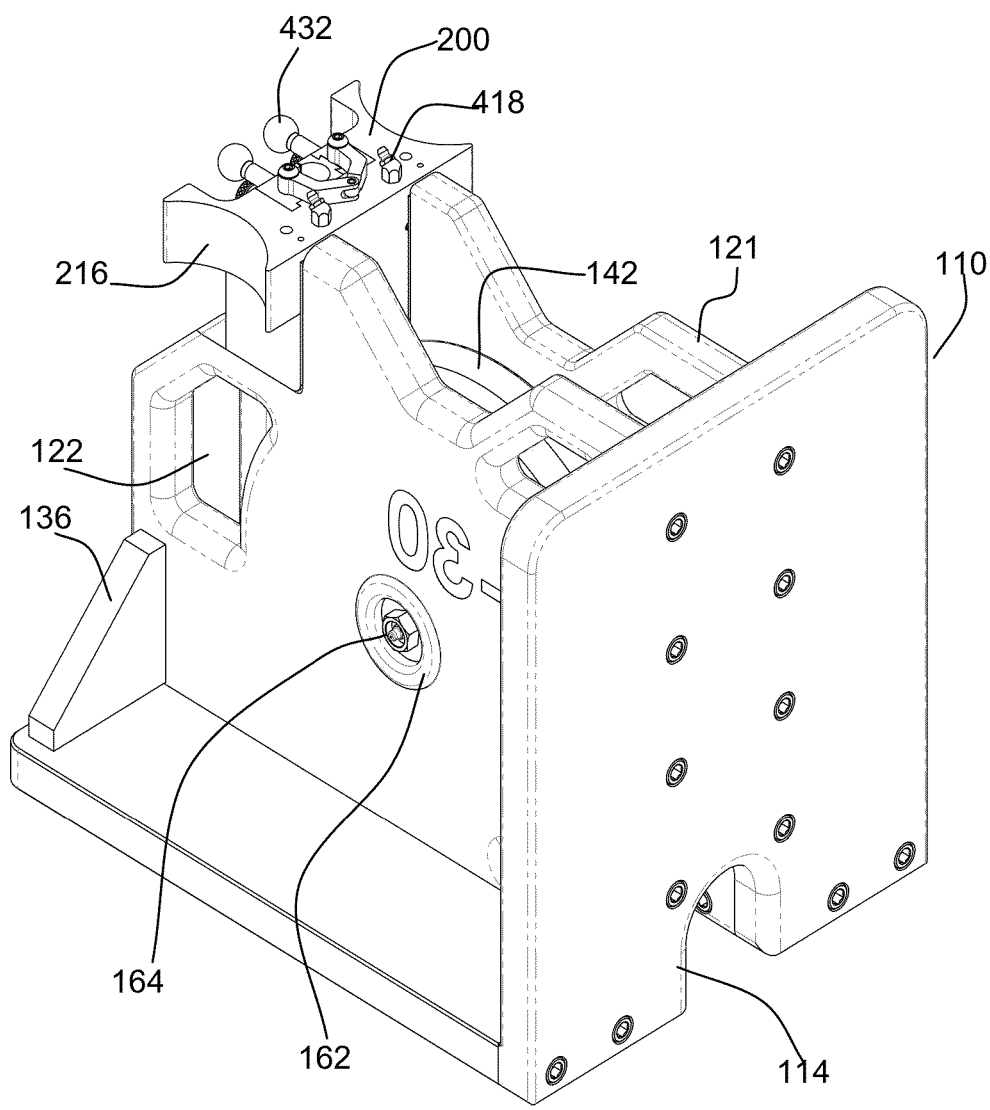
FIG. 6 is a perspective view of the chassis component of a vertical dual-cylinder cable pulling apparatus according to one embodiment of the present disclosure.
Figure 7:
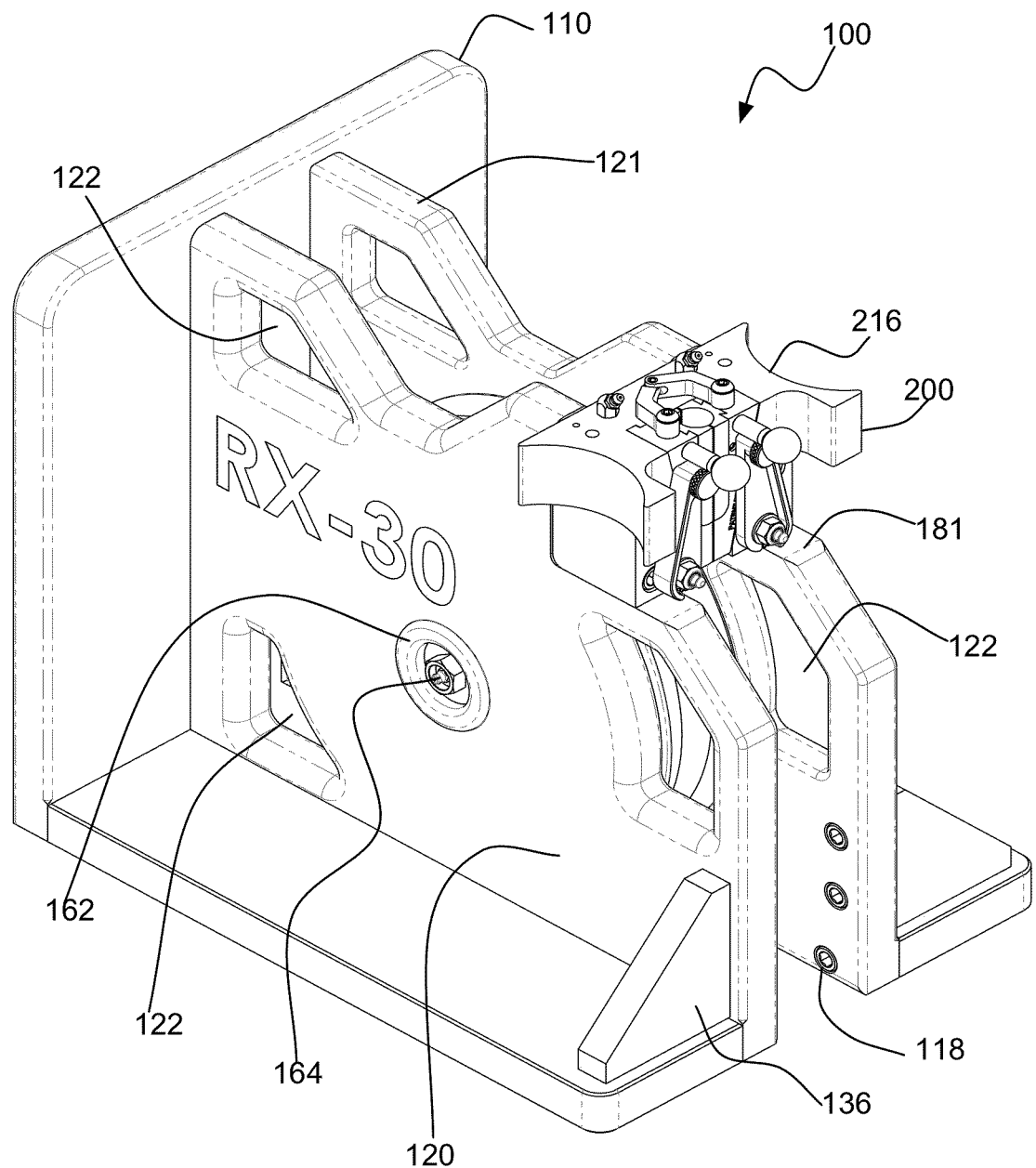
FIG. 7 is a side elevational perspective view of the chassis component in FIG. 6.
Figure 8:
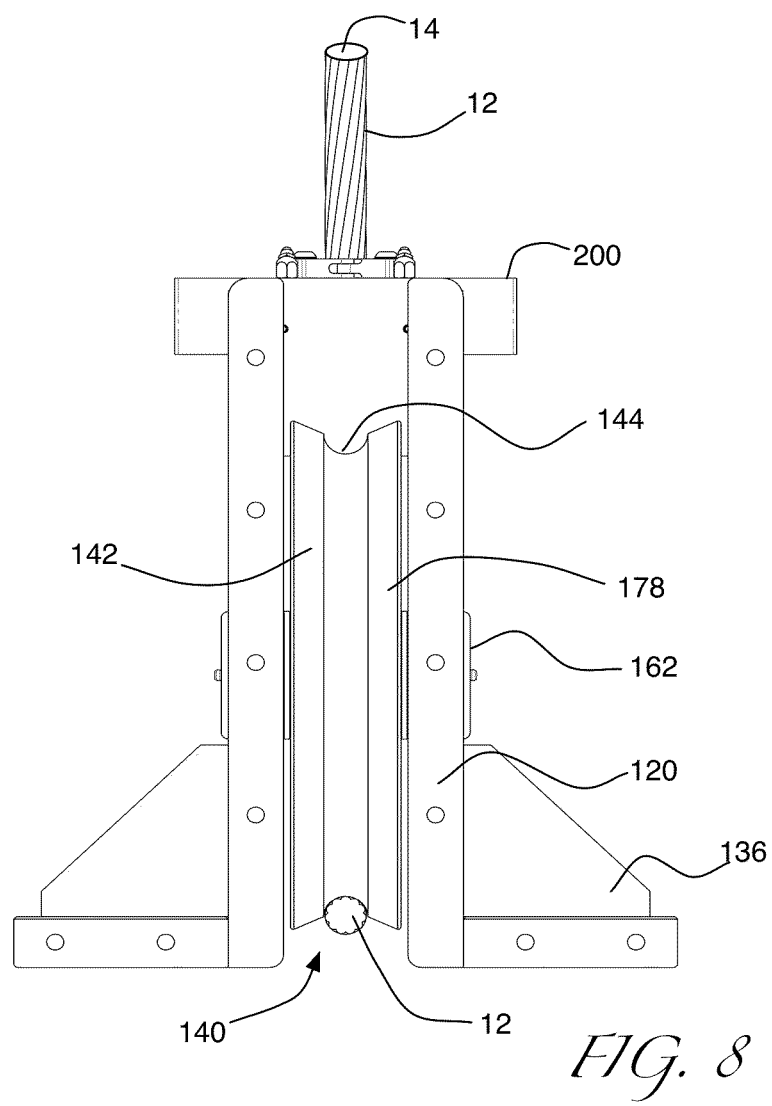
FIG. 8 is a rear view of the chassis component in FIG. 6 with the back plate removed.
Figure 9:
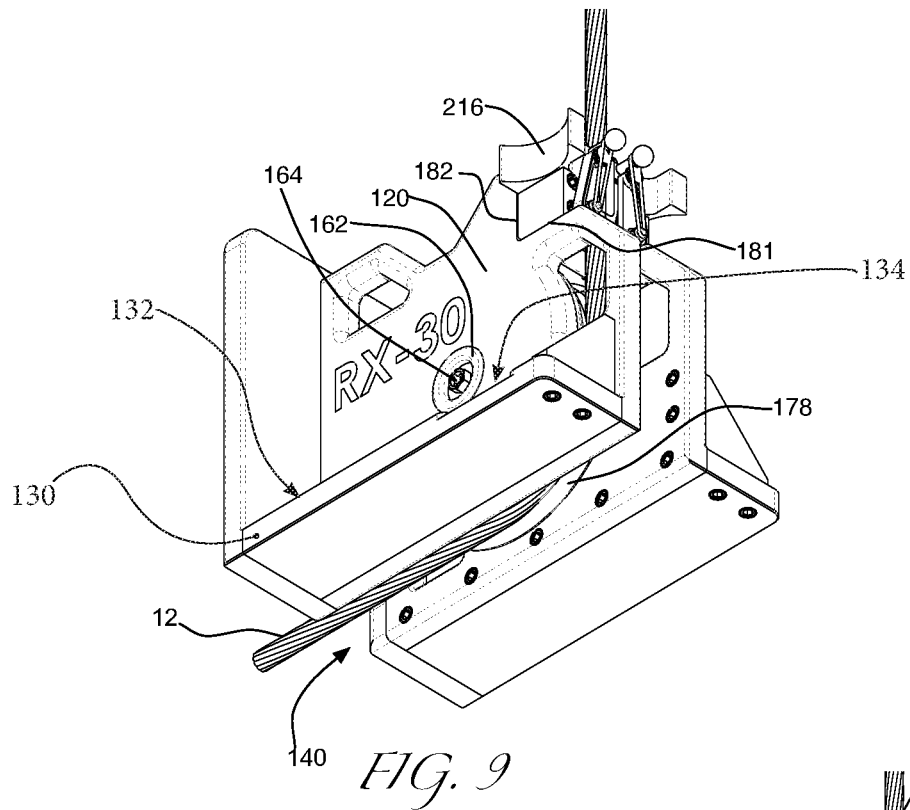
FIG. 9 is a side perspective view from below of the chassis component in FIG. 6.
Figure 10:
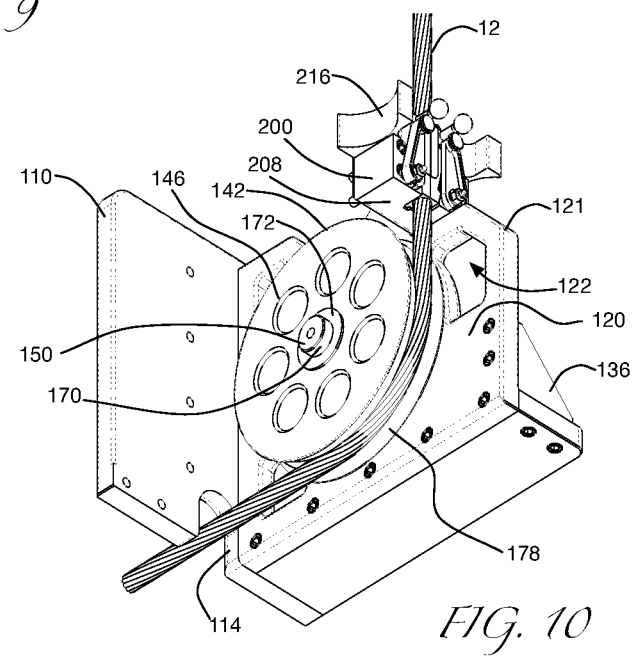
FIG. 10 is a side perspective view from below of the chassis component in FIG. 6 with the side wall removed.
Figure 11:
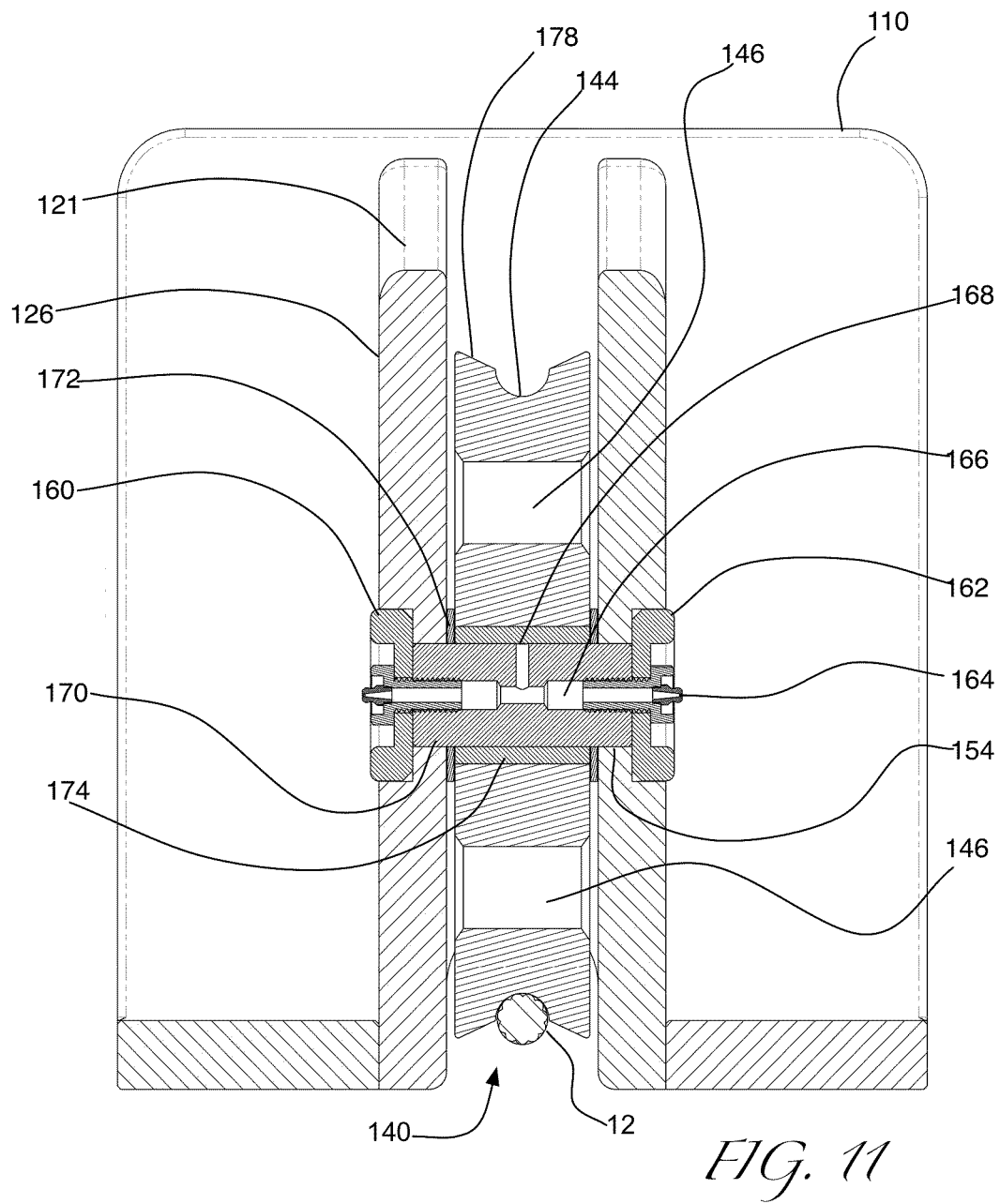
FIG. 11 is a cross-section of the chassis component of FIG. 6.
Figure 36:
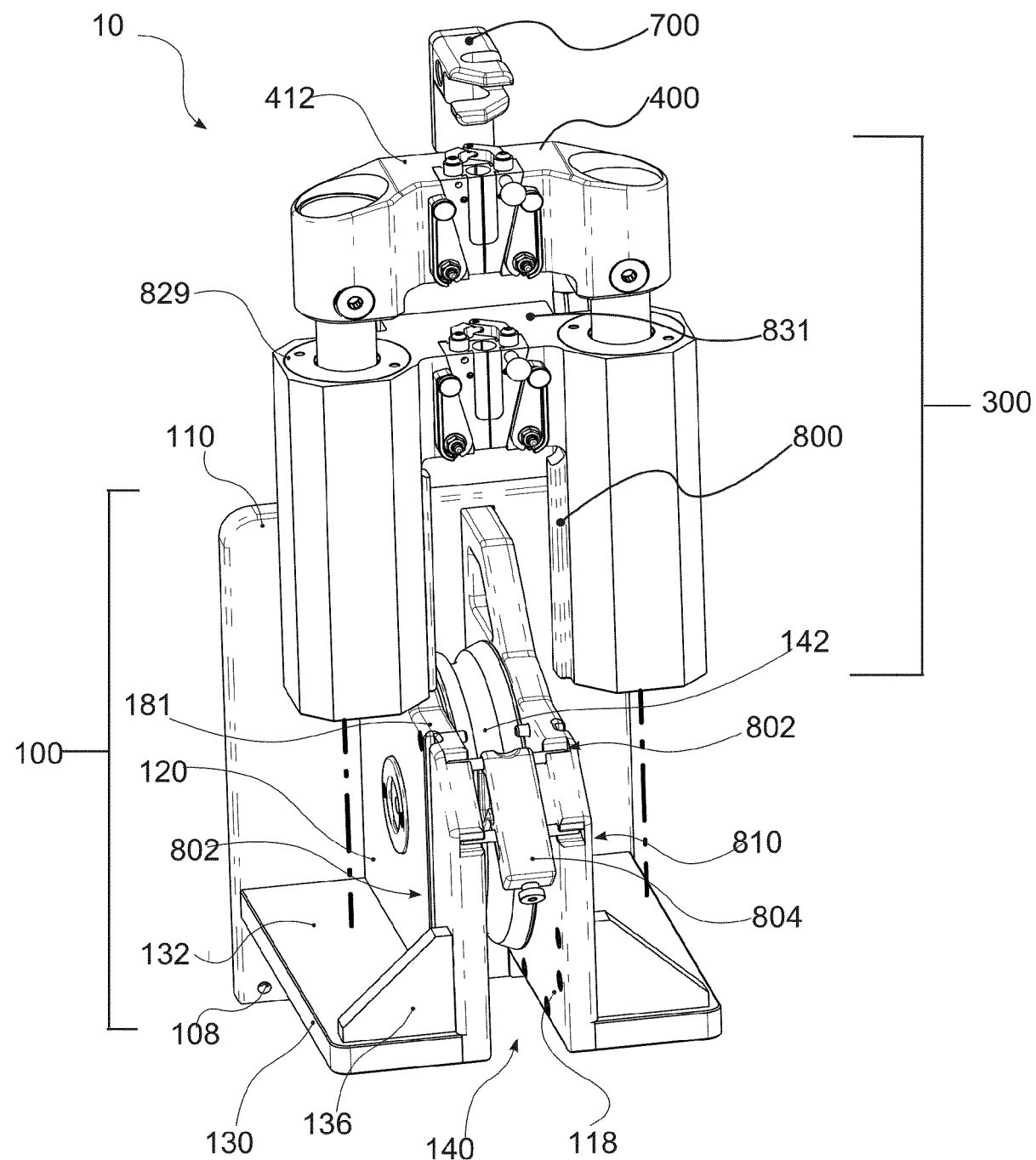
FIG. 36 is an exploded view of an open-path vertical cable pulling apparatus according to another embodiment of the present disclosure.

As illustrated in FIGS. 5 and 36, the vertical pulling system can comprise two detachable, engageable components: chassis component 100 and cylinder or cable pulling component 300 and includes a pair of self-releasing, open path cable engaging means. The apparatus or system further can comprise a cable retaining means, a cable guiding means, and/or means for accommodating a plurality of cable diameters.

In the apparatus embodiment illustrated in FIGS. 1-5, each of chassis component 100 and cylinder component 300 can include an open path, self-releasing cable engaging means, competent to receive a cable side surface laterally provided to the cable gripper assembly of the cable engaging means, as described in further detail below. As used herein, "self-releasing" is understood to mean that cable does not need to be threaded into or through a cable-engaging bore. In the embodiments illustrated in FIGS. 36, 38 and 44A-44B, the pair of self-releasing, open path cable engaging means can occur on one component, such as the cylinder component as illustrated in the figures.

The apparatus is compact, low weight, and occupies a small footprint in operation. In the vertical position the apparatus also has a low center of gravity and is not subject to tipping or vertical instability during pulling operation. As one non-limiting example, an apparatus having in the range of about 30 ton pulling force capability can have an overall weight in the range of about 130-150 lbs, with each of the chassis and cylinder components weighing in the range of about 65-75 lbs. and competent to be hand-carried by one or two persons. In the vertical position the apparatus footprint can be about 12 inches wide, about 16 inches long. The overall height of the apparatus can have a maximum range of between about 12-26 inches high during a cable pulling operation. In the horizontal position, the apparatus foot print can be about 12 inches wide, 12-26 inches long during a cable pulling operation, and about 16 inches high.

II. Integrated Chassis Component

FIGS. 6-13, and 36-40Cillustrate features of chassis component 100 according to several, non-limiting embodiments of the present disclosure. Chassis component 100 can be an integrated system comprising a frame; a cable direction converting means; and means for receiving and engaging a cable pulling device, including cylinder component 300. Chassis 100 also can include an open-path cable engaging means; an integrated cable vertical angle managing means; a cable retainer, and/or means for accommodating a plurality of cable diameters.

A. Chassis Frame

In one embodiment, illustrated at least in FIGS. 6-13, 36, and 40A, the chassis component frame can comprise back plate 110 and two parallel opposing foot plates 130 that extend forward from the bottom edge 116 of back plate 110. Foot plates 130, also referred to herein as floor plates, can be integral with back plate 110 or attached thereto by any standard means, including by bolting means 108. Side wall members 120 also extend forward from back plate 110 and vertically upward from foot plates 130, and can be attached thereto by any standard means, including by a plurality of bolts 118. In the figures, bolts 118 connect side wall member 120 to the inside edge of foot plate 130. It will be appreciated that side member wall 120 also can be attached to foot plate 130 by other means, including by bolting to upper surface 132 of foot plate 130.

Channel 140, which defines the space between opposing foot plates 130 and side wall members 120, can provide a channel through which cable 10 can be provided to the cable engaging means described below. A front brace 136 can provide support between the front edges of foot plates 130 and associated side wall members 120. Foot plates 130 can extend forward from the base of back plate 110, as illustrated in FIGS. 6-12, or they can be positioned higher up on back plate 110 and extend forward therefrom, as illustrated in FIGS. 36 and 40A.

Back plate 110 preferably can be a substantially solid plate that acts as a brace and a reaction plate when placed against a pit wall through which the cable protrudes. Opening 114 in back plate 100 provides an aperture through which cable 12 can pass. It will be understood by those having ordinary skill in the art that, if desired, back plate 110 or, alternatively, side member 120 back edges, also can be associated with an extraction cage or frame or other bracing means that can be placed between the pit wall and back plate 110. An extraction cage or similar bracing means also can provide an opening for receiving the bursting pipe when it is pulled through the pit wall into the pit interior.

Side wall members 120 and, optionally, back plate 110 also can have one or more weight reducing openings or cuts 122. Openings 122 also can serve as one or more handles for lifting and carrying or maneuvering chassis component 100 and/or apparatus 10.

Chassis component 100 optionally can include means for receiving and removably engaging cylinder component 300. In particular, chassis component 100 can comprise means for supporting and/or bracing hydraulic cylinders 600 of cylinder component 300. In one non-limiting example, illustrated in FIG. 9, foot plate 130 optionally can include a recess 134 in its upper surface 132 dimensioned to receive and accommodate the circumference of cylinder 600's bottom surface. In another, non-limiting example, illustrated in FIGS. 5 and 6, chassis component 100 can include a brace 216 for mechanically supporting and bracing cylinders 600.

Figure 37:
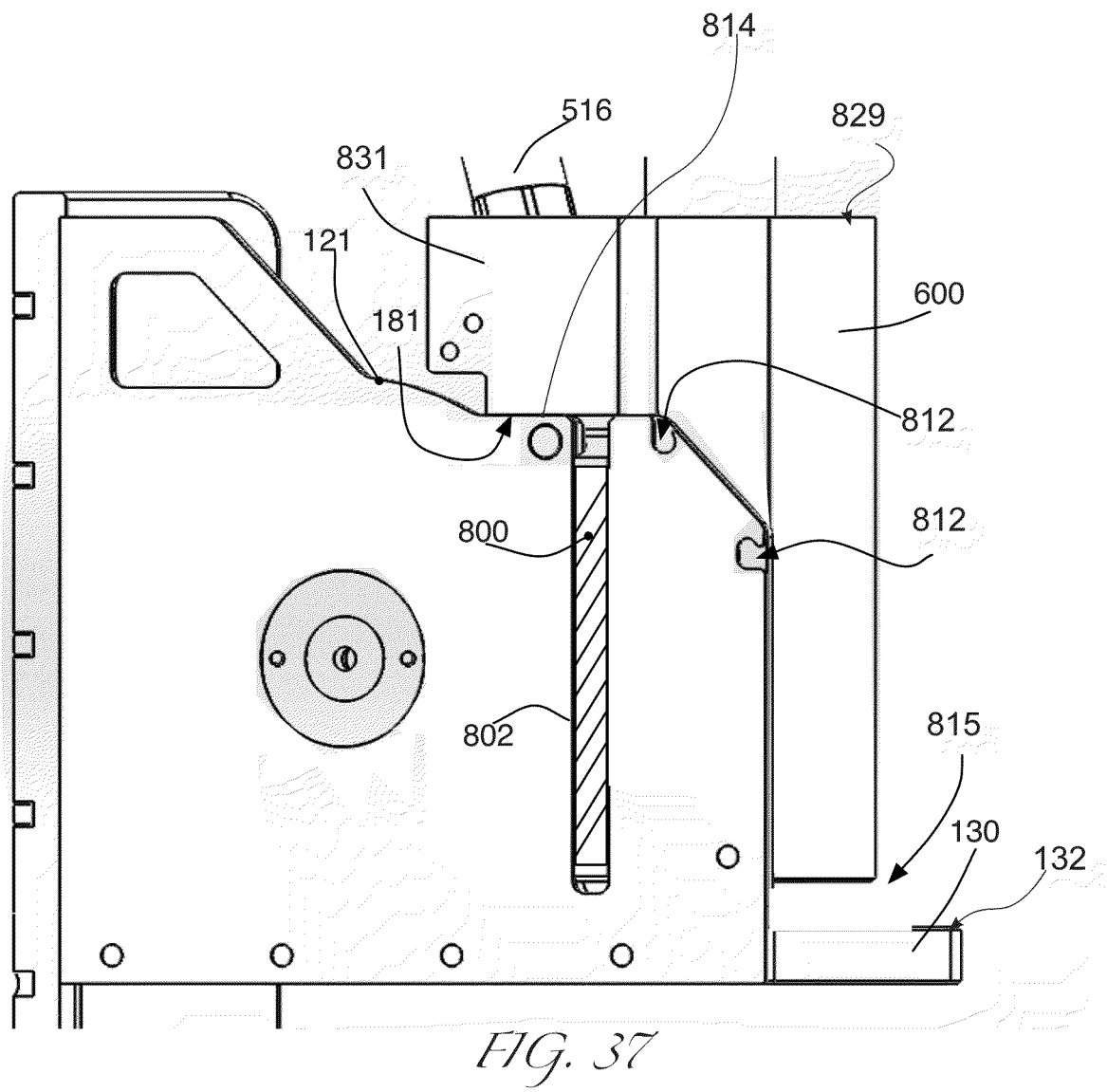
FIG. 37 is a side view of an open-path vertical cable pulling apparatus according to another embodiment of the present disclosure.

In another, non-limiting example, illustrated at least in FIGS. 36 and 37, chassis component 100 can mechanically engage, brace or support cylinder component 300 by means of a tongue-in-groove, ridge-in-slot, or tab and channel mechanism. In the figures, the inside edges of cylinders 600 have a tongue, ridge or tab 800 which slides into a channel, groove or slot 802 on chassis side walls 120. As will be appreciated by those having ordinary skill in the art, variations on this engagement means are envisioned provided with this disclosure, including, without limitation, reversing the location of the tabs and channels (tab on chassis, channel on cylinder component), providing a plurality of tabs and channels, and/or modifying the length of the tabs and channels. In addition, as illustrated in FIG. 37 for example, mechanical engagement of chassis component 100 with cylinder component 300 can be such that cylinders 600 do not engage with a chassis floor plate upper or top surface 132, allowing instead a gap 814 between cylinder floor and surface 132. In one embodiment, illustrated in FIGS. 37, 41, 42B and 42C, chassis bridge 200 is eliminated, cylinder component 300 can include a unitary casing 829 encasing cylinders 300 and including holding gripper assembly bridge 831 that spans cylinders 300 and includes holding gripper assembly 216. The bottom surface 814 of bridge 831 can engage with chassis frame ledge floor, providing additional cylinder component support and limiting the [positioning of cylinders 600 relative to chassis floor plate 132.

In still another non-limiting embodiment, illustrated in FIGS. 36, 38 and 39 and described detail below, chassis component 100 also can include a cable retention means 804.

B. Cable Direction Converting Means

FIGS. 8-12 illustrate one embodiment of a cable direction converting means useful in the chassis component and cable pulling apparatus of the instant disclosure. In the figures, the cable direction converting means can comprise a pulley wheel 142 having a center bore 154 competent to rotate freely about axle or shaft 170. It will be appreciated that a bushing 174 can separate wheel bore 154 from shaft 170 and, if desired, a washer 172 can separate bushing 174 from the inner surface of chassis side member wall 120.

In the figures, shaft 170 spans channel 140 and, in one embodiment, can be made stationary by attaching to side wall members 120 by any standard means. In the figures, side wall members 120 can comprise apertures 160 for receiving shaft terminal ends 150. Shaft terminal ends 150 can be attached to side wall members 120 by standard bolting means 152. Bolting means 152 can engage the side wall member directly or via axle cap 162 or other debris inhibiting aperture covering means.

In one preferred embodiment the cable direction converting means can include integrated lubricating means such that lubricating and/or anti-seize fluid or lubricant can be provided externally to the direction converting means without requiring disassembly of the mechanism. In the example where the direction converting means comprises a pulley wheel, means can be included for providing lubricant from an outside port to the shaft/bore interface, or the shaft/bushing interface. For example, as illustrated in the figures, bolting means 152 can include an integrated grease or Zerk fitting 164 and channel 166 through which a lubricating or anti-seize fluid can be supplied to an outlet or opening 168 on the shaft surface. It now is possible to lubricate the cable direction converting means as needed, before, during, and/or after use, without requiring disassembly of the mechanism. The integrated lubricating means can enhance device performance and efficiency in the field, as well as device maintenance, supporting product longevity.

In another embodiment, described in detail below and illustrated in FIGS. 40A-40C, shaft 170 can sit in an eccentric cradle 820. Rotation of cradle 820 is competent to move shaft 170 laterally or horizontally relative to the apparatus, such that the position of pulley wheel 142 is shifted forward or back relative to the chassis frame. Shifting pulley wheel positioning accommodates a plurality of cable diameters without impacting the desired vertical angle alignment of the cable in the apparatus, and also accommodates cable angle changes that may occur over time, typically due to cable wear on a pulley. In this embodiment, shaft 170 is not attached directly to a chassis side wall.

Pulley wheel 142 can comprise a central groove or channel 144, optionally with flanges 178, and dimensioned to receive cable 12. Wheel 142 also can include one or more weight reducing openings 146. It will be appreciated that the position and dimensions of back plate cable opening 114, the position of wheel shaft 170 on side member 120, and the diameter of wheel 142 are such that horizontally positioned cable 12 is lifted off the ground when associated with pulley groove 144 and wheel 142 can rotate freely about shaft 170 when cable 12 is pulled vertically about wheel 142. It also will be appreciated that preferred pulley wheel diameters can be determined and selected by a fabricator based on a number of standard considerations including, without limitation, choice of cable diameter, dimensions of chassis component, and pulling force parameters desired. As one non-limiting example, for low pressure flow vertical pulling systems of the present disclosure pulling cable in the range of at least about 0.5 inches to 0.9 inches in diameter, useful pulley wheel diameters can be in the range of at least about 6-16 inches, including in the range of about 8-14 inches. In another embodiment, cable diameters in the range of about 14-22 mm, or 9/16 \-⅞ inches are envisioned to be useful the apparatuses of the present disclosure.

In one embodiment, chassis component 100 also can comprise an open-path cable engaging means described in further detail below. Where chassis component 100 includes an open-path cable engaging means, illustrated for example in FIGS. 7, 12 and 13, the open-path cable engaging means preferably acts as a holding gripper assembly and is housed in chassis bridge 200. Preferably, bridge 200 can comprise a central section 202 housing a cable gripper assembly receiver 204. In one embodiment, bridge 200 also can comprise means for receiving hydraulic cylinders 600. For example, the cylinder receiving means can comprise concave recesses or brackets 216 at opposing ends of bridge 200, the recesses dimensioned to mirror and receive at least a portion of the cylinder outer surface. In one preferred embodiment, recess 216 functions as a brace or support for cylinder 600 when integrated cylinder component 300 is in position on apparatus 10. In the figures, bridge 200 includes an outward facing brace 216 at each opposing lateral terminal end 206 and the brace comprises a concave surface that mirrors the circumference radius of cylinder 600.

Figure 12:
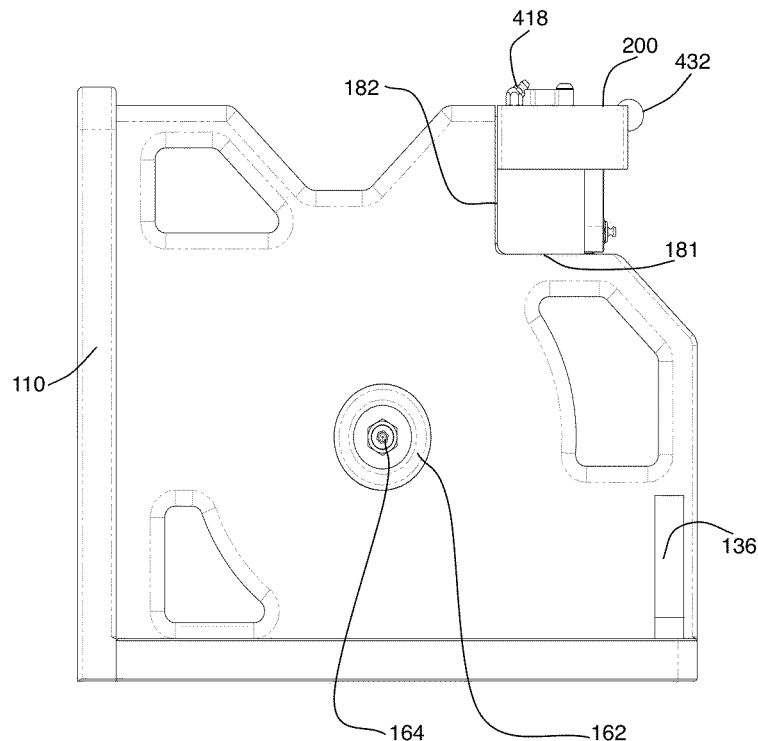
FIG. 12 is a side view of the chassis component of FIG. 6.
Figure 13:
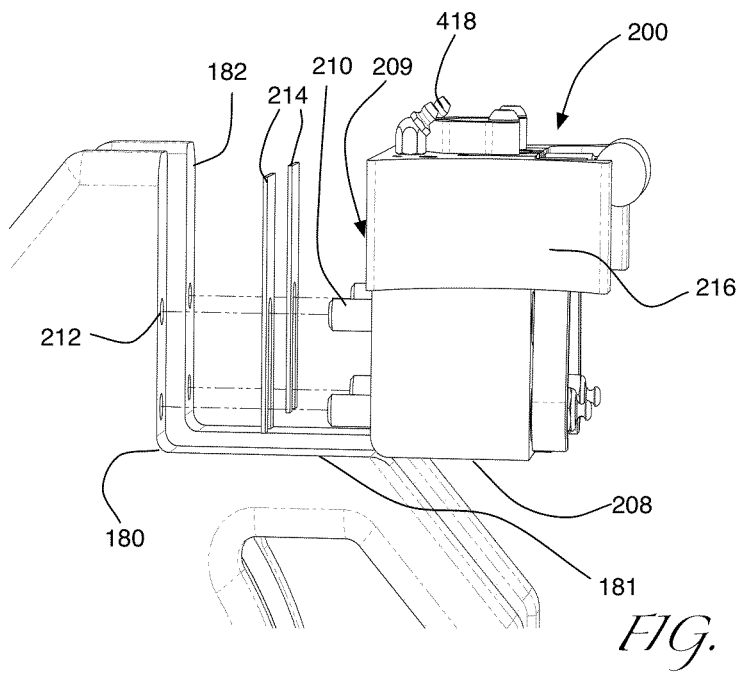
FIG. 13 illustrates optional shims for use in a chassis component according to one embodiment of the present disclosure.
Figure 14A:
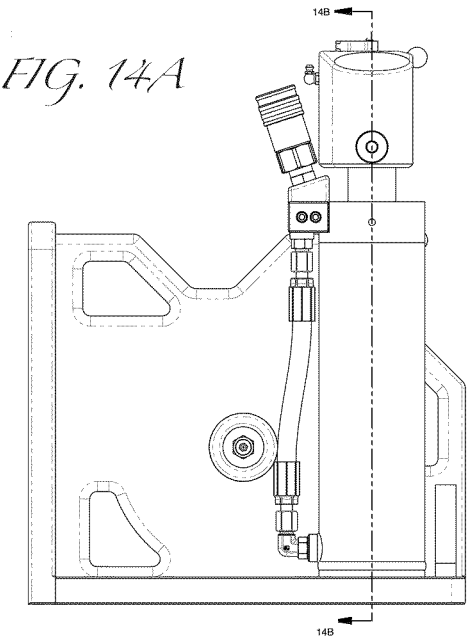
FIGS. 14A and 14B, respectively, are a side view and cross-section view of a cylinder component according to one embodiment of the instant disclosure.
Figure 14B:
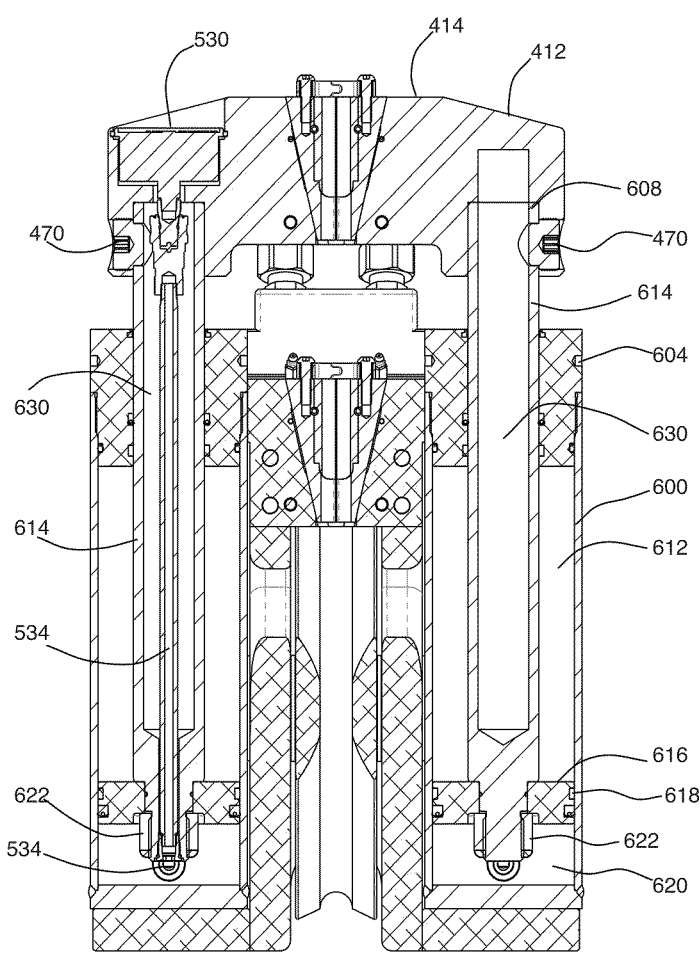
Figure 16:
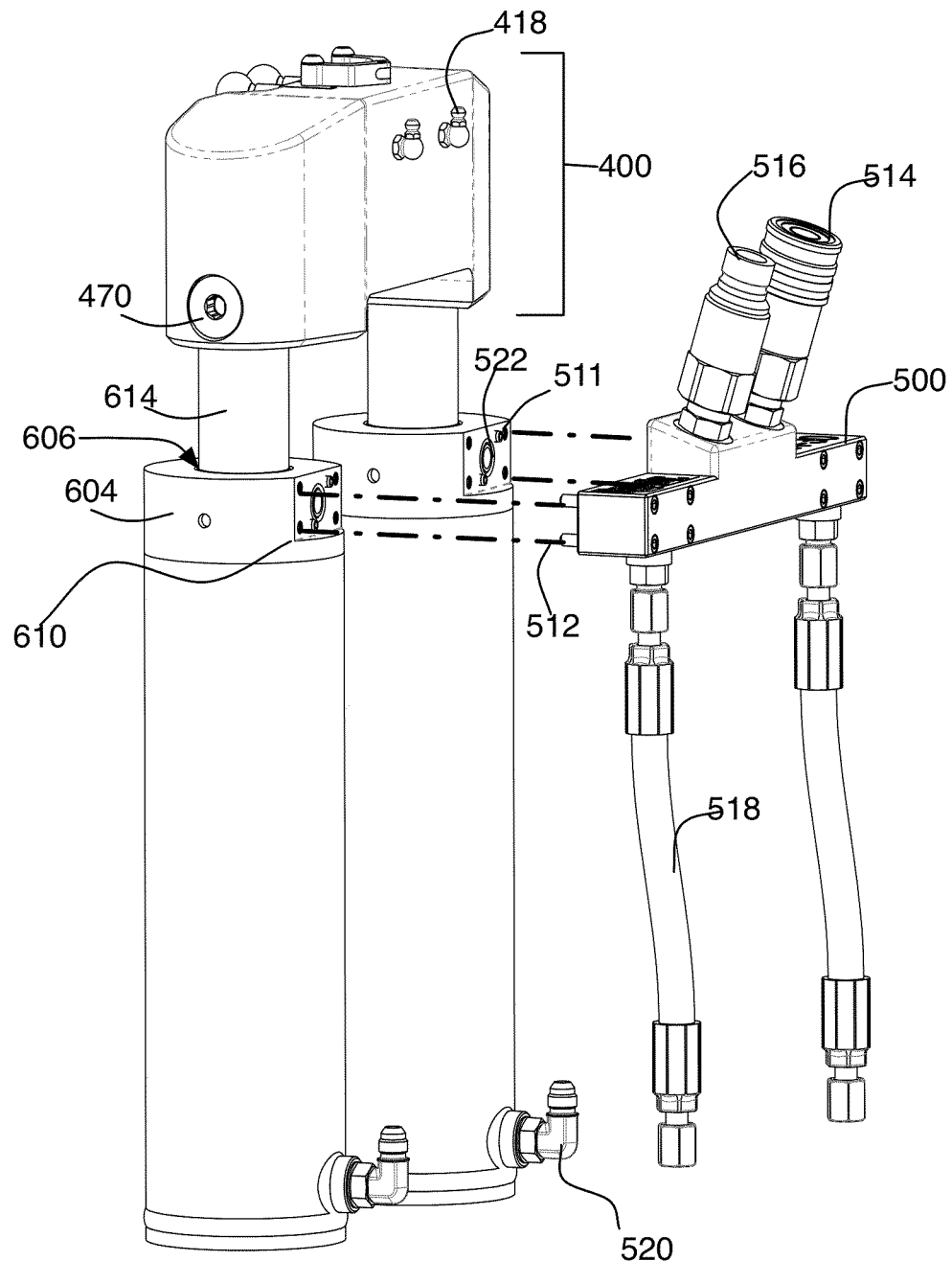
FIG. 16 is an exploded view of a cylinder component according to one embodiment of the present disclosure.

Bridge 200 can be attached to the chassis frame by any standard means. Referring to FIGS. 12 and 13, corresponding upper surface edges 121 of each side wall member 120 can be cut to provide a ledge 180 for receiving bridge 200. Specifically, ledge 180 can comprise a horizontal lower surface or floor 181 on which the bottom surface 208 of bridge 200 can rest, and a vertical surface or wall 182 projecting up from floor 181, against which the back surface 209 of bridge 200 can abut. Chassis bridge 200 can be attached to ledge 180 by any standard means, including by bolting. In the figure, bolting means 210 project laterally out from chassis bridge back surface 209 and into bolt holes 212 in ledge wall 182.

C. Integrated Cable Diameter Management Means

Another feature of chassis component 100 can include integrated means for managing vertical cable angle. For example, given the tension on cable 12 during a pulling operation, cable integrity can become compromised if the cable angle deviates substantially from vertical or is otherwise caused or encouraged to kink or bend during pulling. One example of how cable angle can deviate in a vertical system is by cable wear on the pulley wheel. Specifically, the pulling operation could cause cable 12 to deepen cable groove 144 over time, altering the position of cable 12 relative to the rest of apparatus 10, including a cable engaging mechanism in apparatus 10. The shift in position could shift the cable angle from vertical, which could compromise cable integrity.

In vertical pulling systems in the art, wear on a pulley wheel groove typically has required replacement of the wheel. Another example where cable angle can vary is when the cable diameter is changed. Different pulling operations, for example when pulling different diameter pipe, can require different cable diameters for optimal cable pulling performance. In vertical pulling systems, varying cable diameter can change the relationship of cable 12 to pulley groove or channel 144 and therefore to the vertical angle of cable 12 and the cable's position relative to pulling gripper means. Accordingly, in vertical pulling systems in the art, having the capability to use different cable diameters for different pulling operations generally has required having multiple pulley wheels available with different cable channel 144 radii, and selection of a cable with a different diameter typically has required changing the pulley wheel.

Apparatus 10 and chassis component 100 can overcome this deficiency in the art by providing a means for modulating vertical cable angle without requiring changing or otherwise altering pulley wheel 142. This means also can accommodate cables of differing diameters without needing to change out pulley wheel 142.

In one embodiment, illustrated in FIGS. 12 and 13, means are provided for modulating the position of chassis bridge 200 and its associated cable engaging mechanism relative to pulley wheel 142. Referring to FIG. 13, the position of bridge 200 on ledge 180 can be modified by adding shims 214 at the bridge/frame bolting interface, moving the position of bridge 200 and its associated cable engaging mechanism forward on the frame surface. In the figure, one shim is provided for each of the corresponding side wall members and includes openings for bolts 210 to pass through the shim and engage with bolt holes 212. It will be appreciated that a desired degree of forward positioning can be achieved by varying the thickness of the shim, by providing a plurality of shims to each bridge/ledge interface, and/or by providing one or a plurality of single shims configured to span both side wall members. Accordingly, in one non-limiting example, an operator using a low pressure flow vertical pulling system of the present disclosure with pulling forces in the range of at least about 28 tons now can utilize cables having diameters in the range of at least about 0.5-0.9 inches, including in the range of at least about 0.56-0.875 inches, without changing the pulley wheel.

In another, non-limiting embodiment, illustrated in FIGS. 40A-40C, vertical cable angle modulating means are provided for shifting the pulley wheel position relative to the chassis frame. In the figures, axle or shaft 170 sits in an eccentric cradle 820 associated with a frame side wall member 120, preferably held and rotatable in side wall member aperture 160. As used herein, an eccentric cradle is understood to comprise a rotatable bushing or similar hollow component with an interior opening dimensioned to receive and hold shaft 170, and comprising variable inner and out diameters, so as to create diametrically opposed walls of differing thicknesses. Referring to FIGS. 40B and 40C, eccentric cradle wall 822 has a different and narrower thickness than diametrically opposed cradle wall 824. Rotation of cradle 820 within side wall aperture 160 so as to reverse the position of walls 822 and 824 in aperture 160 from that shown in FIG. 40B to FIG. 40C has the effect of moving axle 170 and associated pulley wheel 142 horizontally rearward in the apparatus, towards back plate 110. It will be appreciated that, in the embodiment illustrated, a pair of eccentric cradles are used, one in each opposing side wall aperture and holding opposing ends of shaft 170. It also will be appreciated that, as illustrated in the figures, the wall thicknesses of the opposing cradles correspond. In the figures, for example, the rearward cradle walls of both cradles are of the same thickness 822, and the forward cradle walls of both cradles are of the same thickness 824. It further will be appreciated that effectively shifting of the pulley wheel position in the apparatus requires rotation of both eccentric cradles.

As will be appreciated by those skilled in the art, any useful means for securing rotatable cradle 820 to side wall member 120 is contemplated. In the figures, cradle 820 is secured by bolting means 826. Cradle 820 further can be coupled to a means for mechanically rotating cradle 820. In the figures, exemplary rotating means are provided by axle cap 162, which further can include a cradle or axle position indicator such as 828.

It will be appreciated that, provided with the instant disclosure, a plurality of wall thickness variations and shaft 170 or pulley wheel 142 position shifts now are possible. For example, FIGS. 40B and 40C illustrate two different, diametrically opposed wall thicknesses (822 and 824). For example, where the wall thickness variation between 822 and 824 is 0.04 inches, (wall thicknesses of, for example 0.21 and 0.29 inches, respectively) the total distance traveled or the total pulley wheel position shift by a 180° rotation of cradles 820 would be in the range of about 0.08 inches. This degree of variation in position can accommodate cable diameter ranges of 17-19 mm (or, 11/16 (0.6875) inches and ¾ (0.75) inches, respectively). Alternatively, diametrically opposed wall thickness variations between 824 and 822 of 0.170 inches (wall thicknesses of, for example 0.08 and 0.42 inches, respectively) can allow total position shifts of 0.340 inches in a 180° rotation of cradles 820, accommodating cable diameter ranges of between 14 mm-22 mm (9/16 inches and ⅞ inches, respectively).

Moreover, modulating the wall thickness between diametrically opposed cradle thicknesses 824 and 822 could accommodate additional cable diameter variations. In the non-limiting examples illustrated herein above and in FIG. 40D, four pulley positions can be available and four different cable diameters can be accommodated. For example, where 824 and 822 together could accommodate a 14-22 mm cable diameter range in a 180° rotation of cradles 820, modulating the wall thickness between positions 824 and 822 to accommodate a cable diameters of about 17 mm and 19 mm also is available. In this case, multiple indicators and/or indicator positions could be provided, as illustrated in FIG. 40D. In the figure, for example, indicator position 852 could represent a 22 mm cable diameter; indicator position 854 could represent a 19 mm cable diameter; indicator position 856 could represent a 17 mm cable diameter, and indicator_858 could represent a 14 mm cable diameter. It will be appreciated by those skilled in the art that other cable diameters and diameter ranges could be accommodated beyond those described here. It also will be appreciated that useful wheel pulleys comprises a gap or channel 144 of sufficient radius to accommodate the cable diameters contemplated for use.

Modulating the lateral position of pulley wheel 142 in the chassis frame relative to back plate 110 or the apparatus' open-path cable engaging means at the front of the apparatus can allow an operator to adjust a cable vertical angle as desired, such as, for example, to accommodate cables of differing widths, and/or to refine cable angle alignment. One non-limiting example where cable angle refinement may be desired is if, with use, cable wear increases the depth of cable groove 144, thereby shifting the relative position of the cable to the cable engaging means.

D. Vertical Cable Retainer

In another embodiment, mechanical means are provided for vertical cable retention. Referring to FIGS. 36-39B apparatus 10 and, preferably chassis component 100, can include a mechanical vertical cable retention means 804, also referred to herein as a cable retainer or a cable retainer device. Vertical cable retainers can be useful during set up and breakdown of cable pulling operations using vertical pulling machines or systems such as those described herein. During setup, mechanical cable retainer 804 can hold cable in place once the cable has been brought up and around the cable direction converting means. Activation of the cable retainer then can hold the cable in place on the machine while an operator positions the cable free end in the cable engaging means as described in detail below. Similarly, upon completion of a cable pulling operation, or during a pause in operations for any reason, the retainer can be activated, holding the cable in place, while an operator tends to releasing cable from the machine, including, for example, from the cable engaging means as described below.

Figure 38A:
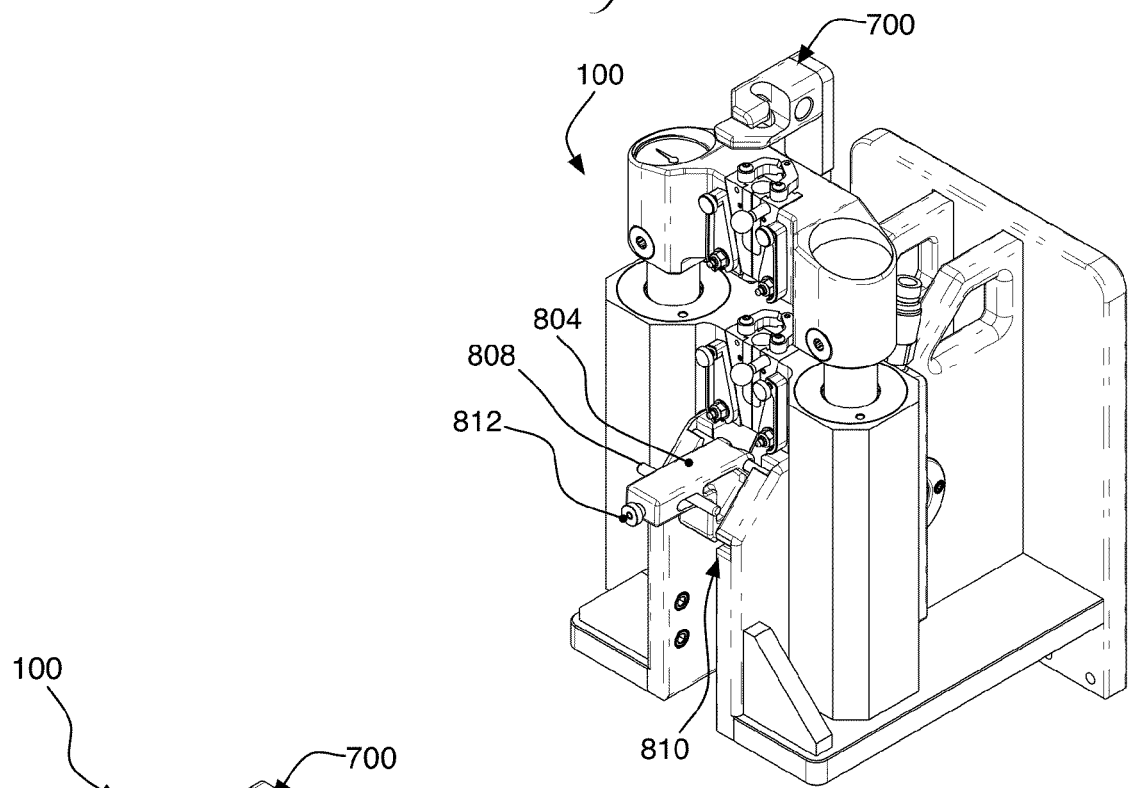
FIGS. 38A and 38B illustrate two positions of a cable retention device according to another embodiment of the present disclosure.
Figure 38B:
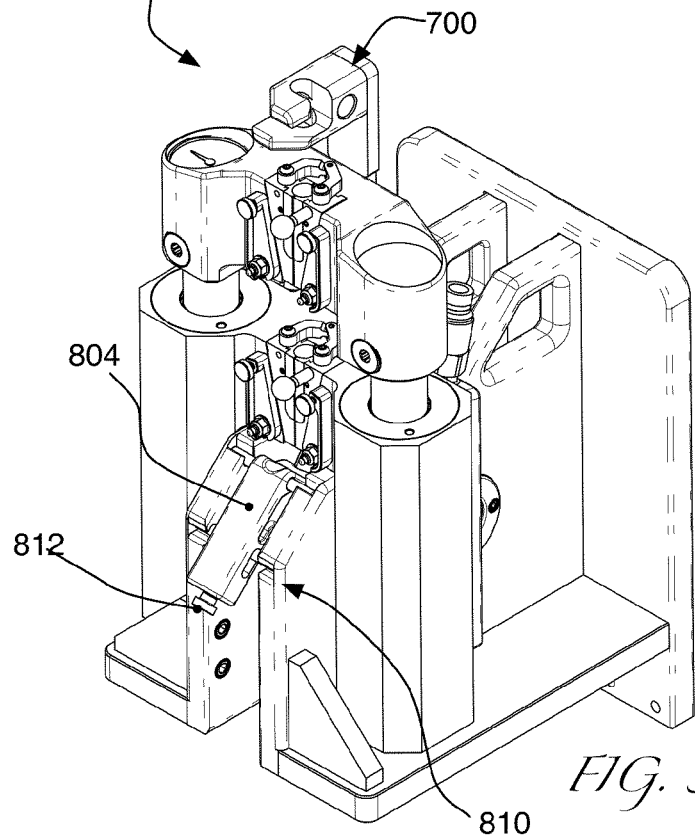
Figure 39A:
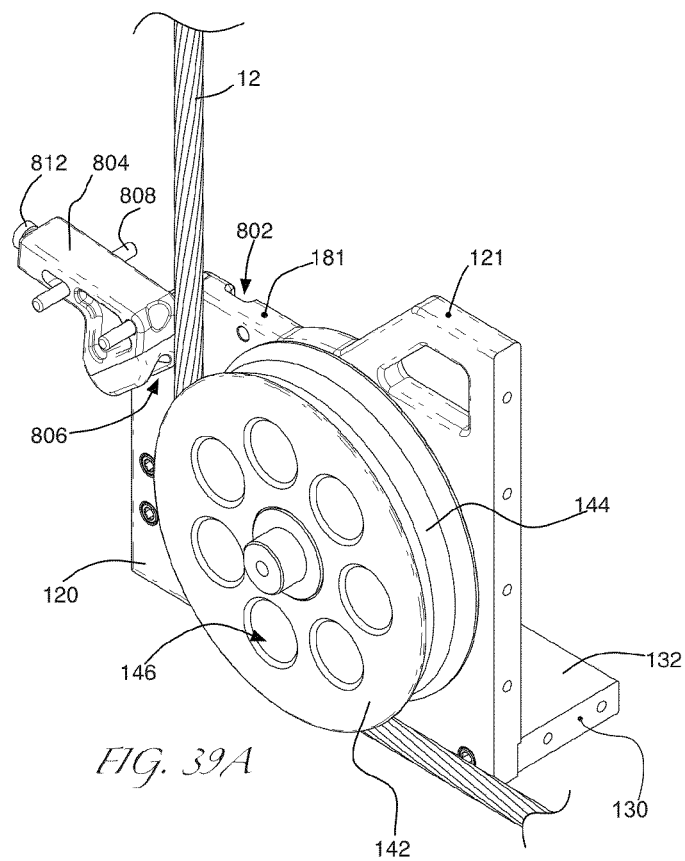
FIGS. 39A and 39B illustrate two positions of a cable retention device according to another embodiment of the present disclosure.
Figure 39B:
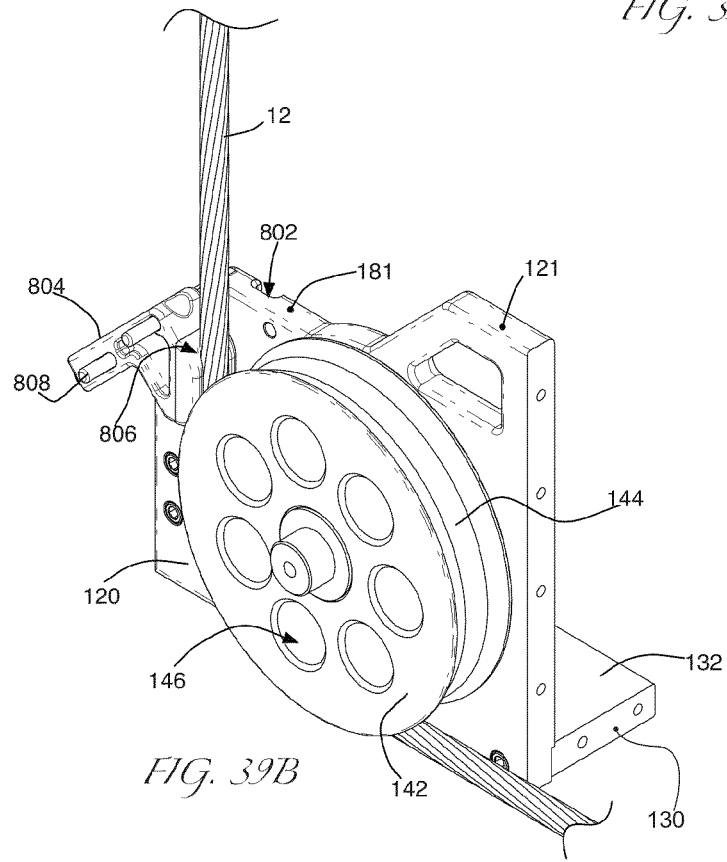

In the non-limiting embodiment illustrated, cable retainer 804 can comprise means for removably locking cable 12 on the pulley wheel channel 144. In the figures, retainer 804 spans opening 140 between the chassis side walls, and comprises a lever having a cable engaging surface 806, means for locking the lever in position on the cable, and means for releasing the lock. In one non-limiting embodiment, locking means can be provided by one or more locking pins 808 extending out from the retainer lever and which engage with corresponding locking catches 812 on chassis side walls. Pins 808 and catches 810 can be configured by any suitable means that make latching and release simple and quick. In one non-limiting example, pins 808 can be spring-loaded in retainer 804, activated and released by pulling on retainer releasing means 812, which action expands an internal spring-like mechanism extracting the pins along the retainer's longitudinal axis such that they are in position to engage with catches 810 and retainer cable engaging surface 806 is in position on cable 12. Release of retainer releasing means 812 then allows the spring to contract, retracting the pins back up the longitudinal axis of retainer device 804, which forward motion is inhibited by retainer catches 810, thereby locking retainer 804 in position on cable 12. To release the device, releasing means 812 is pulled, extracting pins 808 from catches 810, such that retainer 804 can be lifted off the cable surface. FIGS. 38A and 39A show retainer device 804 in the open or free, non-engaged position as would occur during a pulling operation, and FIGS. 36, 38B and 39B show retainer 804 in the locked, engaged position, as would occur during system setup and break-down.

III. Integrated Cylinder Component

Referring to FIGS. 6, 14-18, 36, 41 and 42A-42C, features of integrated cylinder or cable pulling component 300 are described. Cable pulling component 300 can be an integrated system comprising a cable pulling mechanism, an open path cable-engaging mechanism, and a hydraulic system for providing and managing hydraulic power for driving the cable pulling mechanism. In one preferred embodiment, the hydraulic system can be integrated into, and comprises part of, the cable pulling mechanism.

A. Cable Pulling Cylinders

The cable pulling mechanism of component 300 can comprise a pair of hydraulic cylinders 600. In one embodiment, cylinders 600 are coupled such that they are parallel and laterally opposed. In another embodiment, cylinders 600 can be coupled to one another by means of bridge 400. Bridge 400, also referred to herein as the "pulling bridge," preferably can house an open-path cable engaging mechanism described in more detail below. In one preferred embodiment, bridge 400 can comprise a central section 414 housing a cable gripper assembly receiver 416. Bridge 400 also preferably can include two parallel, opposing extensions 412, each extension comprising means competent to engage a cylinder 600. In another embodiment, at least one bridge extension 412 can include an integrated hydraulic pressure gauge display 530 competent to display fluid pressure inside cylinders 600. In one preferred embodiment, display 530 can be embedded in extension 412 such that the display surface is flush with, or recessed in, an upper surface of extension 412.

In one embodiment, illustrated at least in FIGS. 14-18, hydraulic cylinder 600 can comprise a substantially hollow cylinder body accommodating gland 604, rod 614, and piston 616. It will be appreciated that double-acting, single ended cylinders can be used to advantage in the cable pulling devices of the present disclosure. It also will be appreciated that piston 616 and associated piston seal 618 effectively separate the substantially hollow cylinder body interior into two reservoirs for receiving hydraulic fluid: barrel or rod-end reservoir 612 which occurs above piston 616, and piston or cap-end reservoir 620, extending below piston 616. Gland 604 preferably can include a central aperture or bore 606 on its surface through which rod 614 can pass. Hydraulic cylinders 600 can be coupled with the cable engaging mechanism by standard means, preferably by attaching the top terminal end 608 of rods 614 to pulling bridge 400. For example, bolting means 470 can engage with bolt holes 628 on top terminal rod end 608. It will be appreciated that the bottom terminal end of rod 614 can extend into or through piston 616 and include a rod cap 622.

In operation, fluid typically is delivered to and removed from barrel or rod-end reservoir 612 by a barrel reservoir delivery port 522, also known as a rod-end port. Similarly, fluid is provided to and removed from piston or cap-end reservoir 620 by piston reservoir delivery port 520, also known as a cap-end port. Typically, the power means for delivering fluid to a desired port is provided by an associated hydraulic pump, which can include an electric or gas-powered motor, and a selector valving means for controlling fluid direction. An external reservoir means also can be included which can house the fluid to be delivered to a port and receive fluid extracted from a port.

It will be appreciated by those having ordinary skill in the art that fluid delivery into piston reservoir 620 and out of barrel reservoir 612 pushes piston 616 up the cylinder body interior. This action provides the cable pulling stroke, pushing rod 614, and associated pulling bridge 400 and cable engagement mechanism, upward. When the cable engagement mechanism is engaged with a surface of cable 12 as described in more detail below, the pulling stroke pulls cable 12 upward or vertically. In the recovery stroke, initiated when piston 616 is at or near the top of barrel reservoir 612, fluid is removed from piston reservoir 620 and provided to barrel reservoir 612, effectively pushing piston 616 and coupled rod 614 down the cylinder body interior. During the recovery stroke the cable engagement mechanism preferably is disengaged from the surface of cable 12, and downward movement of rod 614 and associated bridge 400 occurs independent of cable 12. Preferred pulling and recovery strokes lengths can vary at least by the cylinder volume, hydraulic pressure, rod lengths, and rod and piston weights selected. Useful operational stroke length ranges typically can be in the range of at least about 3-16 inches. One useful stroke length can be at least in the range of about 6-12 inches, including about 10 inches.

In one preferred embodiment, the hydraulic powered cable pulling system provided herein can provide pulling forces of at least about 28 tons and above and operates under low fluid pressure, typically at least in the range of about 2,400-3,000 psi. It will be appreciated by those skilled in the art that low pressure hydraulics have the advantages of higher flow per power unit output and reduced friction and wear on component parts, as compared with corresponding high pressure units using pressures over 3,000 psi, including pressures in the range of at least about 3,600-10,000 psi.

Another advantage of low pressure pulling units is that the power source for moving hydraulic fluid in and out of cylinder body 602, also known as the hydraulic pump, generally can reliably be supplied completely by standard field equipment motors already intended for use at a job site independent of pipe materials, pipe, diameters, routes and ground conditions of a given cable pulling job. Examples of useful field equipment motors can be found in a compact or mini-excavator, tractor, backhoe, front loader and the like. By contrast, high pressure units, including units requiring pressures over 3,000 psi and/or pressure ranges of at least about 3,600-10,000 psi, require special hydraulic pump motors to reliably run the unit in a range of operational field conditions, including variable ground conditions, and/or having the capacity to accommodate a range of pipe diameters and pipe materials to be pulled. Special hydraulic pumps have several disadvantages for a consumer or operator, including additional equipment purchase expense and maintenance, and constituting an additional component to be transported to and from a job site.

The hydraulic cylinders disclosed herein can provide desired pulling forces using high flow, low fluid pressures without compromising the compact size and weight that a low flow, high pressure pulling unit potentially can offer. In one embodiment, illustrated in FIGS. 14-15, the desired compact cylinder size and weight can be achieved by reducing the weight of rod 614. In one example illustrated in the figures, rod 614 can be fabricated to comprise a substantially hollow interior cavity 630. Cavity 630 can be created by any standard means, including, for example, by gun-drilling rod 614. Those skilled in the art can calculate useful parameters for cavity 630 without undue experimentation. Useful rod cavities 630 can be fabricated for example having wall thicknesses in the range of at least about 0.15-0.35 inches. In one non-limiting example, for a cylinder 600 useful for pulling cable with a pulling force in the range of about 28-32 tons as described herein, cylinder 600 can have a volume in the range of about 80-90 cubic inches, including, without limitation, about 80 cubic inches, and a square area in the range of about 9-10 inches, including, without limitation, a square area of about 9.6 inches, and cavity 630 can have a wall thickness of about 0.25 inches. In this example, cylinder 600 can have a weight of less than about 20 lbs, including in the range of about 16-19 lbs, including about 18 lbs. The cylinder pair together can have a weight of less than about 40 lbs, including in the range of at least about 32-38 lbs, including about 36 lbs; a useful combined volume of about 170 cu. inches; combined square area about 19.2 inches; and a stroke speed of about 1.6 inches/second, or about 8 ft/min, at 10 gpm.

In another non-limiting example, for a cylinder 600 useful for pulling cable with a pulling force at least in the range of about 75-85 tons, the cylinder pair together can have a useful combined volume of about 564 cubic inches, a square area of about 56.4 inches, and a stroke speed of about 0.66 inches/second, or 3.4 ft/min, at 10 gpm.

In still another embodiment, illustrated in FIGS. 36, 38A-38B, and 41, and as described in detail below, cylinder component 300 carries both cable engagement means. In this embodiment, chassis component 100 does not include chassis bridge 200 with holding cable gripper assembly receiver 204 or cylinder braces 216 for engaging with cylinder glands 604. Also in this embodiment, cylinders 600 are integrated into a unitary casing 829 that couples cylinders 600 and includes a bridge 831 housing holding gripper assembly receiver 204. In addition, and as described in detail below, in this embodiment, cylinder component 300 also includes an integrated hydraulic system 830 that comprises part of casing 829, eliminating the need for an external hydraulics manifold 500, which could connect with external cylinder glands 604. In this embodiment, the additional height provided by external gland 604 used to connect with hydraulics manifold 500 can be eliminated, providing additional space and weight savings to the apparatus without compromising stroke speed or pulling force.

B. Hydraulics

Rod cavity 630 also can provide a means for integrating hydraulic pressure measurement means in the interior of pulling component 300 thereby reducing potential damage to the measurement means that can occur with an externally fixed fluid pressure measuring means. In one example illustrated in FIGS. 14-16, pressure gauge readout display 530 can be embedded in pulling bridge extension 412, and operationally coupled to pressure gauge channel 532 that extends down through cavity 630 and terminates in gauge port 534.

In the non-limiting examples illustrated in herein, male and female quick-connect coupler ports 516 and 514, respectively, can transmit fluid delivered by hydraulic pump (not shown) to and from cylinders 300. In the embodiments illustrated in FIGS. 14-15 for example, hydraulic fluid can be transmitted through ports 520 and 522. In one embodiment, a hydraulics manifold 500 can house couplers 516 and 514 and channel means for transmitting fluid between the couplers and the ports. Hose 518 can provide means for transmitting fluid from manifold 500 to cap-end port 520. It will be appreciated that one quick-connect coupler can be associated with the two cylinder cap-end ports, and the other coupler can be associated with the two rod-end ports such that piston movement through both cylinders is synchronized and in the same direction.

Hydraulics manifold 500 can be coupled to cylinder component 300 by any standard means. In one non-limiting example, manifold 500 can be coupled to cylinder gland 604 by standard bolting means including, for example, by bolts 512 that engage with bolt receiving apertures 511 on gland 604. In one embodiment, the manifold receiving outer surface of gland 604 can include a ledge or shelf 610 dimensioned to receive and mate with the bolting surface of manifold 500. Engaging manifold 500 with gland 604 can have the added benefit of inhibiting vertical movement of gland 604 during cable pulling operation. Alternatively, other means can be provided for limiting cylinder and/or gland movement if needed. In one non-limiting example, illustrated in FIG. 18, a rotatable retention arm 426 can be provided on chassis bridge 200, preferably engaged with a top lateral surface edge of bridge 200 adjacent cylinder 600 such that retention arm can rotate over and extend onto cylinder gland upper surface 609. When not in use, retention arm 426 can be rotated back over bridge 200.

Figure 41:
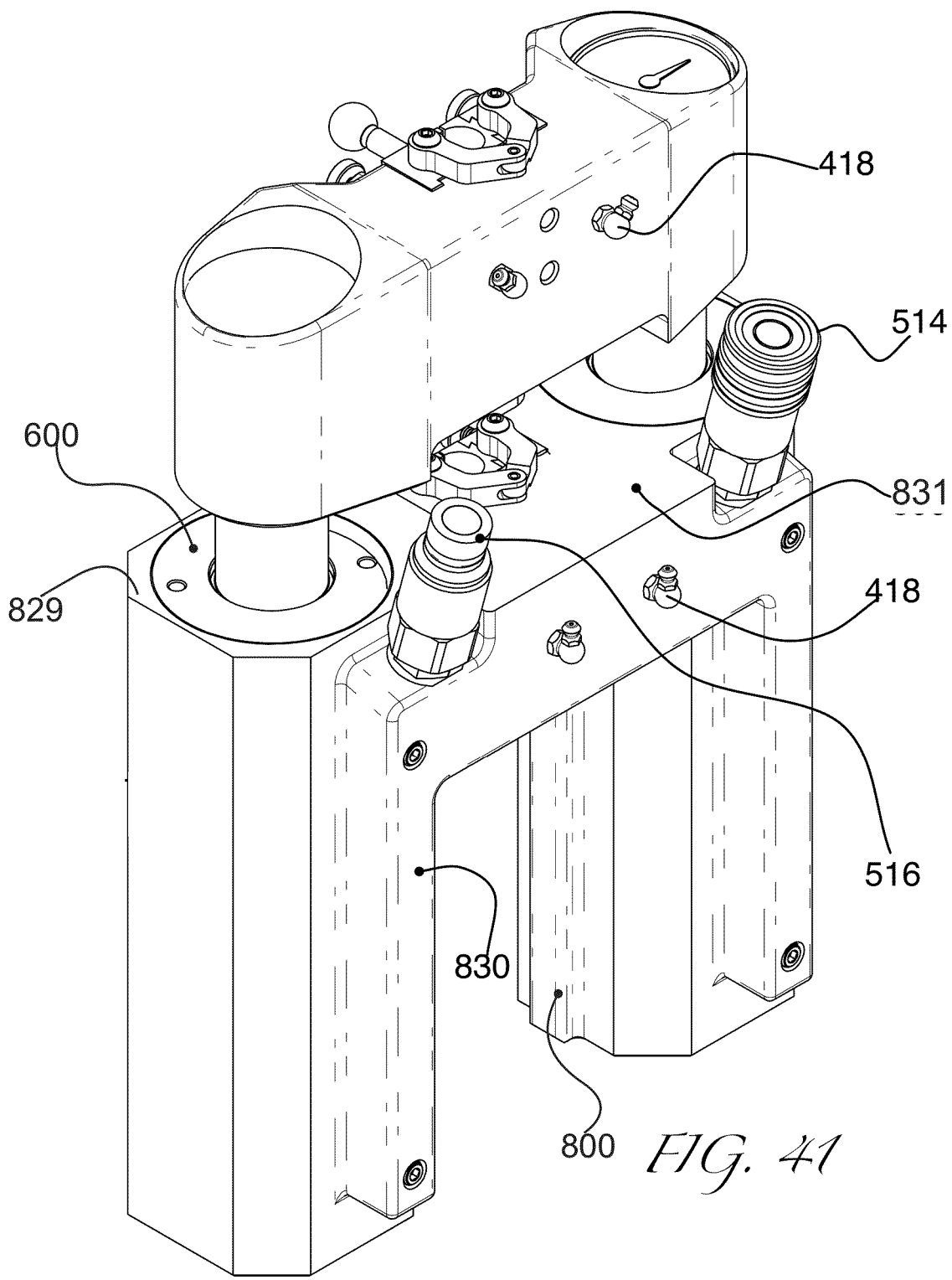
FIG. 41 illustrates a cylinder component of a vertical cable pulling apparatus according to another embodiment of the present disclosure.
Figure 42A:
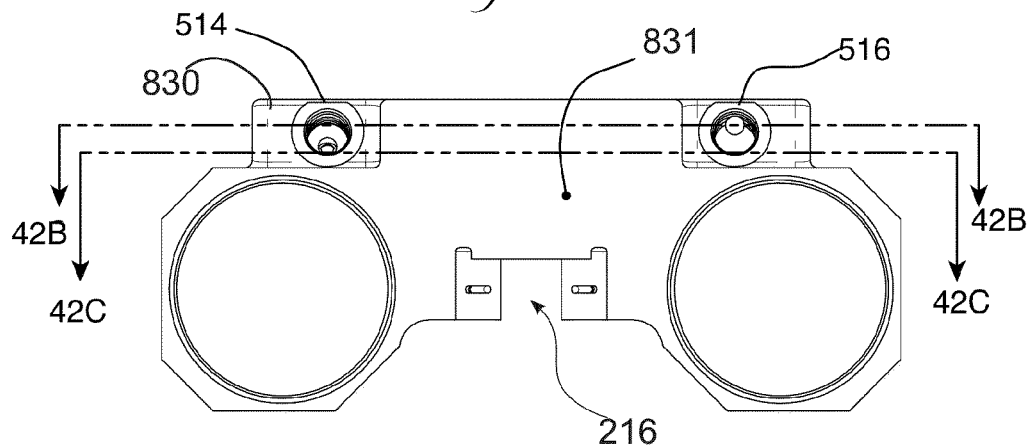
FIGS. 42A-42C illustrate integrated hydraulic fluid chambers in a cable pulling apparatus according to one embodiment of the present disclosure.
Figure 42B:
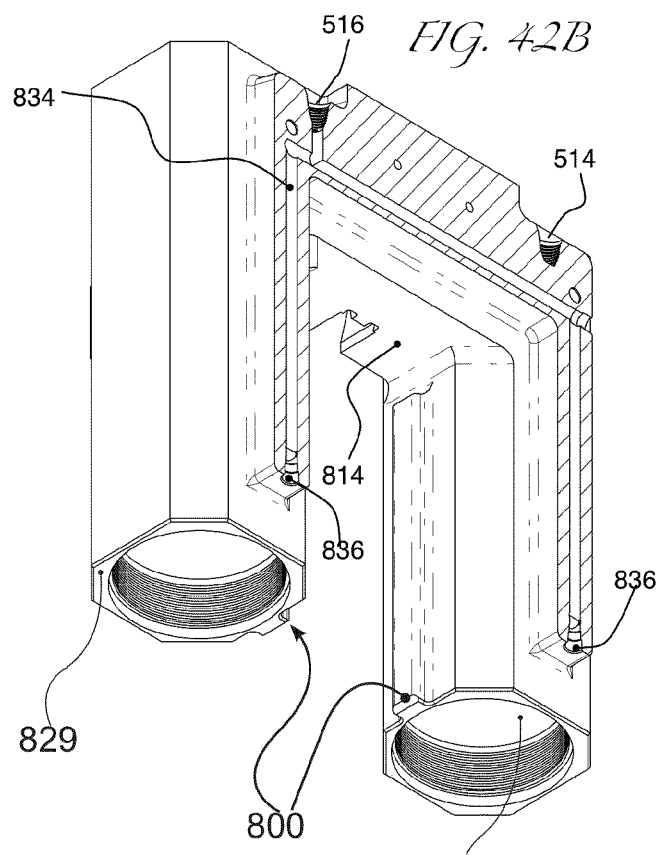
Figure 42C:
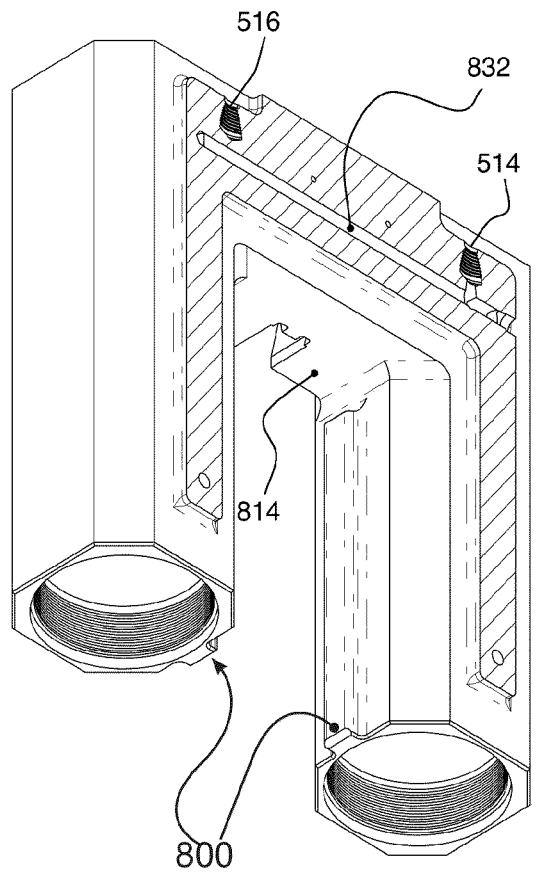
Figure 43A:
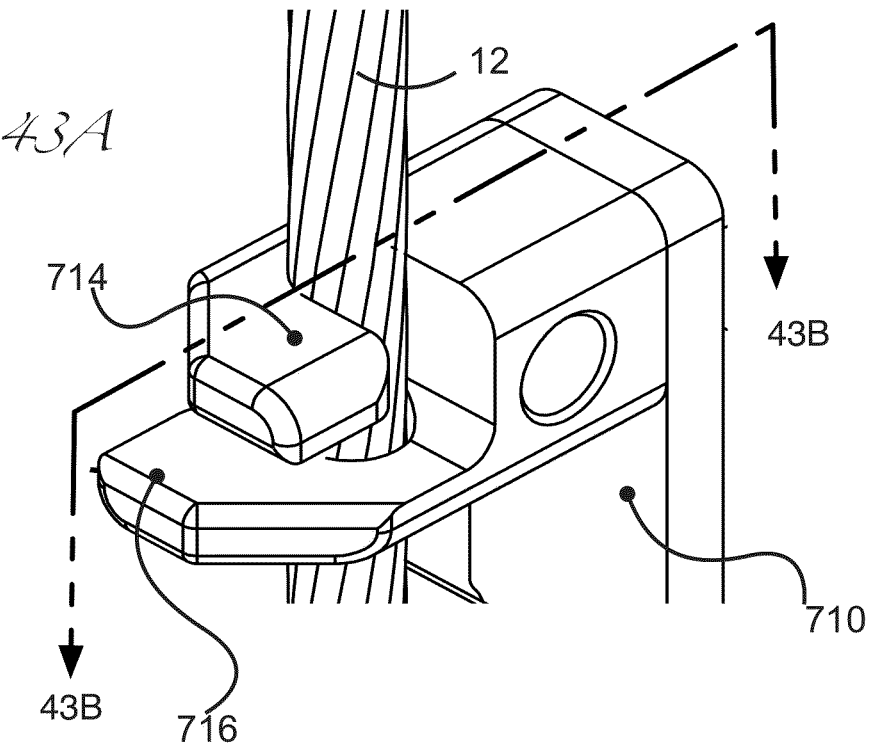
FIGS. 43A and 43B illustrate a cable guide mechanism according to one embodiment of the present disclosure.
Figure 43B:
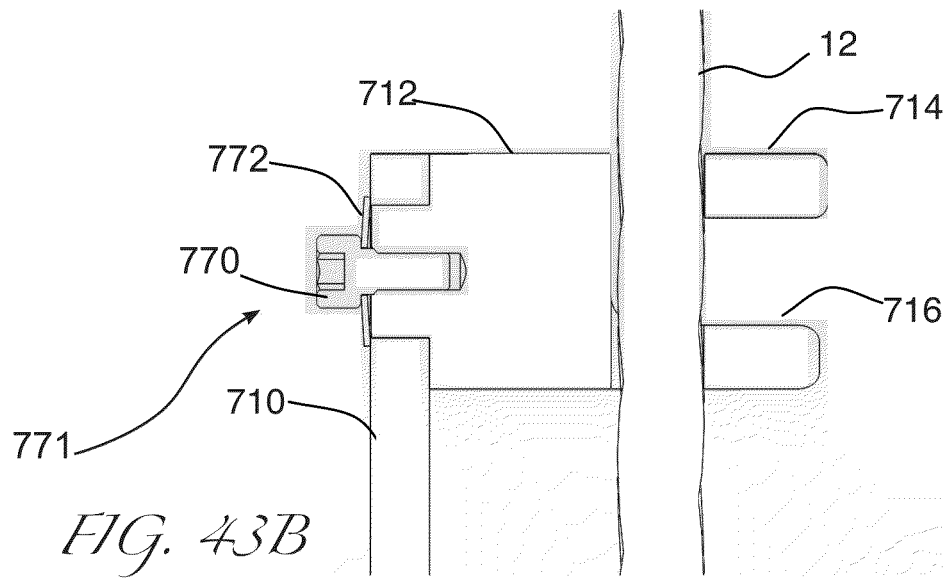

In still another embodiment, illustrated in FIGS. 41 and 42A-42C, hydraulic fluid channels are integrated into an internal hydraulics manifold 830 that further can comprise part of a unitary cylinder component casing 829 coupling cylinders 600, and which includes a holding gripper assembly bridge 831. As illustrated in FIGS. 42A-42C, integrated hydraulics manifold 830 can include an integrated channel 834 competent to transfer fluid between coupler port 516 and piston cap end 836, analogous to hose 518 in FIGS. 14-16. Hydraulics manifold 830 further can include a channel 832 for transferring fluid between port 514 and the barrel reservoir.

IV. Open-Path Cable Engaging Means

Exemplary open path cable-engaging means and mechanisms now will be described. In the examples, the mechanism is the same for the cable engaging means contemplated for holding bridge 200 or 831, and for the cable engaging means contemplated for cylinder pulling bridge 400. Accordingly, while the cable engaging means examples illustrated and described hereinbelow are primarily in reference to the mechanism for pulling bridge 400, the same mechanism and components apply to the cable engaging means on chassis holding bridge 200 (FIGS. 5 and 6) or cylinder component holding bridge 831 (FIGS. 36, 41, 42A). Further, identically referenced components in the holding and pulling bridges are understood to be functionally equivalent.

Referring now to FIGS. 19-26, an open path cable engaging means is described, competent to receive and engage a cable side surface laterally provided to the engagement means. The open path cable engagement means disclosed herein includes an independent cable gripper assembly 417 and a receiver 416 located on a bridge and dimensioned receive and engage assembly 416.

Cable gripper assembly 417 preferably can comprise a cable gripping device 484 comprising two opposing cable gripping members 423, each member 423 being a mirror image of the other. Each cable gripping member 423 includes: (1) an inner, cable gripping surface 486, dimensioned to contact and engage a cable surface, and (2) an outer side surface 474 dimensioned to contact and engage with an inner side surface 438 of receiver 417, as described below. Preferably, inner gripper member surface 486 is substantially concave such that the two inner surfaces 486 of gripper members 423 together define a cable bore or channel 472 dimensioned to receive and engage a cable side surface. It will be appreciated that inner surface 486 preferably is textured to enhance the surface's ability to dig into or "bite" the cable. One common means for creating a "biting" texture on a cable gripping surface is by forming a threaded or grooved texture, also know as "teeth" on the cable gripping surface.

In one embodiment cable gripping device 484 can comprise a coupling means 464 for tethering gripper members 423 together. Coupling means 464 preferably can include: (1) a moveable joint or hinging means 465 competent to link gripper members 423 and also allow them to come together and move apart; and (2) an attachment means for attaching coupling means 464 to gripper device 484. In one preferred embodiment coupling means 464 can be configured to have a low profile and/or lie substantially flush with a surface of assembly 417 and/or receiver 416 so as not to interfere with cable pulling operation. In another embodiment, hinging means 465 can be located near or about the back surface of gripper assembly 417. As illustrated in the figures, one embodiment of coupling means 464 can include a hinge pin 444, a pair of hinge arms 441 that extend out from hollow, interlocking knuckles or nodes 445 through which pin 444 passes, and bolt holes 448 at the free terminal ends of hinge arms 441 for receiving a bolt 446 that attaches coupler means 464 to gripper device 484.

In another embodiment, gripper assembly 417 can include a handle means 432 useful for lifting, maneuvering, and positioning assembly 417 relative to receiver 416. In one embodiment, handle 432 can extend forward horizontally from the front lateral surface of gripper device 484. In another embodiment, handle 432 can extend forward horizontally from the front lateral surface of a gripper member 423. Handle 432 can be integral to gripper member 423 or attached thereto by standard means, including by standard bolting means. In the figures, each gripper member 423 includes a handle 432. It will be appreciated that, where a handle is desired, only one handle would be needed to maneuver and lift assembly 417. Providing a handle 432 on each gripper member 423 can be useful for ease of function by an operator in the field. It also will be appreciated by those having ordinary skill in the art that handle 432 can have any shape and size. Preferred handle dimensions and shape considerations include ease of access and function by an operator, durability, and non-interference with other components during a cable pulling operation.

Gripper member 423 can comprise a single unit or include a gripper insert 420 and a gripper body 422. A detailed description of gripper inserts is disclosed in copending patent application USSN 15/681048, filed Aug. 18, 2017, the disclosure of which is incorporated herein by reference. Using cable gripper inserts can be advantageous as it allows the gripper member's cable gripping surface and gripper body to be composed of independent materials best suited for each component's function. In particular, a cable gripper body typically is engineered and fabricated to absorb and sustain loads that cable pulling requires, and the ferrous metal selected, typically steel, preferably is soft enough to absorb these loads. Conversely, cable gripping surfaces preferably comprise a hard metal competent to maintain the texturing or "teeth" on the gripper surface that "bite" into the cable during a cable pulling operation. By selecting individual metals that best match the different function of gripper body 422 and gripper insert 420, one can fabricate and/or select a gripper member 423 and cable gripping device 484 of enhanced integrity, longevity and stability.

In the pipe bursting and trenchless pipe replacement industries, useful insert metals can include metals having a Rockwell rating greater than 62. Carbide steel, for example, may be used to advantage. Gripper bodies can be fabricated of a metal having enhanced load bearing capacity. Such metals may have a Rockwell hardness rating of 41 or below. In addition, a variety of metal curing or heat treatments can be used, particularly for the fabrication of gripper bodies. Moreover, by using removable inserts 420, the longevity of gripper 423 is enhanced and conserved because only the insert needs to be replaced in the event the textured surface or teeth become worn on the cable gripping surface.

Figure 21:
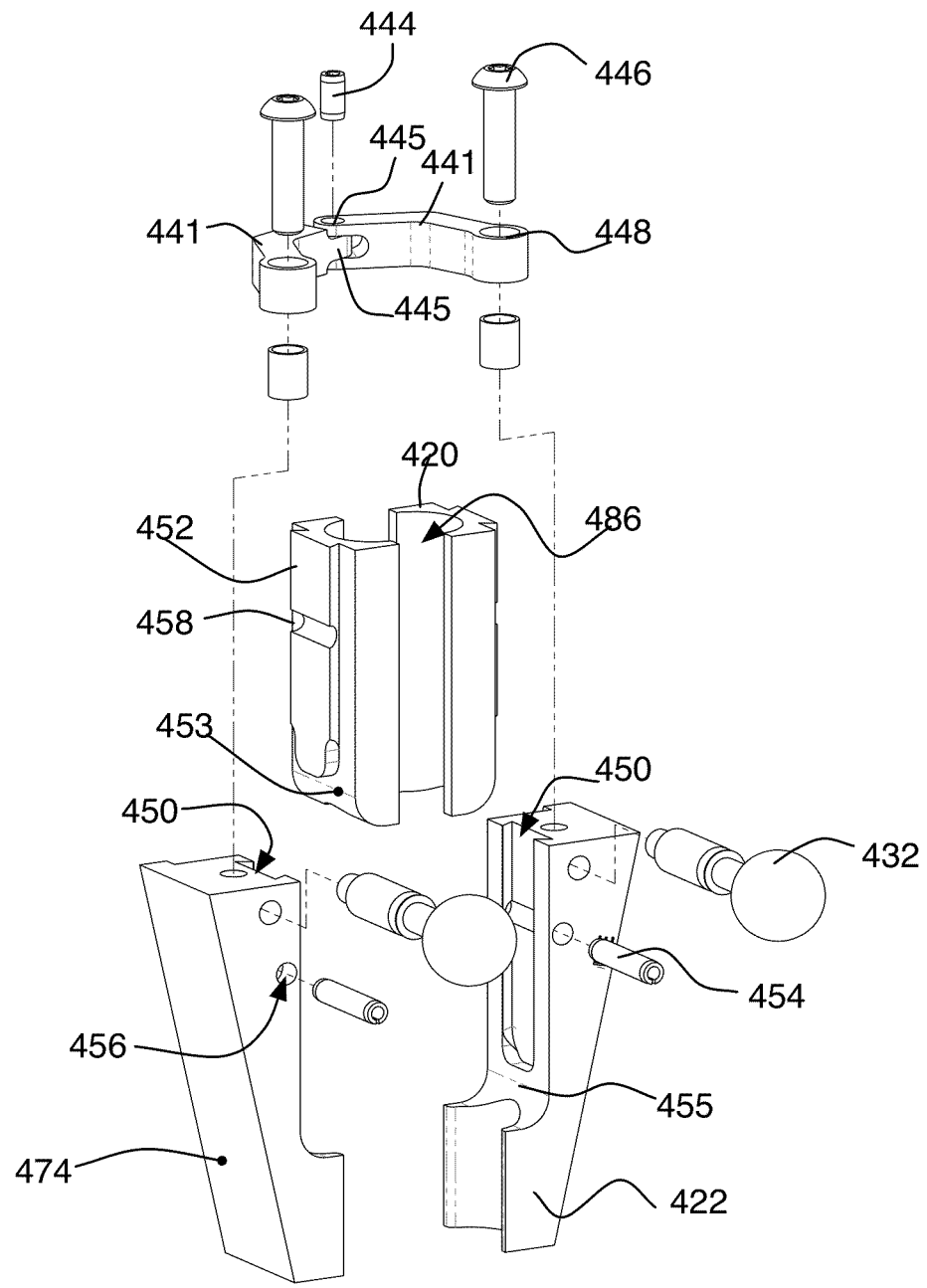
FIG. 21 is an exploded view of the gripper assembly of FIG. 20.

Referring to FIG. 21, a gripper insert 420 can be removably coupled to gripper body 422 by, for example, mechanical engaging means. In one example, illustrated in the figure, a projection on one surface engages with a mirroring groove or slot on the other surface, as in a dovetail or key-and-groove type joint. In the figure, the projection, also referred to herein as the joint's key or tongue or dovetail 452 can extend down the outside side surface 453 of insert 420. In the figure, projection 452 dimensionally matches a slot or groove or channel 450 that extends down the inner side surface 455 of gripper body 423 such that insert 420 is coupled to gripper body 422. A pin 454, including a compressible spring or roll pin, can be engaged to limit longitudinal movement of insert 420 relative to body 422. Pin 454 preferably can engage a pinhole 456 on a front or back surface of gripper body 423 and enter an interior channel formed therein by pinhole 456 and horizontal gap or opening 458 in engaged slot 452.

In the figures, cylinder bridge 400 includes a center section 414 that includes a receiver 416, dimensioned to receive and engage independent cable gripper assembly 417. Receiver 416 comprises a three-sided recess in center bridge section 414, comprising laterally opposed side surfaces 438 and a back surface 439. The three sides together define an overall shape that mirrors the shape of assembly 417 and are dimensioned to contact the corresponding side surfaces 474 and back surface 475 of assembly 417 when assembly 417 is seated in receiver 416. Specifically, when assembly 417 is seated in receiver 416, assembly outer side surfaces 474 contact receiver's inner side surfaces 438, and assembly back surface 475 contacts receiver inner back surface 439.

Receiver 416 further is open on its top, bottom and front surfaces. Accordingly, assembly 417 can be provided to, and removed from, receiver 416 by vertical movement through receiver 416's top opening, or by horizontal movement through its front opening. Conveniently, movement of assembly 417 in and out of receiver 416 easily can be manipulated by an operator, for example by holding handle 432.

Figure 22:
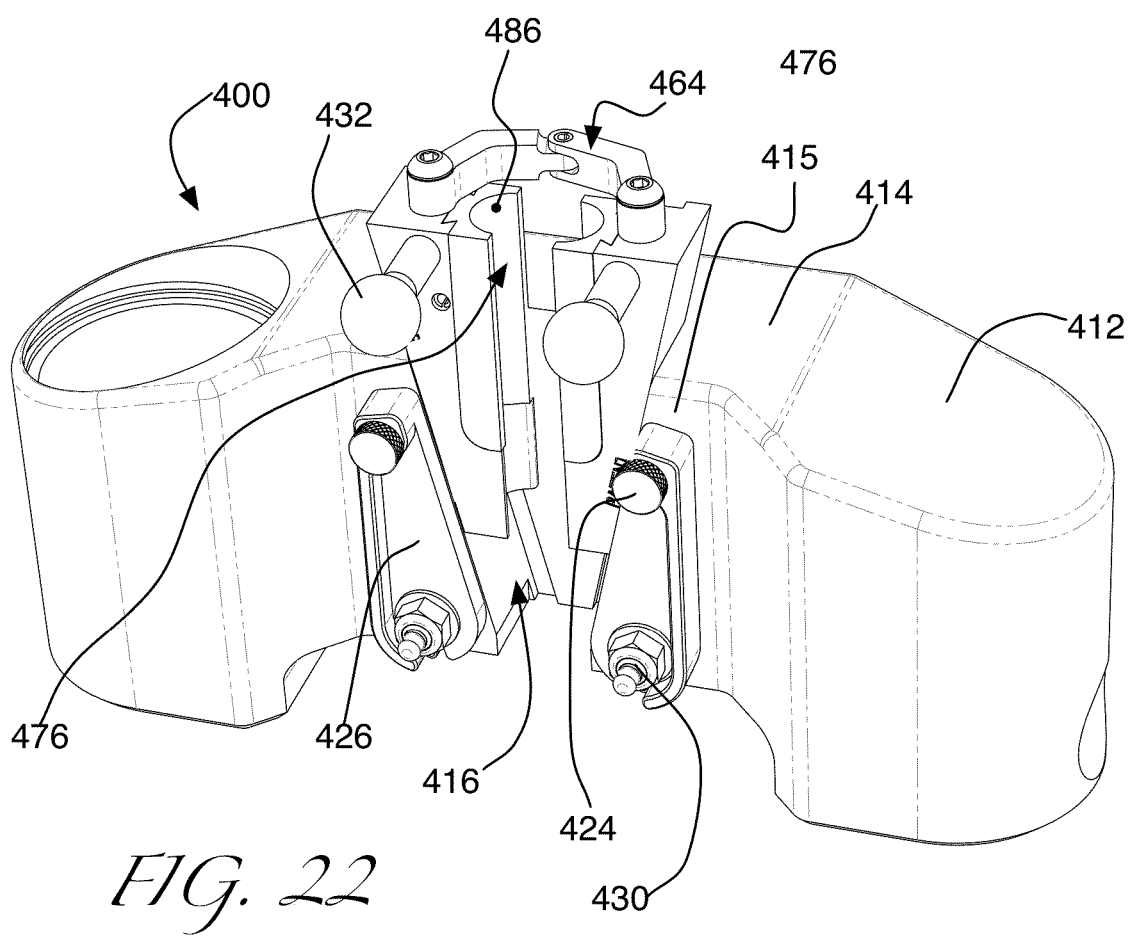
FIG. 22 illustrates an open path cable engagement means according to one embodiment of the present disclosure, in an open position for laterally receiving a cable.
Figure 23:
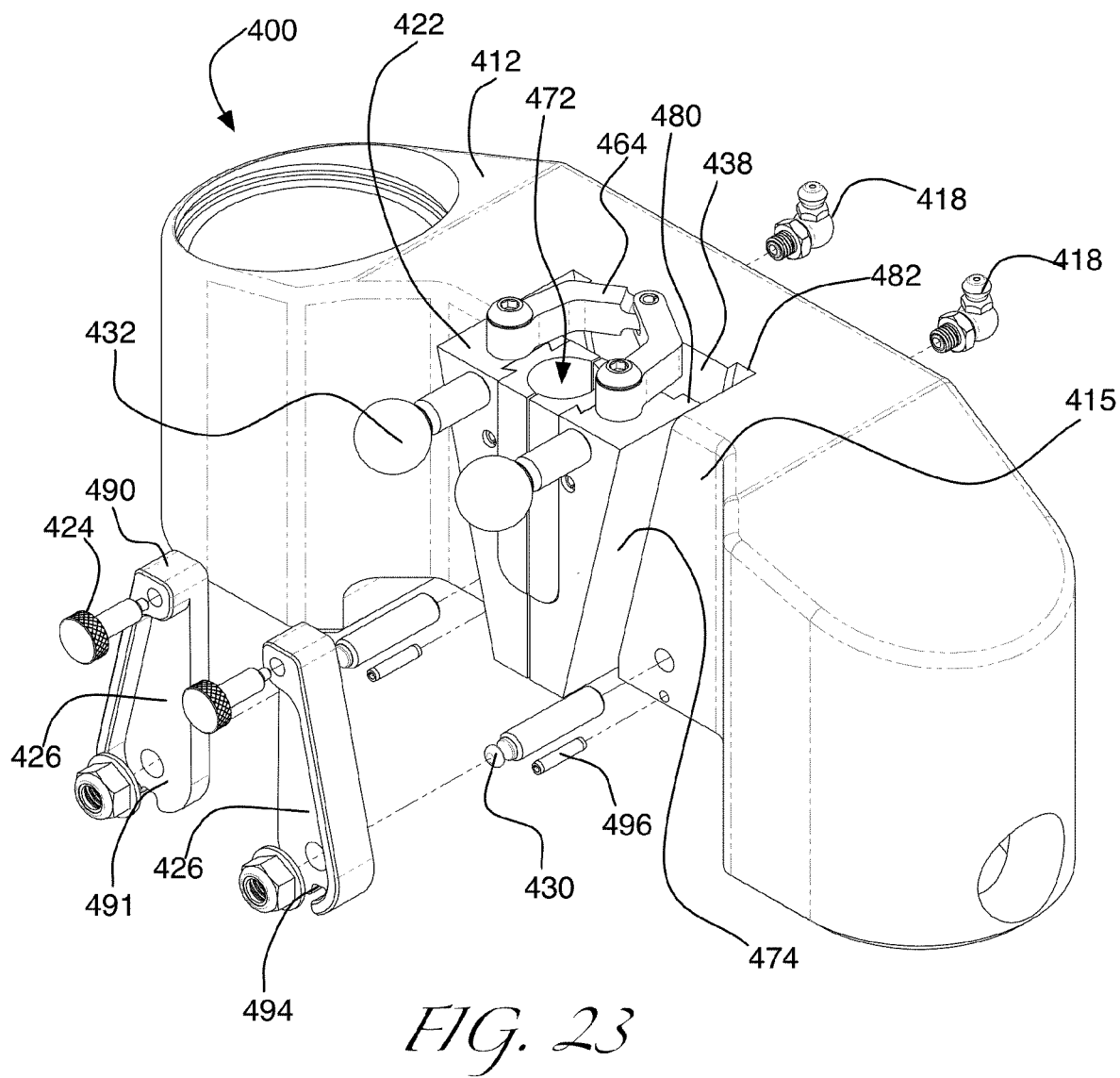
FIG. 23 is a cross-section of the cylinder pulling bridge of FIG. 17.
Figure 24:
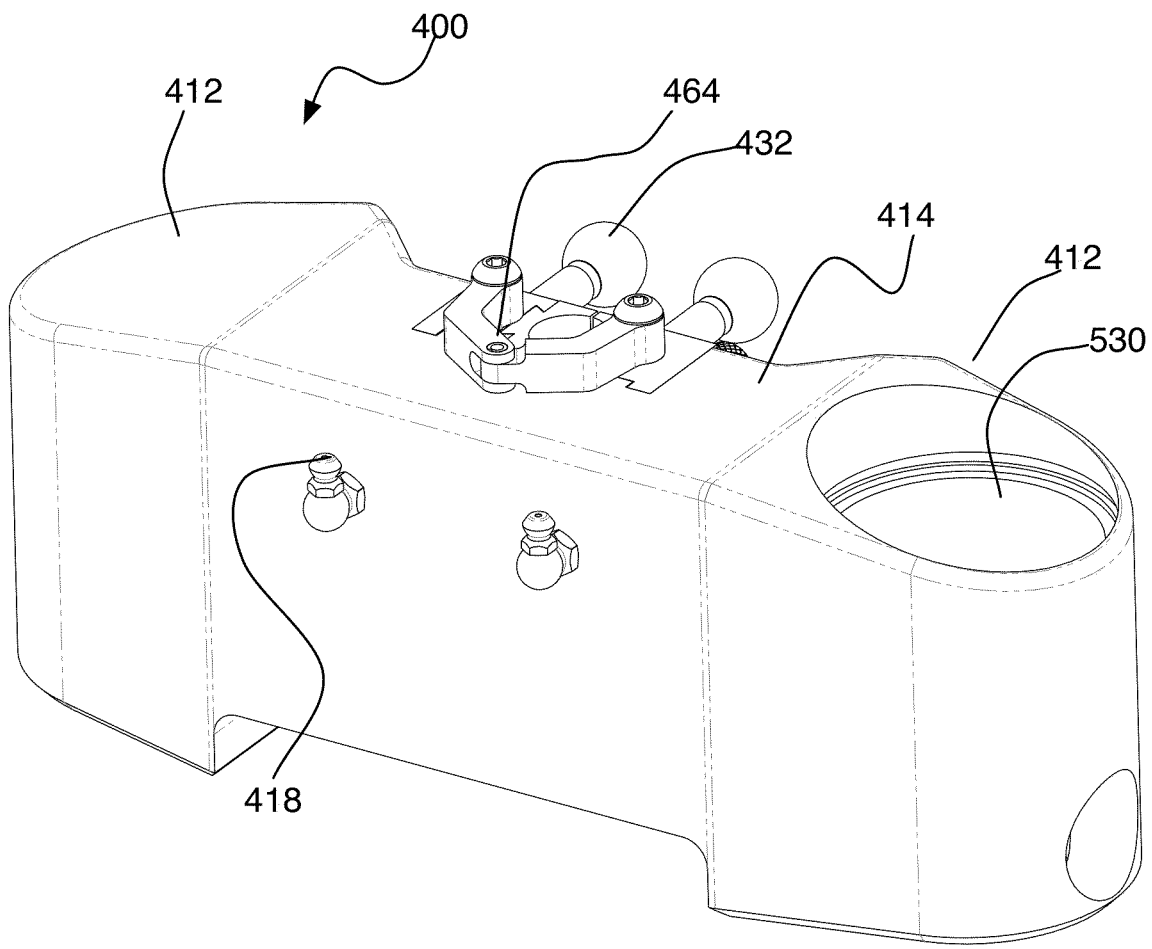
FIG. 24 is another exploded view of the cylinder bridge of FIG. 17.
Figure 25A:
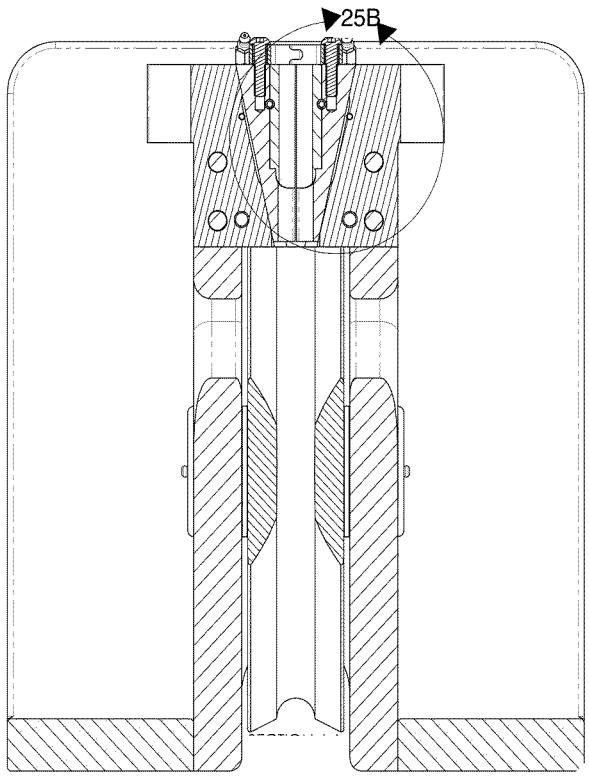
FIGS. 25A-25C are various views of a chassis bridge cable gripper assembly and receiver according to one embodiment of the present disclosure.
Figure 25C:
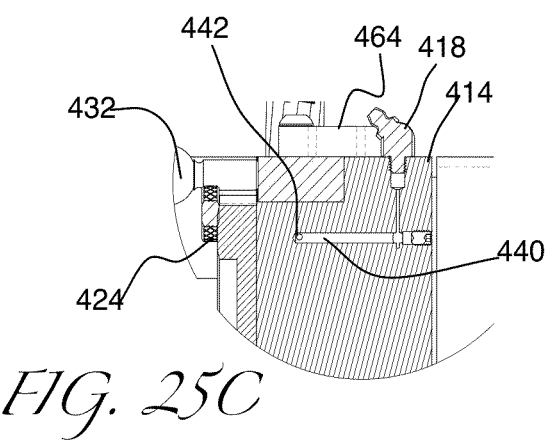
Figure 25B:
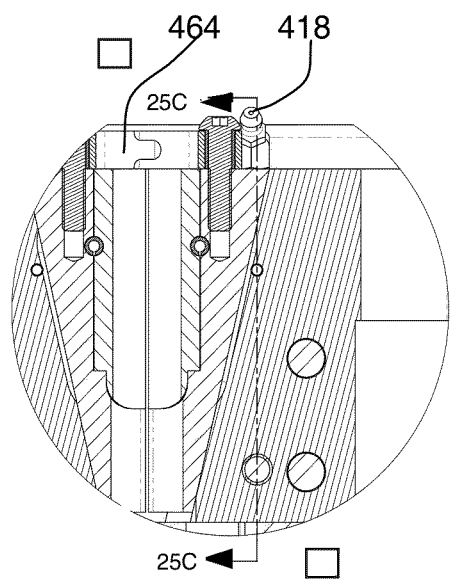

Referring to FIGS. 22 and 23, as gripper assembly 417 is lifted vertically from receiver 416 by, for example, handle 432, linked gripper members 423 separate, creating a vertical opening or gap 476 in cable bore 472. In this gripper device "open" position, also referred to herein as the "open-path" position, a cable can be provided to the cable bore interior by horizontally moving a cable 12 side surface from the bridge front surface, through vertical bore opening 476, and into the bore interior. In the absence of an available open path positioning mechanism such as described here, providing cable to a cable engaging mechanism in a vertical system can require threading a cable free end 14 up through an available bottom opening. Threading a cable free end through a pulling apparatus can be cumbersome once the apparatus is assembled. The open-path mechanism disclosed herein can simplify the cable insertion process and enhance ease and efficiency of apparatus set up .

Assembly 417 and receiver 416 further can comprise mechanical coupling means that support their removable engagement with one another when assembly 417 is in position in receiver 416. In one non-limiting example illustrated at least in FIGS. 19, 20, 22 and 23, the mechanical coupling means can comprise a projection on a surface of the assembly or receiver that engages with a mirroring slot or channel on the engaging surface of the other component. In the figure, assembly 417 back surface 475 can comprise a projection, also referred to herein as a tongue or key 480 that extends at least partway down surface 475 and can engage with a slot or groove or channel 482 in receiver 416 back surface 439. In one preferred embodiment, both gripper assembly 417 and receiver 416 can have an overall wedge or V-shape, and it will be appreciated that downward movement of assembly 417 through receiver 416 can be limited by this shape.

Receiver 416 further can comprise gripper assembly retention means that limit horizontal movement of assembly 417 in receiver 416. Specifically, when in position, gripper assembly retention means are competent to prevent assembly 417 from moving out through receiver 417's front surface opening. Useful characteristics and features of gripper assembly retention means can include: (1) hand adjustable means for moving the retention means in and out of position, such that assembly 417 can be horizontally positioned in and out of receiver 416 when desired without requiring any component disassembly; (2) ease of access and function by an operator; (3) durability; and (4) non-interference with other components during a cable pulling operation.

Figure 17:
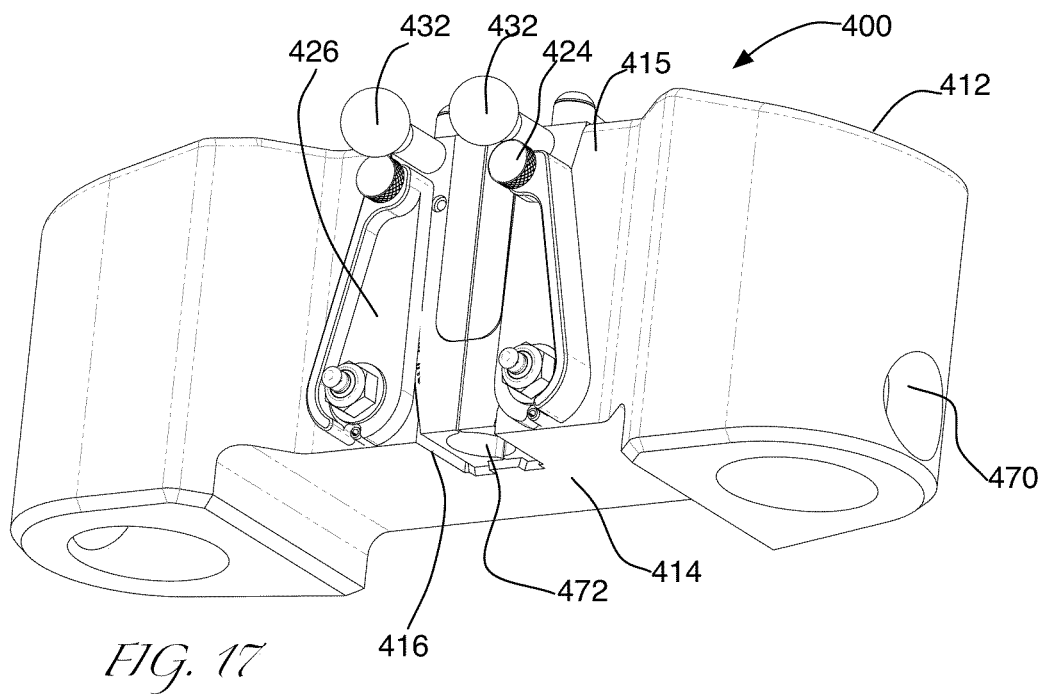
FIG. 17 is a front perspective view from below of a cylinder pulling bridge according to one embodiment of the present disclosure.
Figure 18:
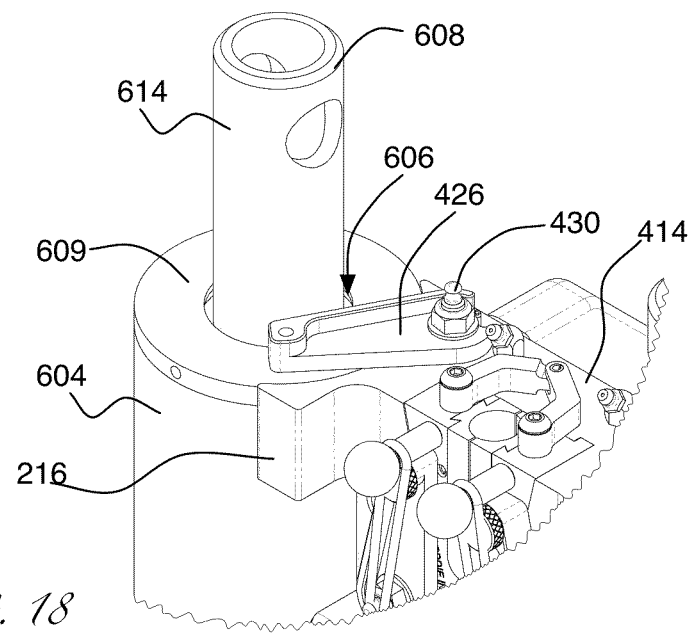
FIG. 18 is a perspective view of a cylinder gland retention mechanism according to one embodiment of the present disclosure.

One non-limiting example of a useful gripper assembly retention means is illustrated in FIGS. 17, 22 and 23. In the figures, a gripper assembly retention means comprises an elongated, rotatable retention arm 426 having top, free terminal end 490 and a bottom end 491 that can rotate about a pivot point 430. Preferably, retention arm 426 can be located on the front surface 415 of bridge center section 414, substantially adjacent a front edge of receiver 416. Pivot point 430 also can comprise a bolting means for attaching retention arm 426 to bridge surface 415. Retention arm 426 can be dimensioned such that, when it is in rotated into position it engages with at least part of the front surface of a gripper member 423. Top, terminal free end 490 also can comprise a thumb screw 424 or other hand adjustable means for fastening retention arm 426 to gripper member 423 as desired. Thumb screw 424 can also function as a handling means for moving retention arm 426 in and out of position. Retention arm 426 and thumb screw 424 can be used to hold a gripper assembly in an "open path" position for cable insertion and extraction at the start and end of a cable pulling process, as illustrated in the examples below.

Figure 26:
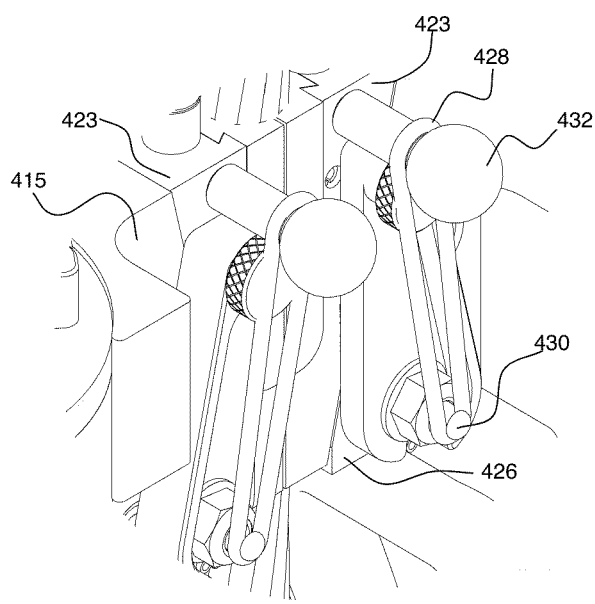
FIG. 26 illustrates elastomer tensioning means according to one embodiment of the present disclosure.

In the figures, a plurality of retention arms are illustrated, specifically a laterally opposing pair of retention arms 426 flanking the front side edges of receiver 416 are shown. In the figures, each arm is competent to rotate about its pivot point to engage at least part of a gripper member front surface. It will be appreciated that a single retention arm, competent to rotate about a pivot point and dimensioned to engage at least part of the front surface of both gripper members 423 also is contemplated. FIGS. 17 and 26 show retention arms 426 in the active, retaining position, engaging with gripper members 423. FIG. 22 shows retention arms 426 in a storage position on bridge surface 415, beyond the side edges of receiver 416, and disengaged from gripper assembly 417. It will be appreciated that retention arms 426 can comprise a flat solid surface, or include one or more weight reducing cuts.

Gripper arm 426 further can comprise means for limiting rotation about pivot point 430. In one non-limiting example, illustrated for example in FIGS. 17, 19, 22 and 23, retention arm 426 can include a cut-out or opening or aperture 494 dimensioned to receive and engage with a post 496 on manifold surface 415. Aperture 494 can be configured and dimensioned such that, as retention arm 426 rotates about pivot point 430, a portion of aperture 494′s inner surface contacts or engages with post 496, preventing further rotation of retention arm 426.

The cable engagement means disclosed herein further can include integrated lubricating means such that lubricating and/or anti-seize fluid or lubricant can be provided externally to the contacting side surfaces of of assembly 417 and receiver 416, namely sliding surfaces 475 and 438 and reduce friction therebetween, without requiring disengagement of assembly 417 from receiver 416. In one non-limiting example, an integrated grease or Zerk fitting 418 can be provided to a surface of bridge 400, preferably to a surface of bridge center section 414. A lubricating or anti-seize fluid then can be supplied to an outlet or opening 442 on receiver side surface 438, for example by means of a channel 440.

In another non-limiting example, side surface 438 further can comprise a reservoir 443 into which outlet 442 opens, such that lubricant provided through grease fitting 418 collects or is otherwise contained in reservoir 443 and can lubricate surfaces 438 and 475 during cable pulling operation. In the examples illustrated, reservoir 443 can comprise a groove or channel. It now is possible to lubricate the cable engaging means in a vertical pulling apparatus as needed during a cable pulling operation without requiring disassembly of the mechanism, thereby enhancing apparatus performance and efficiency in the field. Integrated grease fitting 418 can be positioned on any surface of the bridge where convenient for access and use. Useful locations can include a top surface of bridge center section 414 as shown, for example, on chassis bridge 200 in FIGS. 6, 13 and 25A-25C. Another useful location can include a bridge back surface, as shown on cylinder bridge 400 in, for example, FIGS. 23 and 24.

The gripper engagement means disclosed herein further can include tensioning means for keeping gripper members 423 timed such that the force they each apply on a cable surface is substantially the same as they engage a cable surface during a cable pulling operation. In one embodiment, tensioning means can be provided by means of a tension-modulatable connection between gripper assembly 417 and manifold 414. Useful tension-modulatable connections means can include, without limitation, an elastomeric, stretchable or spring-loaded connection means. In another embodiment, tension means can be provided by elastomeric, stretchable or spring-loaded connection between individual gripper members 423 and bridge section 414. FIG. 26 illustrates one non-limiting example, where an elastomer 428 links handle 432 on gripper member 423 with retention arm pivot point 430 and/or its associated bolting means on bridge front surface 415.

V. Open-Path Cable Guiding Means

Exemplary open-path cable-guiding means and mechanisms now will be described. FIGS. 27-35, 43A and 43B illustrate exemplary, non-limiting open-pathway cable guide devices 700. In the figures, guide 700 can include a brace 710 and a guide body 712. Extending forward from guide body 712 can be two parallel, opposing arms 714 and 716. Opening 717, also referred to herein as a space or a gap defined by the distance between arms 714 and 716, can be dimensioned to receive a cable side surface laterally provided to opening 717.

Figure 27:
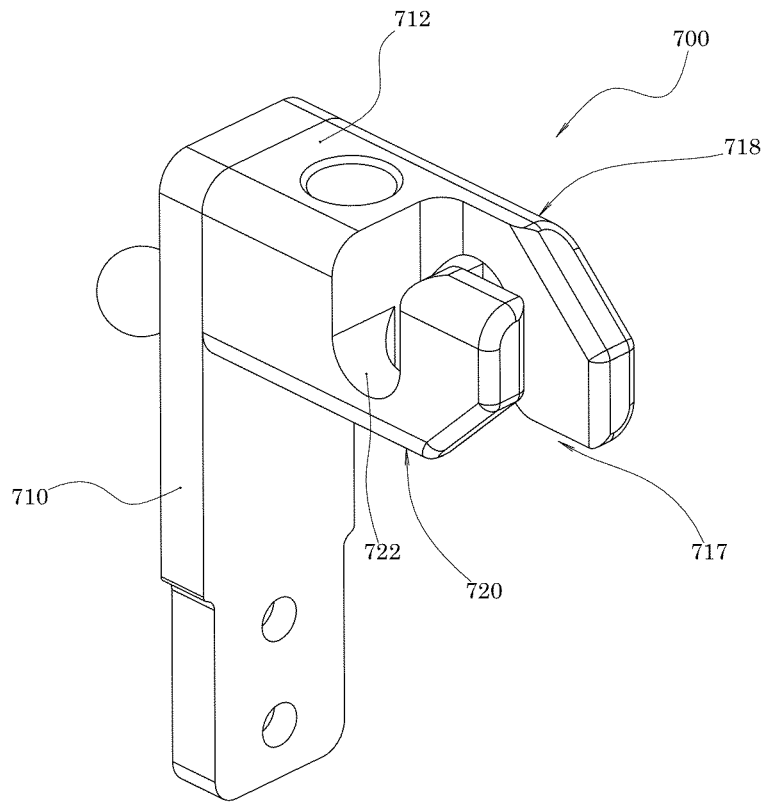
FIG. 27 is a perspective view of an open-path cable alignment device in the vertical, open position, according to one embodiment of the present disclosure.
Figure 28:
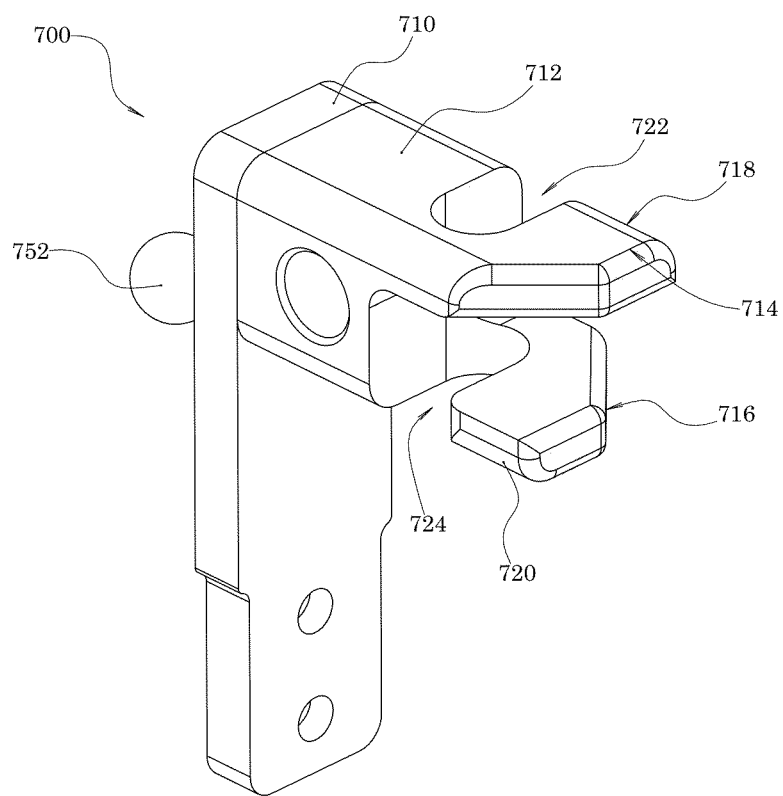
FIG. 28 is a perspective view of an open-path cable alignment device in the horizontal, closed or "guide" position, according to one embodiment of the present disclosure.
Figure 29:
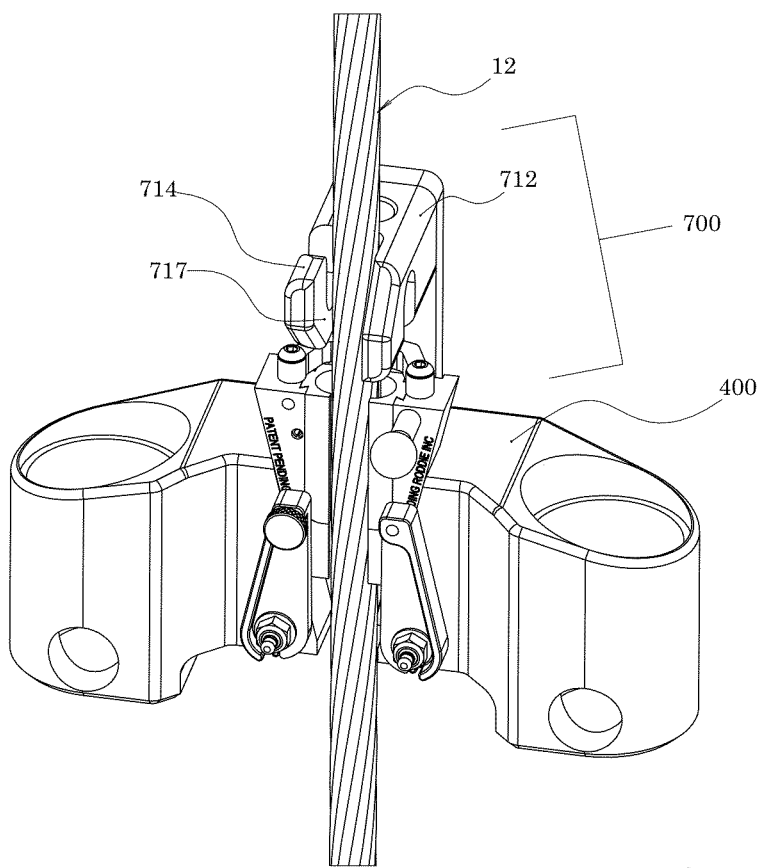
FIG. 29 illustrates an open-path cable alignment device according to one embodiment of the present disclosure on a pulling apparatus and in an open position for laterally receiving a cable.

With particular reference to cable guiding means examples illustrated in FIGS. 27 and 28, each arm 714 and 716 can have a top longitudinal surface 718 and a bottom longitudinal surface 720. On one arm 714, a cut-out 722 extends down from top longitudinal surface 718. On opposing arm 716, cutout 724 extends up from the bottom longitudinal surface 720. Cut-outs 722 and 724 are each dimensioned to receive a cable side surface laterally provided to the cut-out. In one preferred embodiment, cut-outs 722 and 724 can have an overall concave shape. In another embodiment, the dimensions of cutouts 722 and 724 can be substantially equivalent. In still another embodiment, arms 714 and 716 can be substantially inverted mirror opposites of each other. In the figures, cut-out 722 is associated with arm 714 and cut-out 724 is associated with arm 716. It will be appreciated by those skilled in the art that, alternatively, cut-out 722 could be associated with arm 716, and cut-out 724 could be associated with arm 714.

Figure 30:
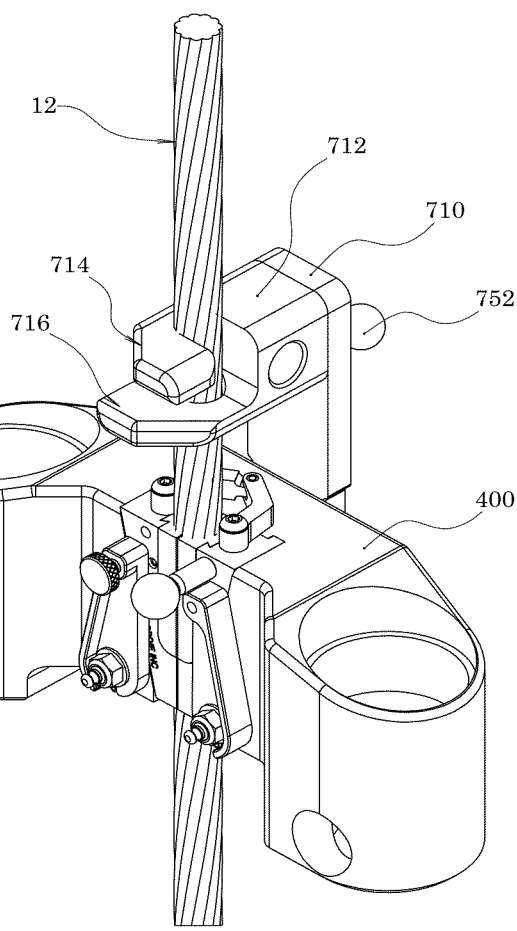
FIG. 30 illustrates the cable alignment device of FIG. 30 in a horizontal, closed or "guide" position.

In a preferred embodiment, guide body 714 can be attached to brace 710 so as to allow guide body 714 to rotate between a vertical, open-path position and a horizontal, closed or "guide" position. In the vertical, open-path position, illustrated in FIGS. 27 and 29, arms 714 and 716 extend forward from guide body 712 in parallel vertical planes and gap 717 is available to receive the side surface of a vertically extended cable 12. FIGS. 28 and 30 illustrates guide body 712 rotated into the horizontal, closed, "guide" position. Here, arms 714 and 716 extend forward from guide body 712 in parallel horizontal planes, and gap 717 is not available to receive the side surface of a vertically extended cable, the terminal free ends of arms 714 and 716 effectively blocking access.

When a vertically extended cable 12 is provided to gap 717 with guide body 712 in the vertical, open-path position, and the guide body then is rotated into the horizontal, guide position, cut-outs 722 and 724 can now receive side surfaces of cable 12, effectively holding the cable in its vertically extended position. In this position, the terminal free ends of arms 714 and 716 effectively function as hooks that restrain or otherwise limit horizontal movement of a vertically extended cable forwards or backwards, or side to side. The capacity to limit horizontal or side to side movement of a cable, especially during a pulling operation is a valuable feature. Keeping a cable vertically aligned during a pulling operation can minimize unwanted wear or pull on a cable gripping mechanism.

In the figures, guide body 712 can rotate clockwise relative to brace 710, such that arm 714 is superior to arm 716. It will be appreciated by those skilled in the art that device 700 also can be fabricated such that guide body 712 rotates counter-clockwise and arm 716 is superior to arm 714 in the horizontal, guide position.

Guide body 712 can be connected to brace 710 by any useful rotating means. Several, non-limited examples are illustrated here. Characteristics of useful connecting means include the modulate the device between the open, cable receiving position and the closed, cable holding position, and to lock the device in each of these positions.

Figure 31:
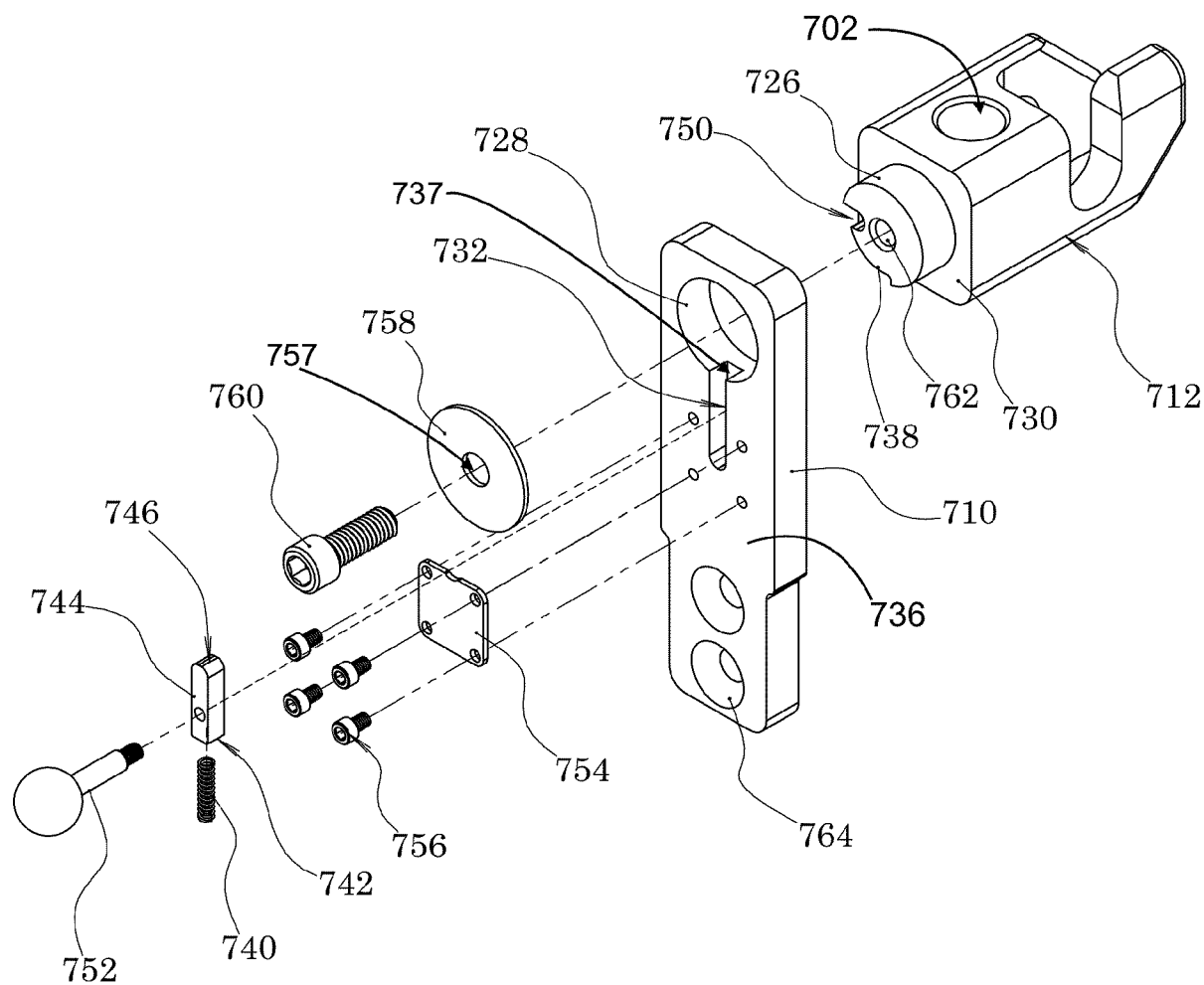
FIG. 31 is an exploded view of a cable alignment device according to one embodiment of the present disclosure.
Figure 32A:
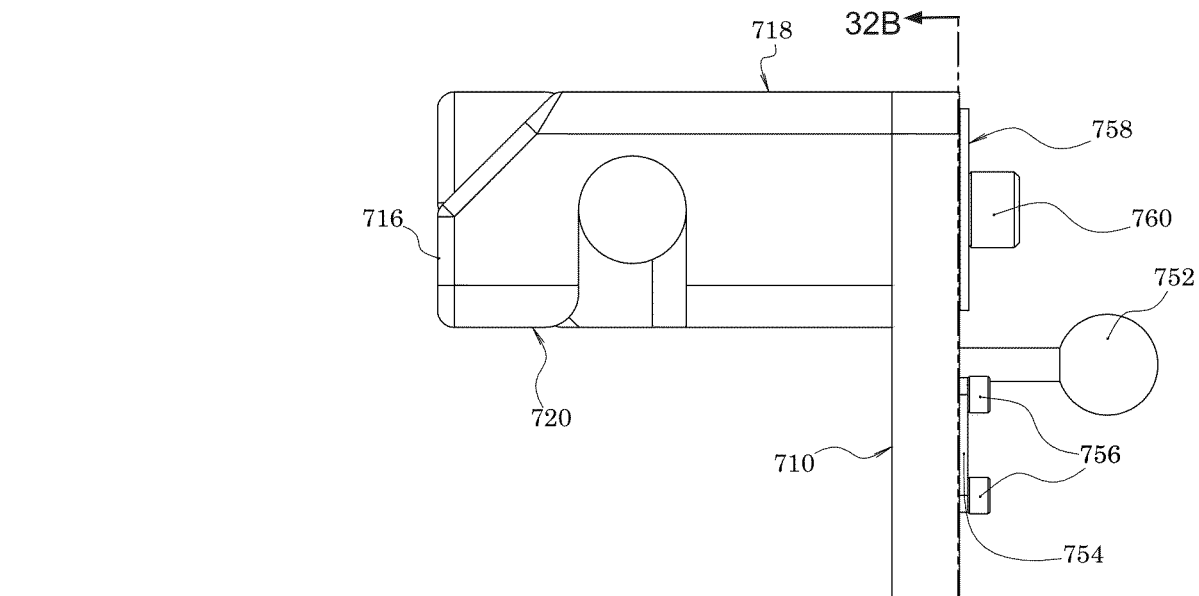
FIGS. 32A and 32B illustrate a cross-section of a cable alignment device in the vertical, open position, according to one embodiment of the present disclosure.
Figure 32B:
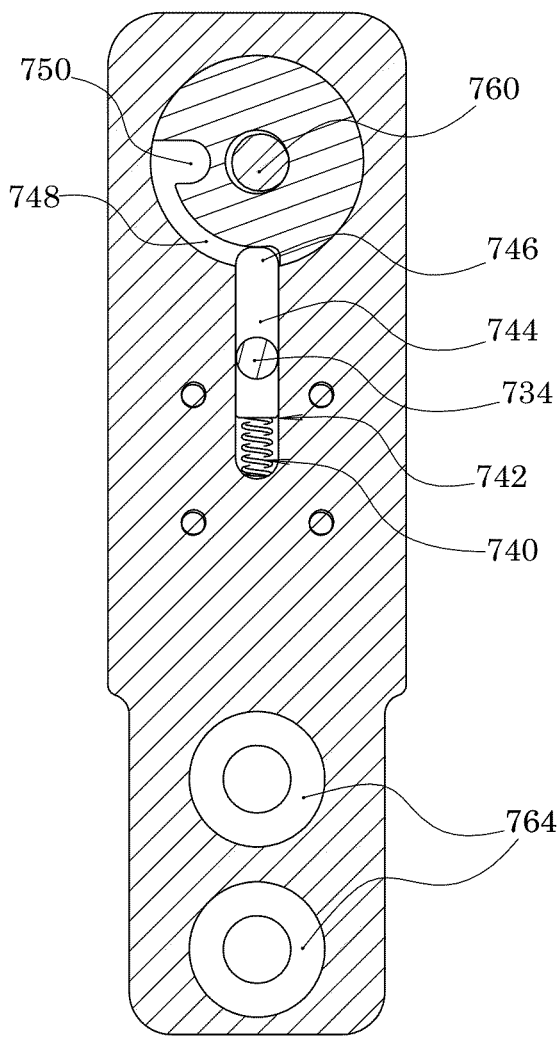
Figures 33A, 33B:
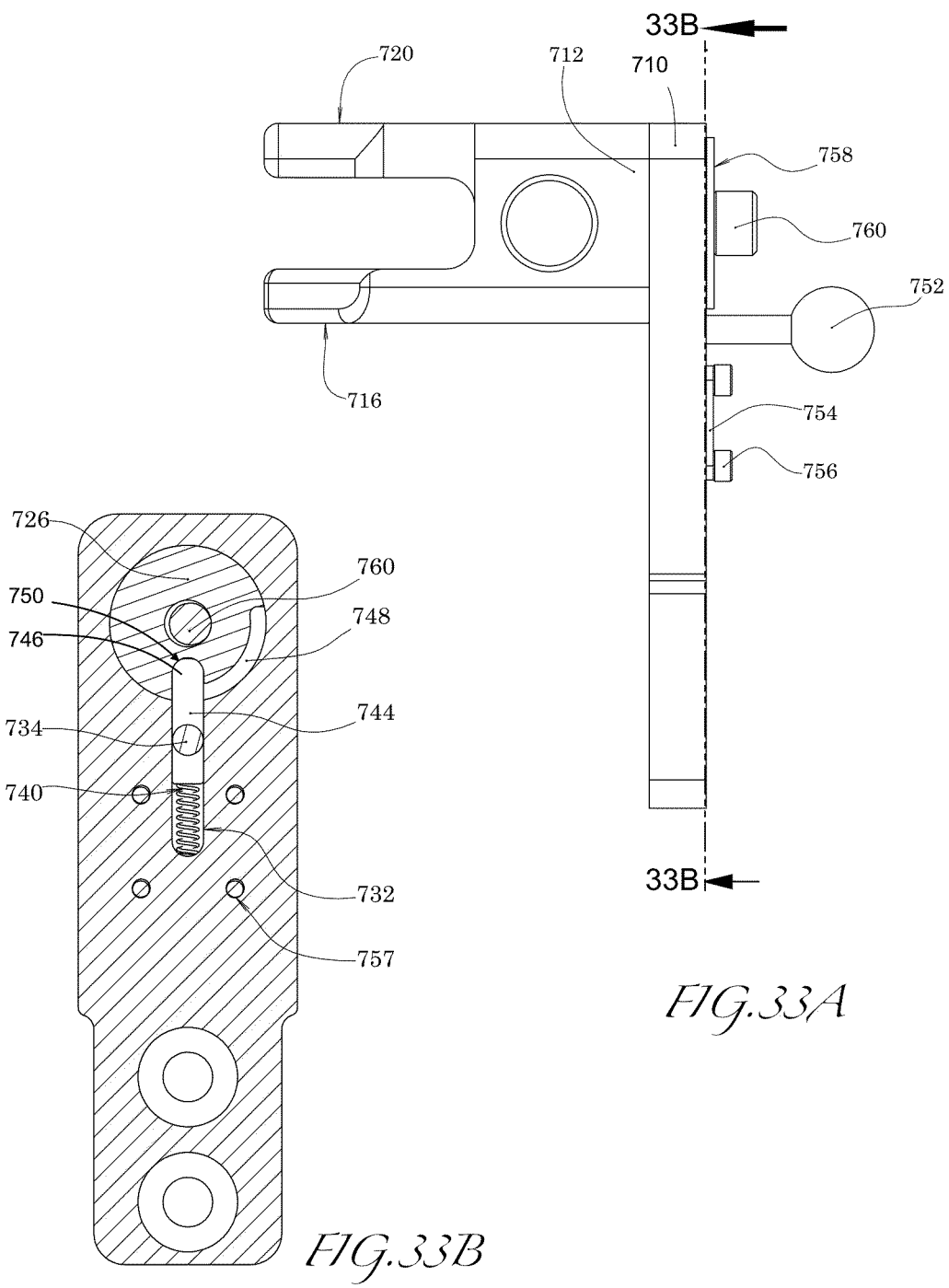
FIGS. 33A and 33B illustrate a cross-section of a cable alignment device in the horizontal, closed or "guide" position, according to one embodiment of the present disclosure.

In one embodiment, illustrated in FIGS. 31-33, guide body 712 can rotate about a shaft or stem 726 that extends from posterior end 730 of guide body 712 and fits in a bore or aperture 728 in brace 710. The coupling of brace 710 to guide body 712 also can be by any useful means. In one embodiment illustrated in the figures, the two components can be secured together by a removable bolting means. Specifically, the terminal free end of shaft 726 can include an aperture 762, which also can be threaded, for receiving bolt 760. A cover plate 758 dimensioned to cover brace aperture 728 and having a central opening 757 through which a portion of bolt 760 can pass can be added to the bolting face 736 of brace 710. Bolt 760 then can be threaded into shaft aperture 762 to couple guide body 712 to brace 710.

In another embodiment, the rotating connection, coupling or attachment means also can include a locking means, such that guide body 712 can be reversibly locked into its vertical open or horizontal closed position. Characteristics of useful locking means include reversibility, ease of engagement and disengagement, durability and strength, especially to hold guide body 712 in the closed position during a pulling operation. It will also be appreciated that, while the horizontal and vertical positions illustrated here are 90° to one another, the locking mechanism or means also could be fabricated to lock the guide body at positions other than 0° and 90° if desired, including, for example, at 30° or 45°.

In the figures, an exemplary camming latch, also known as a compression latch or spring-loaded latch, is illustrated as an exemplary, non-limiting locking mechanism. Parts of a spring-loaded latch can include a compressible spring 740, a spring compressing means 742 associated with spring 740 and competent to compress the spring, a latch or pin 744 having a latching or camming end 746, and a rotational limiter that defines the maximum rotational path of the guide body. In the embodiment illustrated, the rotational limiter comprises a camming surface 748 on guide body terminal free end 738 along which pin 744 can slide during the rotation process, and a catch means 750 at one end of the camming surface that holds pin 744 in the latched position. In one embodiment, pin 744 also can comprise spring compressing means 742.

In the embodiment illustrated, compressible spring 740, spring compressing means 742 and latch pin 744 are positioned in brace 710 in a channel or recess 732 having a terminal free opening 737 into aperture 728. In the figures, channel 732 comprises a groove open to bolting face 736 of brace 710 and which can be covered by a plate 754 removably secured to bolting face 736 by any standard means, including by bolts 756. In another embodiment, at least part of compression spring channel 732 can be internal to brace 710 and spring 740, compressing means 742 and latch pin 744 provided sequentially to channel 732 through terminal free end opening 737.

In one embodiment, the superior end 746 of camming pin 744 comprises the latching means of the illustrated compression latch mechanism or assembly, and the inferior end of pin 744 comprises the spring compressing means 742. In the embodiment illustrated, compressing means end 742 of pin 744 is in contact with and competent to compress spring 740, preferably by means of a lever or handle 752 associated with pin 744. For example, downward movement of handle 752 can push associated pin 744 down recess 732, contacting and compressing spring 740.

The terminal free end 738 of shaft 726 can comprise the rotation limiter means, namely a pin camming surface 748 and catch means 750. As illustrated in the figures, the camming surface can be provided as a groove or cut along the shaft terminal free end outer edge along which camming pin end 746 can slide when spring 740 is compressed, allowing guide body 712 to rotate about stem 726 (here in a clockwise direction). The length of groove 748 functionally dictates the degree of guide body rotation allowed. In the figures, camming surface 748 functionally constitutes a quarter or 90° turn. Again, as will be appreciated by those skilled in the art, alternative camming surface lengths and degrees of turn are envisioned and easily fabricated if desired without undue experimentation, in light of the instant disclosure.

In one alternative embodiment, camming surface 748 can comprise a groove cut into the outer surface of shaft 726 anterior to shaft terminal free end 738. Similarly, in the figures, locking catch means 750 can comprise a recess cut into the shaft terminal free end from its outer circumference at one end of camping surface 748, the recess dimensioned to receive pin latch end 746. In an alternative embodiment, catch means 750 also can be fabricated as an internal recess anterior to shaft terminal free end 738 and accessible from the alternative embodiment camming groove described above.

In the embodiment illustrated in the figures, guide body 712 can be rotated into the vertical open position to receive a cable side surface as follows. Lever means 752 can be manipulated to push pin 744 down recess 732 and compressing spring 740, allowing pin camming end 746 to access camming surface 748. In this position, guide body 712 can be rotated into the vertical, open position, with pin camping end 746 sliding along camming surface 748, its rotation limited by the camming surface terminus opposite catch means 750, see, e.g., FIGS. 32A and 32B. When the guide body is in the vertical open position, a vertically extended cable can be inserted in the device through gap 717. To place the device in the horizontal guide, or closed, position, guide body 712 is rotated counter-clockwise, with camming pin end 746 moving along camming surface 748 until pin 744 reaches catch 750. Catch 750 is dimensioned to receive pin 744 and has a depth longer that the width of camming surface or groove 748. The longer depth of catch 750 creates space for spring 740 to at least partially decompress when pin 744 is in catch 750, pushing pin camming end 746 upward into catch 750 and past camping surface 748. With camming surface 748 no longer accessible to pin 744, guide body 712 can be functionally locked into the closed position. See, e.g., FIGS. 33A and 33B. Moving pin 744 downward into recess 732, e.g. by means of handle or lever 752 to compress spring 740 can move pin 744 out of catch 750 such that pin camming end 746 is again available to slide along camming surface 748, allowing guide body 712 to be rotated back into the vertical, open position.

Figure 35A:
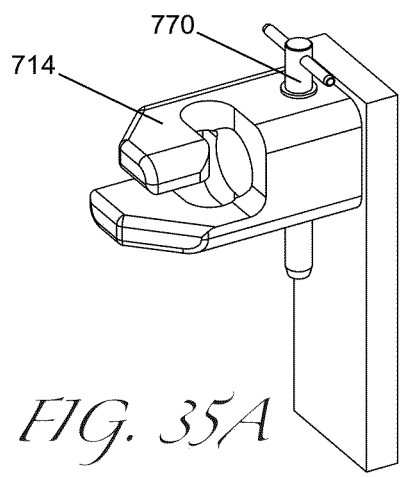
FIGS. 35A-35C illustrate components of an open-path cable alignment device according to another embodiment of the present disclosure.
Figure 35B:
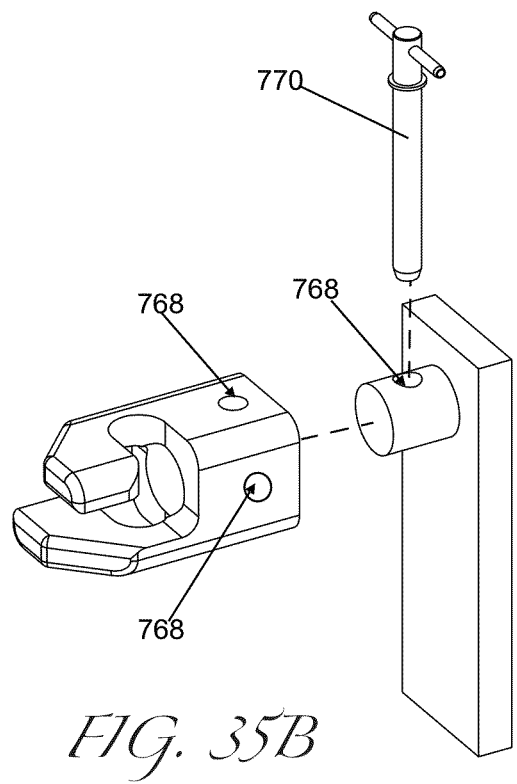
Figure 35C:
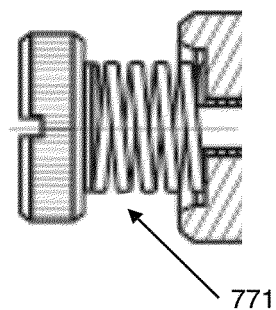

It will be appreciated that other means and mechanisms for shifting cable guide device 700 between an open and closed position are contemplated and available to those skilled in the art, provided with the instant disclosure. Another exemplary, non-limiting, alternative embodiment is illustrated in FIGS. 35A and 35B. Here, an extractable pin mechanism can be used to secure guide body 712 to stem 726, by means of a pin bore 768 that penetrates both guide body 712 and stem 726. Extractable pin 770 can be positioned for vertical extraction as shown, or for lateral extraction, by altering the location of the bore hole 768 on guide body stem 726. In still another embodiment, illustrated in FIGS. 35C, 43A and 43B, extractable pin 770 can comprise a spring loaded captive pin 771. It will be appreciated that spring 772 can be located exterior to guide body 712 as illustrated in the figures, or interior to guide body 712. It also will be appreciated that positioning of pin 770 relative to brace 710 is not limited.

Figure 34:
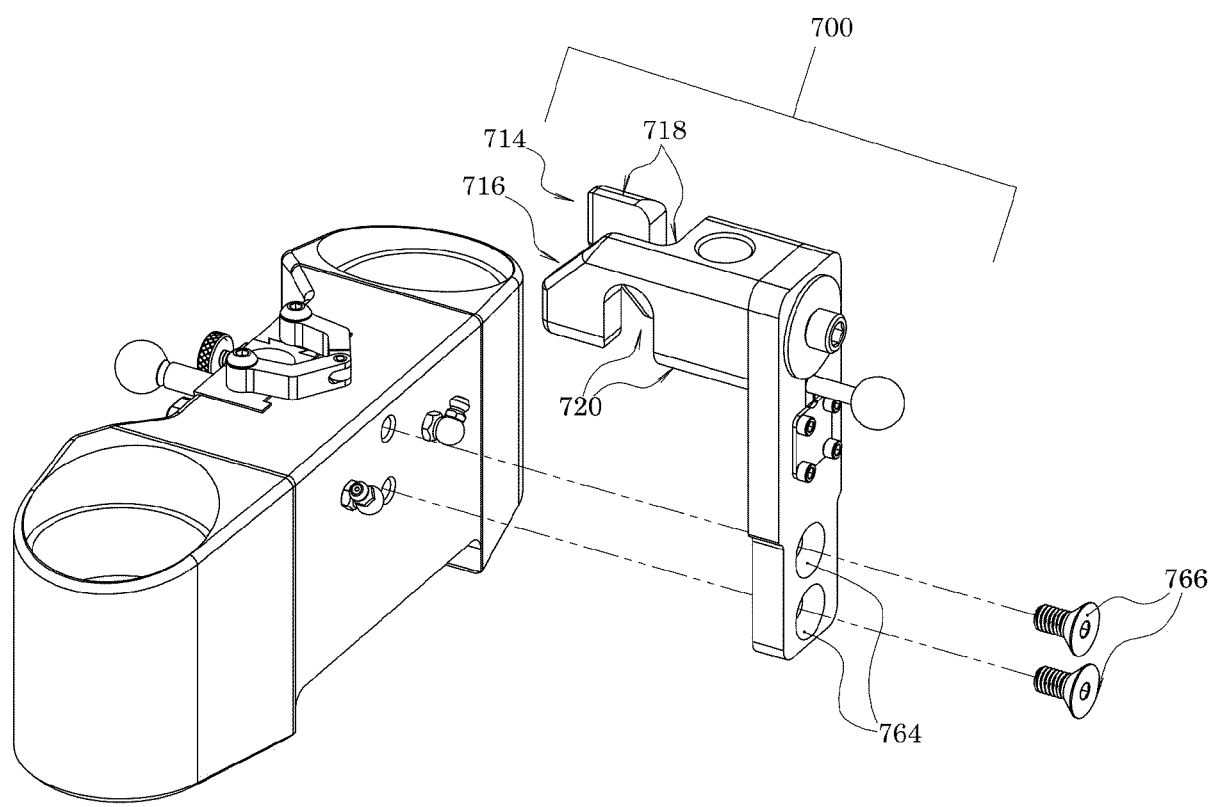
FIG. 34 is an exploded view of one means for attaching a cable guiding device to a pulling apparatus, according to one embodiment of the present disclosure.

FIG. 34 illustrates one means for attaching or securing device 700 to a cable pulling apparatus. In the figure, brace 710 is secured to gripper manifold 400 by standard bolting means, including at least one or, more preferably, a plurality of bolts 766 that pass through bolt apertures 764 in brace 710 and manifold 400.

In another embodiment, illustrated for example, in FIGS. 27 and 31, guide body 712 can include at least one exterior bore or channel 702 through guide body 712 which can serve to reduce overall device weight. Bore 702 also can provide a means for securing a tether for carrying or transporting the device on its own or when it is attached to a cable pulling manifold.

In still another embodiment, one or more of the outer surfaces of guide 700, including guide body 712 can be chamfered as illustrated in the figures for ease of manipulation, weight reduction and enhanced durability. Material considerations include durability and strength. Useful materials include: a steel, including a mild steel, such as a 10/18 steel. Other steels, including stainless steel, carbide-steel and heat-tempered steel, can provide the desired characteristics.

VI. Universal Cable Puller

Figure 44A:
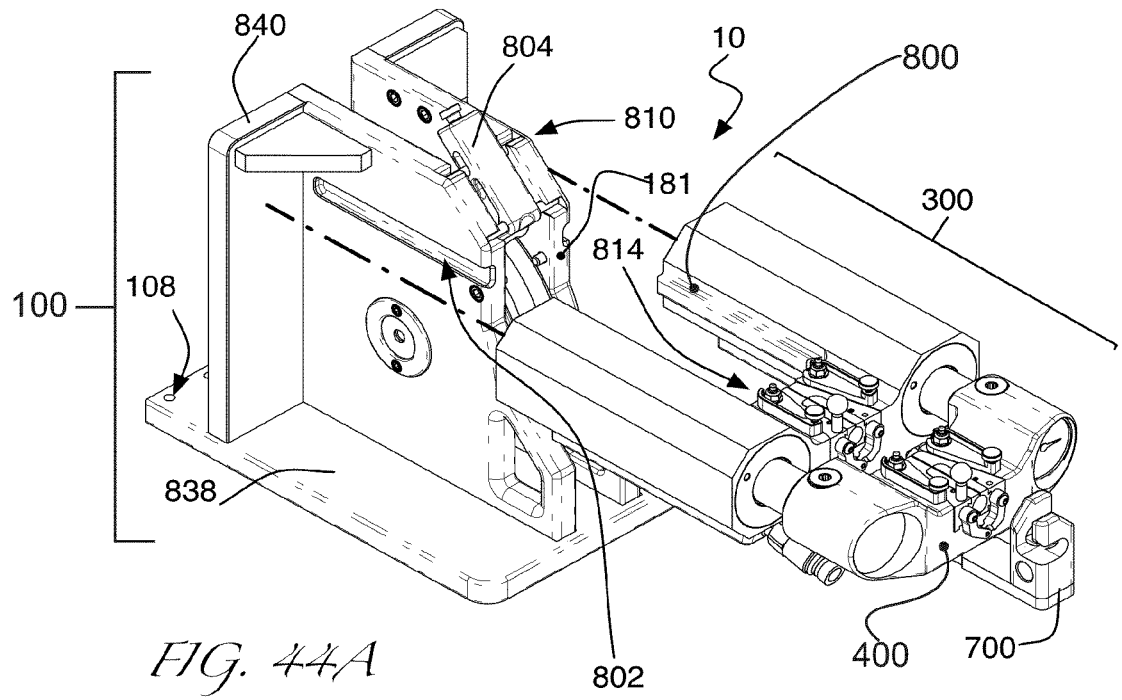
FIGS. 44A and 44B illustrate a horizontal cable pulling apparatus according to another embodiment of the present disclosure.
Figure 44B:
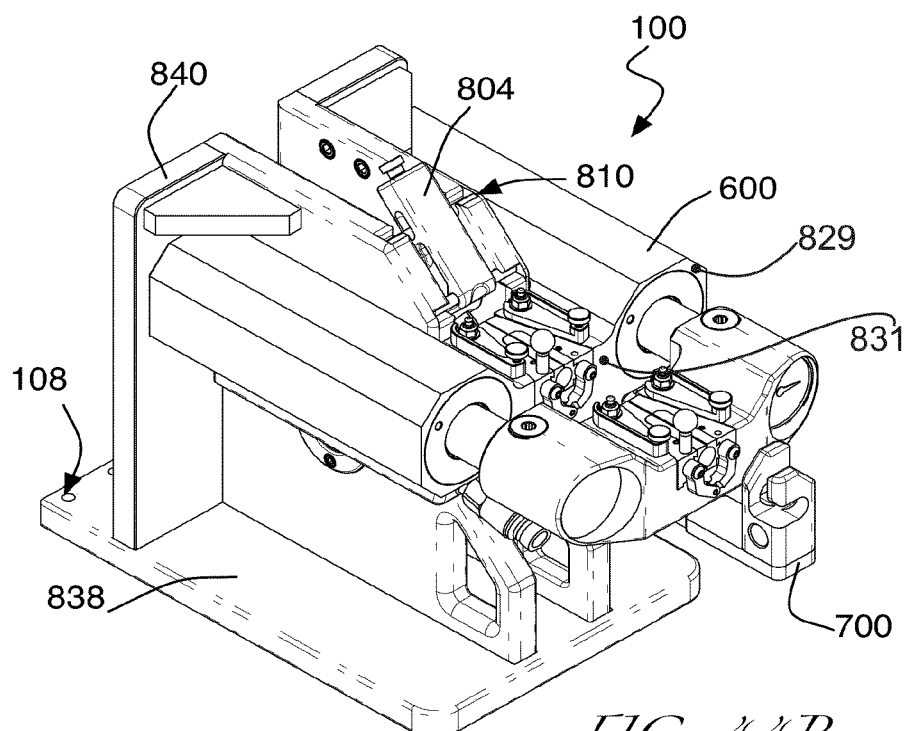

The cable puller described herein can be used as a vertical, open-path system, machine or apparatus, as illustrated at least in FIGS. 1-6. Advantageously, the apparatus also has utility as a horizontal cable puller, one non-limiting embodiment of which is illustrated in FIGS. 44A and 44B. In the figures, chassis component 100 is rotated 90° such that vertical puller back plate 110 is now horizontal puller floor plate 838, and vertical puller floor plate 130 is now horizontal puller back plate 840. As will be appreciated by those skilled in the art, back plate 840 can be moved from the position illustrated in FIGS. 44A and 44B such that it is substantially flush with the back edge of floor plate 838, for example by bolting back plate 840 to bolt hole 108.

Figure 45A:
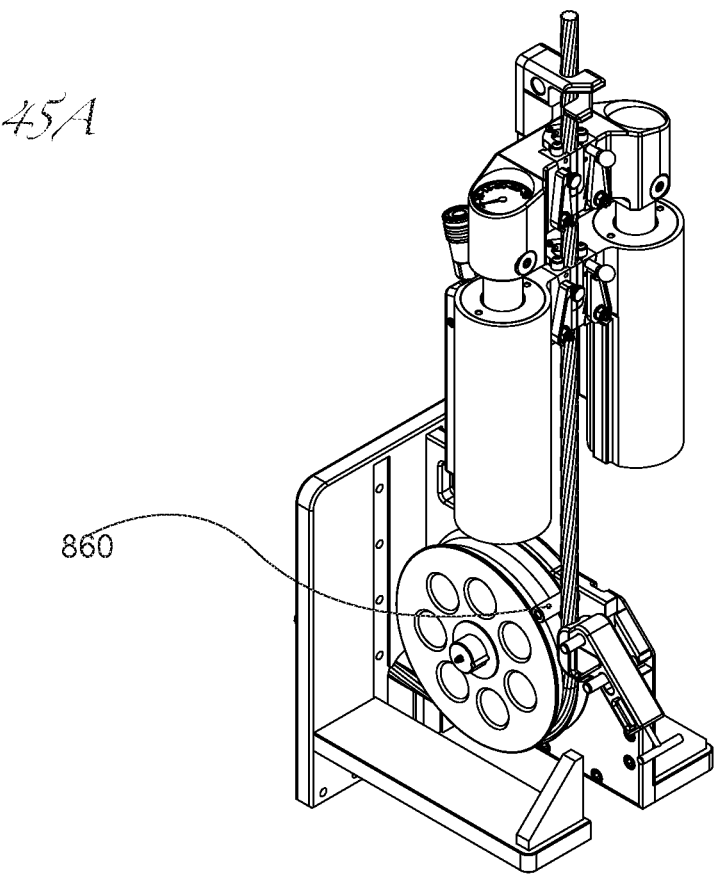
FIGS. 45A and 45B illustrate a cable guide mechanism useful in a horizontal cable pulling apparatus according to one embodiment of the present disclosure .
Figure 45B:
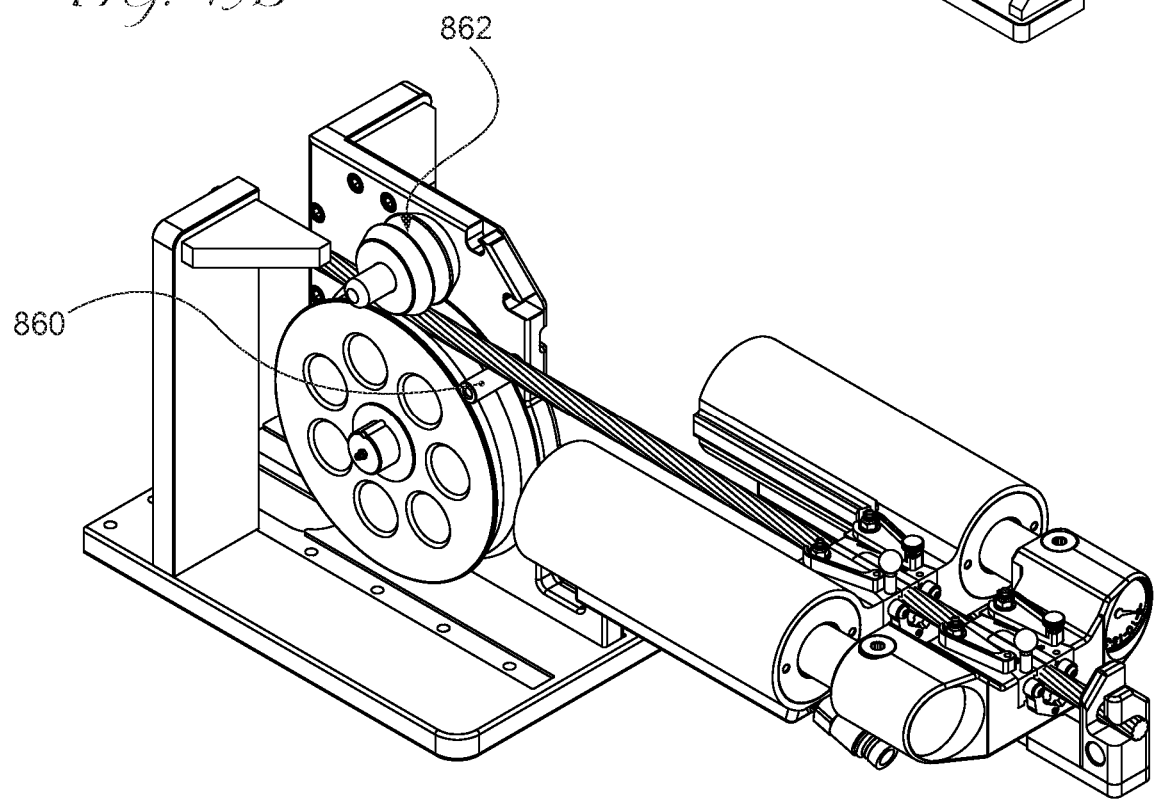

In the horizontal puller system, cylinder component 300 now is parallel to the ground. Cable 12 now will travel along the top of pulley wheel 142 in groove 144, as illustrated in FIG. 45B. While pulley wheel 142 rotates as cable 12 is pulled during operation, cable 12 does not use pulley wheel 142 to change cable direction in the horizontal configuration. If desired a cable guide mechanism can be included to keep cable 12 in groove 144 and inhibit any tendency of the cable to move out of the groove during operation. One non-limiting example of a useful cable guiding means is illustrated in FIGS. 45A and 45B. In the figures, cable 12 guide component 862 limits the movement of cable 12 off wheel groove 144, and component 860 ensures cable alignment with the gripper assemblies on chassis component 300. It will be appreciated that component 862, for example, can comprise part of cable retainer mechanism 804. It will also be appreciated that any useful cable guide mechanism can be employed and that, preferably, the guide mechanism selected does not impede cable movement during operation when the apparatus is in the vertical configuration.

VII. Examples

The examples which follow make reference to components illustrated in the figures described above. It will be appreciated that the order of operations or acts described sequentially in the examples that follow may in some cases be rearranged or performed concurrently.

1. Apparatus Set Up

A. Vertical System 1

In one non-limiting example, integrated chassis component 100 and integrated cylinder component 300 are hand carried to an exit pit. Chassis back plate 110 is placed against the pit wall comprising a pipe to be replaced and through which a cable 12 has been threaded such that free cable end 14 extends from the wall into the pit. Cable 12 or free end 14 is provided to back plate cable opening 114 and through cable channel 140. If desired, additional bracing means may be utilized to secure the position of chassis component 100 against the pit wall, including a reaction plate or other bracing means placed between chassis back plate 110 and the pit wall.

Integrated cylinder component 300 is lifted onto chassis frame of component 100 and positioned thereon such that cylinders 600 straddle chassis side wall members 120 and intervening chassis cable channel 140, with each cylinder standing on a floor plate top surface 132, preferably behind front brace 136. Chassis bridge cylinder brace 216 receives and contacts the outer surface of cylinder gland 610.

Hydraulic fluid hoses associated with a hydraulic reservoir and pump are connected to appropriate female and male quick-connect couplers 514 and 516 on hydraulics manifold 500 on integrated cylinder component 300. If desired, lubricant or anti-seize fluid is provided to pulley wheel 142 and/or to the open path cable engagement mechanisms on chassis bridge 200 and cylinder bridge 400, using grease or Zerk fittings 164 and 418.

On chassis bridge 200 gripper assembly retainment arms 426 are rotated off their associated gripper assembly member 423. Gripper assembly 417 is lifted vertically from receiver 416 by handle 432 until gripper members 423 separate sufficiently to create cable bore opening 476. At least one retention arm 426 then is rotated back over its associated gripper member 423 and fastened to it, by means of thumb screw 424 thereby holding gripper assembly 417 in its elevated, open-path position. This operation is repeated with gripper assembly 417 on cylinder bridge 400 to also lift and hold that gripper assembly in an open position.

Free cable end 14 is pulled through channel 140 and lifted vertically such that cable 12 engages with cable groove 144 on pulley wheel 142 and pulley wheel 142 rotates about shaft 170 as cable 12 is pulled vertically. As cable 12 is lifted past chassis bridge 200 and cylinder bridge 400, cable 12 can be moved horizontally into each bridge's gripper assembly bore interior through each bore opening 476. Once in position, fastened retention arm 426 can be disengaged from gripper member 423 by loosening thumb screw 424, and elevated gripper assembly 417 will be released down into gripper receiver 416. Gripper handle 432 also can be used to assist moving gripper assembly 417 into position in receiver 416. Cable 12 now is in position in pulling apparatus 10.

Both pairs of gripper retention arms 426 on each of chassis bridge 200 and cylinder bridge 400 now are rotated back into an engaged retaining position. A tension elastomer 428 then is attached to each retention arm pivot point/bolting means 413 and its corresponding gripper member handle 432, providing support in anchoring gripper members 423 in receiver 416 during pulling operation. The apparatus is now ready to begin a cable pulling operation.

In the event a cable alignment device 700 is attached to the pulling apparatus, for example to cylinder bridge 400 such that gap 717 aligns with cable bore openings 476 and 486, cable 12 also can be moved horizontally into gap 717 when guide body 712 is in the vertical, open position. Guide body 712 then can be rotated into the locked horizontal, guide position such that cable 12 lateral side surfaces are received by cut-outs 722 and 724.

A. Vertical System 2

In this non-limiting example, an open-path vertical cable pulling apparatus embodiment as illustrated in FIG. 36 is utilized. Set up is substantially as described in Example 1.A above, with the following changes. In this instance, tang 800 on cylinder component 300 is slid into groove 802 on chassis component 100 to engage the two components. The holding gripper assembly described above on chassis bridge 200 is now on cylinder bridge 381.

In addition, once free cable end 14 is pulled through channel 140 and around pulley wheel 142, cable retainer device 804 can engage cable 12, for example as illustrated in FIGS. 38B and 39B, so as to hold the cable in place while being positioned in each of the able engaging assemblies on chassis component 300. Once cable 12 in in place on the apparatus, cable retainer device 804 can be released into a standby position as illustrated in FIG. 38A, and the apparatus is ready for operation.

B. Horizontal System

In this non-limiting example, a vertical open-path cable pulling apparatus according to the embodiment in FIG. 36 is set up in a horizontal configuration. In this embodiment, vertical floor plate 130 becomes horizontal face plate 840 and vertical face plate 110 is now horizontal floor plate 838. Preferably, face plate 840 is bolted or otherwise engaged with the back edge of floor plate 838. As for the vertical system, cylinder component 300 engages with chassis component 100 via tang 800 engagement with groove 802.

Set up follows substantially as described above, with the following changes. In the horizontal configuration, face plate 840 is positioned against the pit wall such that cable free end 14 passes over wheel 142 as illustrated in FIG. 45B. The apparatus can be secured in position by standard means. Cable 12 then can be provided to the cable engaging assemblies as described above. In this example, cable 12 is positioned on wheel 142 by a cable guiding mechanism such as that illustrated by components 860 and 862 in FIG. 45B so as to limit movement of the cable off the wheel during operation.

2. Cable Pulling Operation 2.1 Vertical System 1.

A. Cable Pulling Stroke.

When an operator begins a cable pulling operation with apparatus 10, hydraulic fluid is provided to piston or cap-end reservoirs 612 in cylinders 600 by hydraulic hose 518 and delivery port 520. As piston reservoirs 612 fill with fluid, pistons 616 are forced vertically up their cylinder barrel interiors extending attached rods 614 vertically as well. As rods 614 extend vertically up from cylinders 600, rods 614 push attached cylinder bridge vertically as well. As cylinder bridge 400 is lifted vertically, engaged cable 12 also is pulled vertically. It will be appreciated that, as cylinder bridge 400 is pushed up, cable gripper members 423, which are engaged with the cable surface by means of the cable gripping "teeth" on the grippers' inner surface, are forced further down into receiver 416. This counter-directional action is facilitated by the nested or mirroring V-shapes of receiver 416 and assembly 417. The action also is facilitated by the preferably lubricated sliding contact between receiver side surfaces 438 and gripper assembly side surfaces 474, and by the tensioning means provided by engaged elastomers 428. The effect of the counter-directional action is to bind gripper assembly 417 to the cable so that the cable is pulled vertically as cylinder bridge 400 is lifted vertically.

It will be appreciated that chassis bridge 200 is stationary. Accordingly, there is no counter-directional action on the chassis gripper assembly and its associated receiver during the cable pulling stroke. As a result, the inner cable gripping surfaces of chassis component gripper assembly 417 do not "bite" down on the cable surface and chassis component gripper assembly 417 does not engage, grip or bind cable 12. Accordingly, cable 12 can move freely through chassis component gripper cable bore 472 during the vertical cable pulling stroke. It also will be appreciated that vertical movement of cable 12 also is facilitated by pulley wheel 142, which rotates about a preferably lubricated surface of shaft 170 or bushing 174.

B. Recovery Stroke.

When pistons 616 are at or near the top of the cylinder barrel interiors, the hydraulic fluid direction in the cylinders is reversed. Hydraulic fluid is introduced into barrel or rod-end reservoir 612 through delivery port 522, pushing piston 616 back down the barrel, and hydraulic fluid is released from piston reservoir 620. As each piston is pushed back down the barrel interior it pulls its associated rod 614 with it, retracting rod 614 back into cylinder 600. This action is called the recovery stroke.

As rods 614 are pulled back into cylinders 600, they also pull down attached cylinder bridge 400 and cylinder bridge gripper assembly receiver 416 which is integral with bridge 400. The downward movement of receiver 416 releases the counter-direction binding force between receiver 416 and gripper assembly 417, and also releases the binding action of gripper inner surfaces 486 on cable 12. As a result, gripper members 423 in cylinder bridge gripper assembly 416 disengage from the cable surface leaving cable 12 free in gripper bore 472 as cylinder bridge 400 travels downward with rods 614.

The cable pulling stroke has a tendency to stretch cable 12 along its longitudinal axis as it is being pulled vertically. During the recovery stroke, when there is no pulling tension on cable 12, the stretched cable can contract back towards its original length. The contraction process has an overall downwards pulling effect on cable 12. The downward directional contraction of cable 12 has the effect of pulling chassis bridge gripper assembly 417 down into chassis bridge receiver 416 which engages the inner cable gripper surfaces of chassis gripper assembly 417 on the cable surface, binding the cable and preventing downward movement of cable 12 during the recovery stroke. The cable engagement means of chassis bridge 200 are understood to be a "holding" cable engagement means, preventing loss of cable pulling distances gained during the cable pulling stroke.

When piston 616 is at or near the bottom of cylinder 600's barrel interior, the hydraulic fluid direction in the cylinder is again reversed and another pulling stroke begins. As cylinder bridge 400 is pushed vertically by extending rods 614, and cylinder bridge gripper assembly 417 again engages the cable surface and begins pulling cable 12 vertically. As cable 12 is pulled (and stretched), the downward directional contraction of cable 12 is eliminated, releasing the counter-direction binding force between chassis bridge receiver 416 and its associated gripper assembly 417, as well as the binding action of gripper inner surfaces 486 on cable 12. As a result, gripper members 423 in chassis bridge gripper assembly 416 disengage from the cable surface, leaving cable 12 free in chassis bridge gripper bore 472 as cylinder bridge 400 travels upwards with rods 614.

The alternating pulling and recovery strokes are repeated until the cable pulling operation is complete. In the case of a pipe replacement operation, cable pulling is complete when a replacement or product pipe, typically introduced at an entry pit behind a bursting head attached to cable 12, is pulled through the existing pipe to be replaced and into the exit pit.

2.1 Vertical System2

Where the vertical apparatus is that described in Example 1.B, is will be appreciated that the chassis gripper assembly described above now is the holding gripper assembly on bridge 831 of cylinder component 300.

2.2 Horizontal System

Operation of of the open-path apparatus in the horizontal configuration described in Example 1.B above, operates substantially as the vertical system in Example 2.1 above.

While the examples provided herein illustrate the use of the universal pulling system of the present disclosure in a pipe replacement application, it will be appreciated that the universal pulling system of the present disclosure has application in any cable pulling operation where providing means for changing cable direction during the pulling operation is advantageous.

It will be appreciated by those having ordinary skill in the art that a variety of useful, well characterized materials are readily available for fabricating the components and apparatuses of this disclosure. Material choice will depend on the functionality of the item and the corresponding need for durability, strength and weight. For example, choosing an aluminum material, particularly a high strength aluminum, for components benefiting from low weight, including, for example, the chassis frame and pulling cylinders, can be used to advantage. One example of high strength aluminum can include 70/75 aluminum. For other components a steel, including a mild steel, stainless steel, carbide-steel and heat-tempered steel, can provide the desired characteristics.

Embodiments of this disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes that come within the meaning and range of equivalency of the claims are therefore intended to be embraced therein. While illustrative embodiments have been illustrated and described, it will be appreciated that various changes can be made therein without departing from the spirit and scope of the disclosure.

The embodiments of the invention in which an exclusive property or privilege is claimed are defined as follows:

1. A device for pulling cable horizontally through space, comprising:

(a) a cable pulling component comprising
 a pair of juxtaposed piston cylinders linked at the rod end of said cylinders and disposed about a cable gripping mechanism engaged with said rod end linkage, said linked cylinders having free terminal piston ends, and
 a second cable gripping mechanism vertically aligned with said rod end linkage cable gripping mechanism, each said mechanism having a laterally accessible, open and closable central cable passage bore for laterally inserting a cable into each said bore;

(b) a chassis component comprising
 a frame having a front and back end, a floor plate, and a back plate having an opening for receiving a cable to be pulled horizontally through space;
 a rotating mechanism associated with said frame and movably positionable along said frame longitudinal axis, said rotating mechanism having a circumference comprising a channel competent to receive said cable from said back plate opening such that said rotating mechanism can convert said cable direction from horizontal to vertical when said cable is associated with said channel;
 said chassis component dimensioned to receive and releasably engage said cable pulling component such that said piston cylinders are positioned perpendicular to said floor plate and the floor, said free terminal piston ends straddle said rotating mechanism and said cable gripping mechanisms are aligned with said rotating mechanism circumference channel;

such that,
 when said cable pulling component is engaged with said chassis component, said cable is in said rotating mechanism channel and engaged with said aligned cable gripping mechanisms through said cable passage bores, extension of said cable pulling component piston cylinders pulls said engaged cable horizontally through space by pulling said cable vertically, and
 when said device is rotated such that said chassis component floor plate is now the back plate, said back plate is now the floor plate and said piston cylinders are parallel to the floor, extension of said piston cylinders pulls said engaged cable horizontally through space by pulling said cable horizontally.

2. The device of claim 1 having a cable pulling force of at least about 25 tons.

3. The device of claim 2 having a cable pulling in the range of at least about 28-100 tons.

4. The device of claim 1 wherein said cylinders operate with a low pressure flow rate.

5. The device of claim 1 wherein said cylinders operate with a flow rate in the range of at least about 2400-3000 psi.

6. The device of claim 1 further comprising means for measuring hydraulic fluid pressure from within a cylinder rod.

7. The device of claim 6 wherein said measuring means extends out the piston end of said cylinder rod interior.

8. The device of claim 1 wherein said cable pulling cylinder component further comprises internal means for measuring and displaying hydraulic fluid pressure.

9. The device of claim 8 wherein said measuring means is located within a cylinder rod interior.

10. The device of claim 1 further comprising a mechanical vertical cable retainer.

11. The device of claim 1 wherein each said component has an overall weight in the range of about 75 pounds.

12. The device of claim 1 wherein said rotating mechanism comprises a pulley wheel and shaft assembly.

13. The device of claim 12 wherein said shaft sits in an eccentric cradle such that rotation of said cradle moves said shaft laterally relative to said frame, moveably positioning said wheel along said frame longitudinal axis.

14. The device of claim 1 wherein the channel of said movably positionable rotating mechanism accommodates a range of cable diameters.

15. The device of claim 13 wherein said eccentric cradle moveably positions said wheel to accommodate a range of cable diameters while maintaining vertical alignment of said cable with said device when said cable is pulled vertically.

16. The device of claim 1 wherein each said component has an overall weight less than about 75 pounds.

17. The device of claim 1 further comprising an integrated mechanical means for modulating cable angle during said cable pulling operation.

18. A pulley wheel assembly with vertical cable angle modulating means for converting cable direction in a cable pulling device, said assembly comprising:
  a wheel with a circumference comprising a central channel having a radius dimensioned to receive cable having a diameter within a set range and competent to convert cable direction from horizontal to vertical when said cable is associated with said channel,
  said wheel attached to and competent to rotate about a shaft having terminal free ends,
  and a pair of eccentric bushings, each said bushing having an off-center bore dimensioned to receive a said shaft terminal free end and having diametrically opposed walls of differing thicknesses, such that
  when said shaft terminal ends are engaged with said bushing bores and said bushings are positioned in parallel opposing apertures in a cable pulling device frame such that the position of each said diametrically opposed bushing walls correspond in each said aperture,
  rotating each said bushing from a first position to a second position in each said aperture shifts the location of said shaft and said attached pulley wheel laterally forward or back relative to said aperture radius.

19. A vertical device for pulling cable horizontally through space, comprising:
  a pulley wheel assembly for converting a horizontal cable direction to vertical in a cable pulling device and modulating vertical cable angle, said assembly comprising:
    a wheel with a circumference comprising a central channel having a radius dimensioned to receive cable having a diameter within a set range and competent to convert cable direction from horizontal to vertical when said cable is associated with said channel, said wheel attached to and competent to rotate about a shaft having terminal free ends,
    and a pair of eccentric bushings, each said bushing having an off-center bore dimensioned to receive a said shaft free terminal end and having diametrically opposed walls of differing thicknesses, such that when said shaft terminal ends are engaged with said bushing bores and said bushings are positioned in parallel opposing apertures in a cable pulling device frame such that the position of each said diametrically opposed bushing walls correspond in each said aperture, rotating each said bushing from a first position to a second position in each said aperture shifts the location of said shaft and said attached pulley wheel laterally forward or back relative to said aperture radius and said frame, modulating the vertical angle of said cable when said wheel is rotated.

20. An open-path apparatus for pulling cable horizontally through space by vertical or horizontal pulling action, comprising:
  (a) a cable pulling component comprising
    a pair of juxtaposed piston cylinders linked at the rod end of said cylinders and disposed about a cable gripping mechanism engaged with said rod end linkage, said linked cylinders having free terminal piston ends, and
    a second cable gripping mechanism vertically aligned with said rod end linkage cable gripping mechanism, each said mechanism having a laterally accessible, open and closable central cable passage bore for laterally inserting a cable into each said bore;
  (b) a chassis component comprising
    a frame having a front and back end, a floor plate, and a back plate having an opening for receiving a cable to be pulled horizontally through space;
    a rotating mechanism associated with said frame having a circumference comprising a channel competent to receive said cable from said back plate opening such that said rotating mechanism can convert said cable direction from horizontal to vertical when said cable is associated with said channel;
    said chassis component dimensioned to receive and releasably engage said cable pulling component such that said piston cylinders are positioned perpendicular to said floor plate and the floor, said free terminal piston ends straddle said rotating mechanism and said cable gripping mechanisms are aligned with said rotating means circumference channel;
  such that,
    when said cable pulling component is engaged with said chassis component, said cable is in said rotating mechanism channel and engaged with said aligned cable gripping mechanisms through said cable passage bores, extension of said cable pulling component piston cylinders pulls said engaged cable horizontally through space by pulling said cable vertically, and
    when said device is rotated such that said chassis component floor plate is now the back plate, said back plate is now the floor plate and said piston cylinders are parallel to the floor, extension of said piston cylinders pulls said engaged cable horizontally through space by pulling said cable horizontally.

\* \* \* \* \*